(12) United States Patent
Xu et al.

(10) Patent No.: US 11,239,979 B2
(45) Date of Patent: Feb. 1, 2022

(54) ELECTRONIC DEVICE, USER EQUIPMENT, METHOD AND COMPUTER READABLE STORAGE MEDIUM

(71) Applicant: Sony Corporation, Tokyo (JP)

(72) Inventors: Wei Xu, Nanjing (CN); Yucheng Wang, Nanjing (CN); Penshun Lu, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,628

(22) PCT Filed: Mar. 27, 2019

(86) PCT No.: PCT/CN2019/079813
§ 371 (c)(1),
(2) Date: Jun. 8, 2020

(87) PCT Pub. No.: WO2019/192362
PCT Pub. Date: Oct. 10, 2019

(65) Prior Publication Data
US 2020/0382263 A1    Dec. 3, 2020

(30) Foreign Application Priority Data

Apr. 3, 2018  (CN) .......................... 201810298383.3

(51) Int. Cl.
*H04L 5/00*    (2006.01)
*H04W 4/029*   (2018.01)
*H04W 72/04*   (2009.01)

(52) U.S. Cl.
CPC .......... *H04L 5/0058* (2013.01); *H04W 4/029* (2018.02); *H04W 72/042* (2013.01); *H04W 72/0453* (2013.01)

(58) Field of Classification Search
CPC .. H04L 5/0058; H04W 4/029; H04W 72/042; H04W 72/0453
(Continued)

(56) References Cited

U.S. PATENT DOCUMENTS

| 2012/0027110 A1* | 2/2012 | Han .................... H04L 27/2656 375/260 |
| 2013/0176883 A1* | 7/2013 | Han ........................ H04L 5/005 370/252 |

(Continued)

FOREIGN PATENT DOCUMENTS

| CN | 101616360 A | 12/2009 |
| CN | 105850055 A | 8/2016 |

(Continued)

OTHER PUBLICATIONS

International Search Report and Written Opinion dated Jun. 5, 2019 for PCT/CN2019/079813 filed on Mar. 27, 2019, 11 pages including English Translation of the International Search Report.

(Continued)

*Primary Examiner* — Congvan Tran
(74) *Attorney, Agent, or Firm* — Xsensus LLP

(57) ABSTRACT

The present invention relates to an electronic device, a User Equipment (UE), a method, and a computer readable storage medium. According to the present invention, a method for determining location of a positioning reference signal (PRS) comprises: obtaining a subcarrier interval of a resource block (RB); and determining a time-frequency location of the PRS in the RB according to the subcarrier interval. The electronic device, the UE, the method, and the computer readable storage medium according to the present invention can be used for designing the PRS with respect to an NR communication system more reasonably, so as to optimize the positioning of the UE.

10 Claims, 31 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2014/0094188 | A1* | 4/2014 | Kazmi | H04W 4/023 455/456.1 |
| 2017/0276761 | A1* | 9/2017 | Park | G01S 5/0242 |
| 2017/0339595 | A1* | 11/2017 | Siomina | H04W 24/10 |
| 2020/0041604 | A1* | 2/2020 | Kim | G01S 13/84 |

FOREIGN PATENT DOCUMENTS

| | | |
|---|---|---|
| CN | 107483166 A | 12/2017 |
| WO | 2011/043595 A2 | 4/2011 |

OTHER PUBLICATIONS

3GPP, "Technical Specification Group Radio Access Network; Evolved Universal Terrestrial Radio Access (E-UTRA); Physical channels and modulation", 3rd Generation Partnership Project, Technical Specification 36.211 v15.1.0, Release 15, Mar. 2018, pp. 1-221.

* cited by examiner

ELECTRONIC DEVICE, USER EQUIPMENT, METHOD AND COMPUTER READABLE STORAGE MEDIUM

CROSS-REFERENCE TO RELATED APPLICATIONS

The present application is based on PCT filing PCT/CN2019/079813, filed Mar. 27, 2019, which claims priority to Chinese Patent Application No. 201810298383.3, filed Apr. 3, 2018 with the Chinese Patent Office, each of which is incorporated herein by reference in its entirety.

FIELD

Embodiments of the present application generally relate to the field of wireless communications, in particular to an electronic device, a user equipment, a method and a computer readable storage medium. In particular, the present disclosure relates to a method for determining a position of a PRS (Positioning Reference Signal), an electronic device used as a network side device, a user equipment, a wireless communication method performed by an electronic device used as a network side device, a wireless communication method performed by a user equipment and a computer readable storage medium.

BACKGROUND

In an LTE (Long Term Evolution) communication system, the PRS may be used to position a UE (User Equipment). Since the LTE system does not adopt large-scale multi-antenna technology, narrow beams with height directionality and high gain cannot be formed. Therefore, in the LTE communication system, the positioning manner is designed for propagation delay of the reference signal. For example, the LTE communication system may calculate the position of the UE by measuring time difference of arrival of a signal using OTDOA (Observed Time Difference of Arrival). In addition, in the LTE communication system, sequential scanning in different directions is performed by using a signal network side device.

In an NR (New Radio) communication system, in one aspect, multiple types of subcarrier intervals exist in the NR communication system, and CRS (Cell-specific Reference Signal) for channel estimating used in the LTE system is not used in the NR communication system. Therefore, the NR communication system cannot use the PRS design in the LTE communication system. In another aspect, since the positioning technology based on delay such as OTDOA has a high requirement on synchronization, the positioning is not accurate. In addition, in the LTE system, performing sequential scanning in different directions by a single network side device will result in great overhead and great delay.

Therefore, it is necessary to put forward a technical solution to design the PRS more reasonably for the NR communication system, thereby optimizing the positioning of UE.

SUMMARY

A general summary of the present disclosure is provided here, rather than full disclosing of the whole scope or all features of the present disclosure.

An object of the present disclosure is to provide an electronic device, a user equipment, a method and a computer readable storage medium, so that PRSs are designed more reasonably for the NR communication system, so as to optimize positioning of UE.

According to an aspect of the present disclosure, a method for determining a position of a positioning reference signal PRS is provided. The method includes: acquiring a subcarrier interval of a resource block RB; and determining a time frequency position of the positioning reference signal PRS in the RB according to the subcarrier interval.

According to another aspect of the present disclosure, an electronic device used as a network side device is provided. The electronic device includes processing circuitry configured to: acquire a serial number of the electronic device in a group composed of electronic devices for positioning a user equipment; and determine a time frequency position of a positioning reference signal PRS for the electronic device, according to the serial number of the electronic device in the group.

According to another aspect, a user equipment is provided. The user equipment includes processing circuitry configured to: receive positioning reference signal PRSs from multiple network side devices respectively, where a time frequency position of a PRS for each network side device is determined according to a serial number of the network side device in a group composed of the multiple network side devices; and determine beam transmission angle information of each network side device according to the PRS received from each network side device.

According to another aspect of the present disclosure, a wireless communication method implemented by an electronic device is provided. The method includes: acquiring a serial number of the electronic device in a group composed of electronic devices for positioning a user equipment; and determining a time frequency position of a positioning reference signal PRS for the electronic device, according to the serial number of the electronic device in the group.

According to another aspect of the present disclosure, a wireless communication method implemented by a user equipment is provided. The method includes: receiving positioning reference signal PRSs from multiple network side devices respectively, where a time frequency of a PRS for each network side device is determined according to a serial number of the network side device in a group composed of the multiple network side devices; and determining beam transmission angle information of each network side device according to the PRS received from each network side device.

According to another aspect of the present disclosure, a computer readable storage medium is provided. The computer readable storage medium includes executable computer instructions, which, when being executed by a computer, cause the computer to perform the wireless communication method according to the present disclosure.

With the electronic device, the user equipment, the method and the computer readable storage medium according to the present disclosure, the position of the PRS can be determined according to the subcarrier interval, so that the PRS is designed more reasonably for the NR communication system, thereby optimizing the positioning of UE.

According to the description provided here, further adaptive region becomes apparent. The description and specific examples in the summary are only schematic, rather than limiting the scope of the present disclosure.

BRIEF DESCRIPTION OF THE DRAWINGS

Drawings described herein show only schematic embodiments rather than all possible embodiments, and are not intended to limit the scope of the present disclosure. In the drawings.

Figure 1:
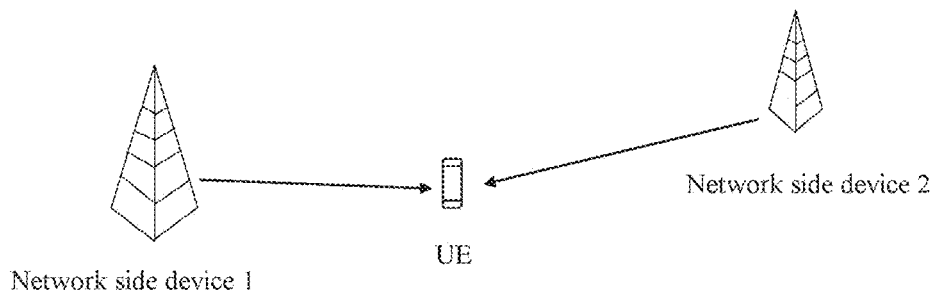
FIG. 1 shows a schematic diagram of an application scenario according to an embodiment of the present disclosure.

Although the present disclosure is easily subjected to various modifications and replacements, specific embodiments as examples are shown in the drawings and described in detail here. However, it should be understood that, the description of specific embodiments is not intended to limit the present disclosure. In contrast, the present disclosure is intended to cover all modifications, equivalents and replacements falling within the spirit and scope of the present disclosure. It should be noted that, corresponding reference numerals indicate corresponding components throughout several drawings.

DETAILED DESCRIPTION OF EMBODIMENTS

Examples of the present disclosure are fully disclosed with reference to the drawings. The description below is only schematic in essence, and is not intended to limit the present disclosure, application or usage.

Schematic embodiments are provided, so that the present disclosure will become thorough and fully convey the scope thereof to those skilled in the art. Many specific details such as examples of specific components, devices and methods are clarified here, to provide detailed understanding of embodiments of the present disclosure. It is apparent for those skilled in the art that, the schematic embodiments may be implemented by many different ways without using specific details, which should not be understood as limiting the scope of the present disclosure. In some schematic examples, well-known processes, structures and technologies are not described in detail.

Description is made in the following order:
1. description of scenarios;
2. design of positions of PRS:
   2.1 overall design of PRSs;
   2.2 classifying design of PRSs;
   2.3 correcting positions of PRSs;
3. examples of configurations of a network side device;
4. examples of configurations of a user equipment;
5. method embodiments; and
6. application examples.

<1. Description of Scenarios>

FIG. 1 shows a schematic diagram of an application scenario according to the present disclosure. As shown in FIG. 1, two network side devices are located around a UE, that is, a network side device 1 and a network side device 2. The two network side devices may send PRSs to the UE for positioning the UE. Here, at least one of the network side device 1 and the network side device 2 may be located in a same cell with the UE. As shown in FIG. 1, the network side device 1, the network side device 2 and the UE each may be located in an NR communication system. In addition, FIG. 1 shows only the case that two network side devices position the UE, the UE may be positioned by more than two network side devices.

For such scenario, an electronic device used as a network side device, a user equipment, a method for determining a position of PRS, a wireless communication method performed by an electronic device used as a network side device, a wireless communication method performed by a user equipment and a computer readable storage medium are provided according to the present disclosure, so that PRSs are designed more reasonably for the NR communication system, so as to optimize positioning of the UE.

The communication system according to the present disclosure may be a 5G (5 Generation) NR communication system.

The network side device according to the present disclosure may be any type of TRP (Transmit and Receive Port). The TRP may have transmission and receiving functions. For example, the TRP may receive information from a user equipment and a base station device, and may transmit information to the user equipment and the base station device. In an example, the TRP may provide services for the user equipment, and is controlled by the base station device. That is, the base station device provides services for the user equipment via the TRP. In addition, the network side device according to the present disclosure may be a base station device for example an eNB, or may be a gNB (a base station in the fifth generation communication system).

The user equipment according to the present disclosure may be a mobile terminal (for example a smartphone, a tablet personal computer (PC), a notebook PC, a portable game terminal, a portable/dongle mobile router and a digital camera) or a vehicle terminal (such as a vehicle navigation device). The user equipment may be implemented as a terminal performing machine to machine (M2M) communication (also referred to as a machine type communication (MTC) terminal). In addition, the user equipment may be a wireless communication module (for example an integrated circuit module including a single chip) installed in each of the above terminals.

<2. Design of Positions of PRS>

<2.1 Overall Design of PRS>

Figure 2:
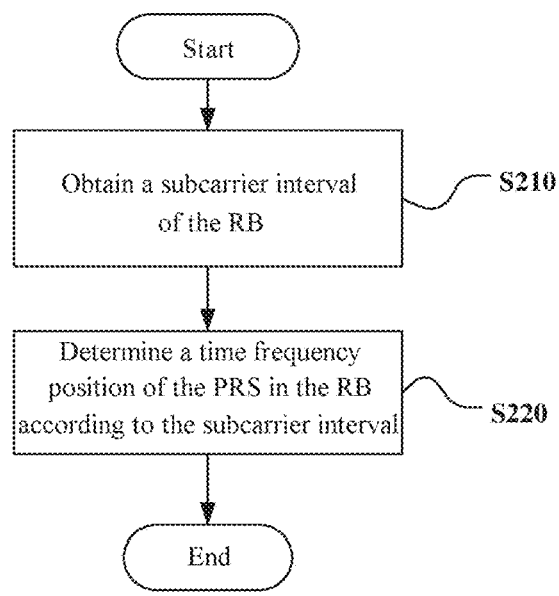
FIG. 2 shows a flowchart of a method for determining a position of PRS according to an embodiment of the present disclosure.

FIG. 2 shows a flowchart of a method for determining a position of PRS according to an embodiment of the present disclosure. As shown in FIG. 2, in step S210, a subcarrier interval of an RB (Resource Block) is obtained.

Subsequently, in step S220, a time frequency position of a PRS in the RB is determined according to the subcarrier interval.

According to the embodiment of the present disclosure, the method may be applied to an NR communication system. Different subcarrier intervals exist in the NR communication system, including but not limited to 15 KHZ, 30 KHZ, 60 KHZ, 120 KHZ, 240 KHZ and 480 KHZ. Therefore, in step S210, the subcarrier interval of the RB is obtained. It should be noted that, the design of PRS is for the RB in the present disclosure. This is since the PRS may be transmitted on one or more RBs, and the PRSs transmitted on the one or more RBs may have the same patterns. Further, a bandwidth for transmitting the PRS may be configured. For example, the bandwidth for transmitting PRS may be indicated by $N_{RB}^{new}$, which indicates a ratio of the bandwidth for transmitting PRSs and a bandwidth occupied by one RB. Since the PRSs on different RBs have the same patterns, a position of the PRS in the RB is designed by taking one RB as example in the following. In step S210, the subcarrier intervals of the RB may be obtained by various manners. For example, the subcarrier interval of the RB is determined by acquiring high layer configurations, and thus the position of the PRS in the RB is determined according to the subcarrier interval of the RB in step S220. Further, the position of the PRS may include a time domain position and a frequency domain position.

As described above, according to the embodiment of the present disclosure, the position of the PRS may be determined according to different subcarrier intervals, thereby designing the PRS more reasonably for the NR communication system.

According to the embodiment of the present disclosure, step S220 includes: determining time domain positions and frequency domain positions of multiple REs (Resource Element) occupied by the PRS in the RB. According to the embodiment of the present disclosure, a length of one RB is 14 OFDM symbols in the time domain and is 12 subcarriers in the frequency domain. A length of one RE is one OFDM symbol in the time domain, and is one subcarrier in the frequency domain. That is, each RB includes 168 REs, and the PRS may occupy multiple REs among the 168 REs. Therefore, step S220 may include: determining a position of each of the multiple REs occupied by the PRS, including a time domain position and a frequency domain position. That is, step S220 may include: determining the time domain position of the RE and determining the frequency domain position of the RE.

According to the embodiment of the present disclosure, step S220 may include: the multiple REs do not overlap with each of PDCCH, DMRS and CSI-RS in the RB.

PDCCH, DMRS and CSI-RS are reference signals existing in the LTE system, and thus these reference signals are required in the NR system. Therefore, according to the embodiment of the present disclosure, the PRS is required to avoid positions of the existing reference signals. That is, each RE is required to not overlap with each of PDCCH, DMRS and CSI-RS, that is, being orthogonal with each of PDCCH, DMRS and CSI-RS.

According to the embodiment of the present disclosure, in order to simplify design of the PRS, the process of determining the time domain position of the RE in step S220 may include that: the multiple REs do not overlap with each of PDCCH, DMRS and CSI-RS in the time domain. That is, the time domain position of each RE is determined, so that each RE is orthogonal with each of PDCCH, DMRS and CSI-RS in the time domain.

Figure 3A:
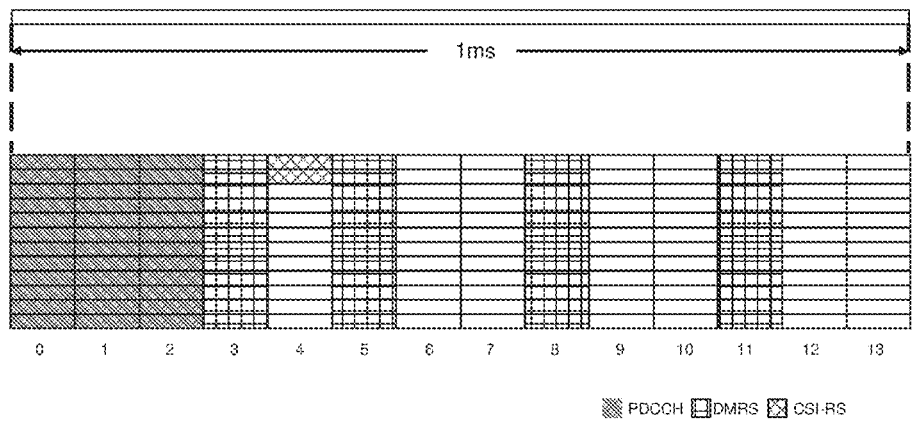
FIG. 3(a) shows a schematic diagram of configurations of PDCCH (physical downlink control channel), DMRS (demodulation reference signal) and channel state information reference signal (CSI-RS) in a case that a subcarrier interval is 15 KHZ.
Figure 3B:
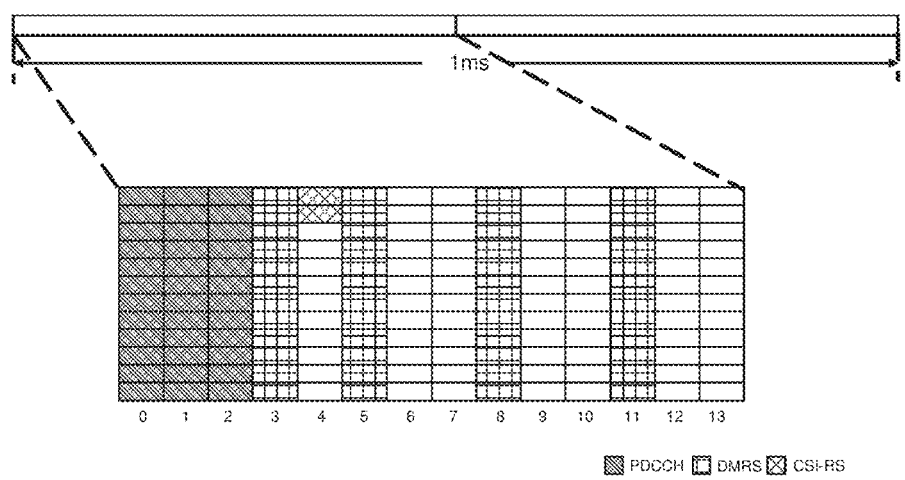
FIG. 3(b) shows a schematic diagram of configurations of PDCCH, DMRS and CSI-RS in a case that the subcarrier interval is 30 KHZ.
Figure 3C:
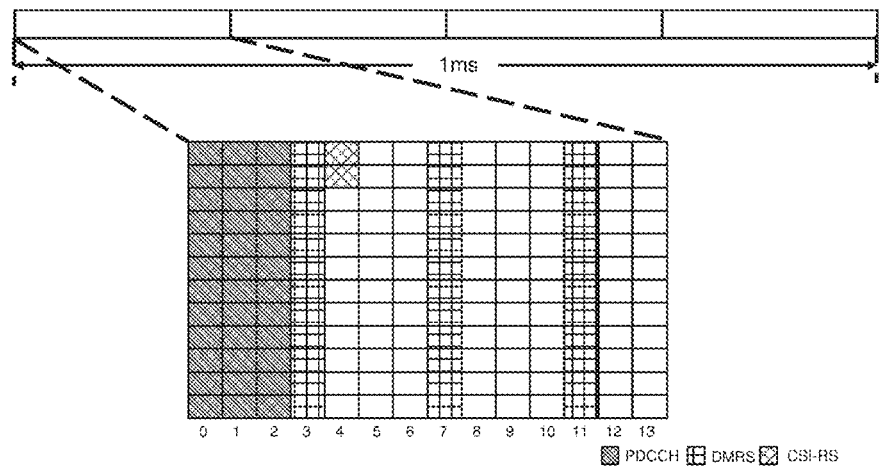
FIG. 3(c) shows a schematic diagram of configurations of PDCCH, DMRS and CSI-RS in a case that the subcarrier interval is 60 KHZ.
Figure 3D:
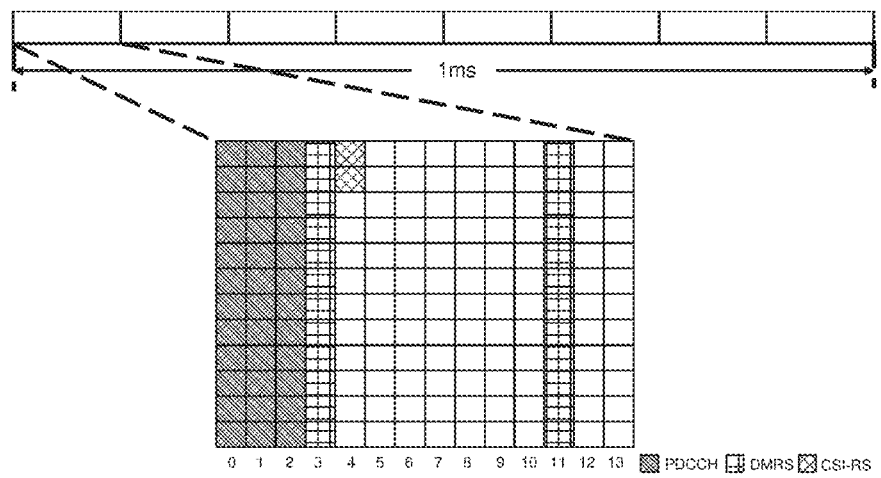
FIG. 3(d) shows a schematic diagram of configurations of PDCCH, DMRS and CSI-RS in a case that the subcarrier interval is 120 KHZ.
Figure 3E:
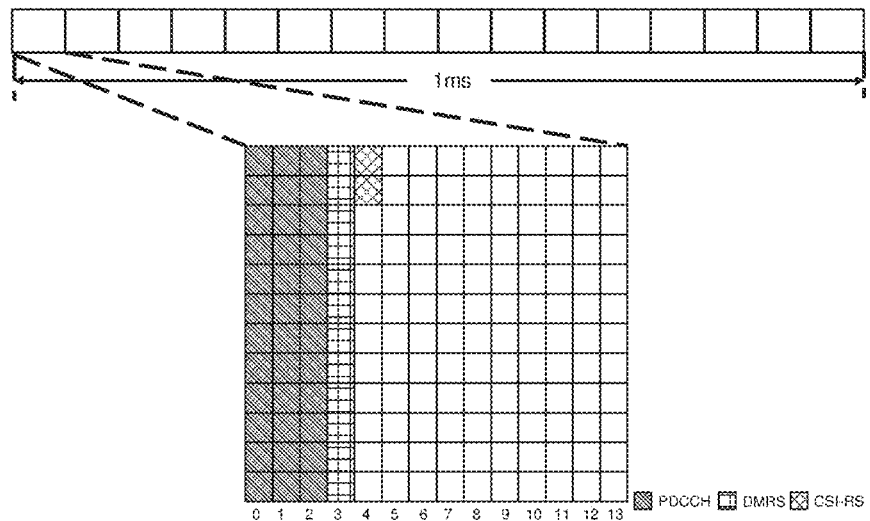
FIG. 3(e) shows a schematic diagram of configurations of PDCCH, DMRS and CSI-RS in a case that the subcarrier interval is 240 KHZ.
Figure 3F:
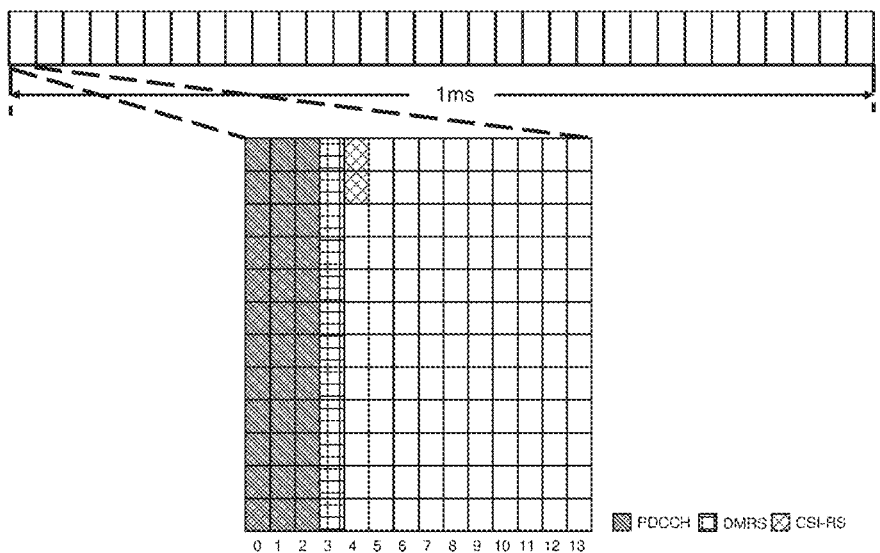
FIG. 3(f) shows a schematic diagram of configurations of PDCCH, DMRS and CSI-RS in a case that the subcarrier interval is 480 KHZ.

FIG. 3(a) to FIG. 3(f) show schematic diagrams of configurations of PDCCH, DMRS and CSI-RS under different subcarrier intervals. Specifically, FIG. 3(a) shows a schematic diagram of configurations of PDCCH, DMRS and CSI-RS in a case that the subcarrier interval is 15 KHZ; FIG. 3(b) shows a schematic diagram of configurations of PDCCH, DMRS and CSI-RS in a case that the subcarrier interval is 30 KHZ; FIG. 3(c) shows a schematic diagram of configurations of PDCCH, DMRS and CSI-RS in a case that the subcarrier interval is 60 KHZ; FIG. 3(d) shows a schematic diagram of configurations of PDCCH, DMRS and CSI-RS in a case that the subcarrier interval is 120 KHZ; FIG. 3(e) shows a schematic diagram of configurations of PDCCH, DMRS and CSI-RS in a case that the subcarrier interval is 240 KHZ; and FIG. 3(f) shows a schematic diagram of configurations of PDCCH, DMRS and CSI-RS in a case that the subcarrier interval is 480 KHZ.

As shown in FIG. 3(a) to FIG. 3(f), 14 OFDM symbols in one RB are sequentially numbered as 0 to 13 from left to right (this numbering mode is used in the following). As shown in Figures, PDCCH occupies first three OFDM symbols of the RB, and CSI-RS occupies two upper subcarriers of an OFDM symbol 4. For configurations of the subcarrier interval being 15 kHZ and 30 KHZ, DMRS occupies OFDM symbols 3, 5, 8 and 11. For configurations of the subcarrier interval being 60 KHZ, DMRS occupies OFDM symbols 3, 7 and 11. For configurations of the subcarrier interval being 120 kHZ, DMRS occupies OFDM symbols 3 and 11. For configurations of the subcarrier intervals being 240 KHZ and 480 KHZ, DMRS occupies an OFDM symbol 3.

Therefore, as described above, the process of determining the time domain position of the RE may include: the RE does not overlap with each of PDCCH, DMRS and CSI-RS in the time domain. Here, the position of the RE occupied by the PRS may be indicated by coordinates (1, k). In which, 1 indicates a coordination of the time domain position of the RE, and k indicates a coordination of the frequency domain position of the RE. That is, the RE occupied by the PRS is located on the 1-th OFDM symbol in the time domain, and is located on the k-th subcarrier in the frequency domain. In which, $1=[0, 13]$, $k=[6(N_{BWP}^{size}-N_{RB}^{new}), 6(N_{BWP}^{size}+N_{RB}^{new})-1]$, $N_{BWP}^{size}$ indicates a bandwidth for transmitting downlink data and is specifically a ratio of the bandwidth for transmitting downlink data and the bandwidth occupied by one RB; $N_{RB}^{new}$ indicates the bandwidth for transmitting PRS, and is specifically a ratio of the bandwidth for transmitting the PRS and a bandwidth occupied by one RB. Here, the bandwidth for transmitting PRS may be greater than the bandwidth of one RB, so all subcarriers on the entire bandwidth transmitting the PRS are numbered together. However, patterns of the PRS on only one RB are shown. For facilitating illustration, k is numbered from 0 to 11. According to the embodiment of the present disclosure, the time domain position l of the RE may be determined according to the following equation:

$$l = \begin{cases} 6, 7, 9, 10, 12, 13 & \Delta f = 15 \ (30) \text{ kHz} \\ 5, 6, 8, 9, 10, 12, 13 & \Delta f = 60 \text{ kHz} \\ 5, 6, 7, 8, 9, 10, 12, 13 & \Delta f = 120 \text{ kHz} \\ 5, 6, 7, 8, 9, 10, 11, 12, 13 & \Delta f = 240 \ (480) \text{ kHz} \end{cases} \quad (1)$$

in which, $\Delta f$ indicates the subcarrier interval.

According to the embodiment of the present disclosure, the step of determining the time domain position of the RE includes: maximizing a span of the multiple REs occupied by the PRS in the time domain of the RB. That is, the multiple REs occupied by the PRS are caused to be distributed over all OFDM symbols of the RB as much as possible. For example, in addition OFDM symbols occupied by PDCCH, DMRS and CSI-RS, PRS is located on each OFDM symbol. As shown by the above equation (1), for configurations of the subcarrier interval being 15 KHZ and 30 KHZ, PRS are located on each of OFDM symbols 6, 7, 9, 10, 12 and 13, and configurations for other subcarrier intervals are similar.

It follows that, according to the embodiment of the present disclosure, the position of the PRS may be orthogonal with PDCCH, DMRS and CSI-RS, so that the design of reference signals of the NR communication system is compatible with the LTE communication system.

According to the embodiment of the present disclosure, the process of determining the frequency domain position of the RE in step S220 may include: maximizing s span of multiple REs occupied by the PRS in the frequency domain of the RB. That is, the multiple REs occupied by the PRS are caused to be distributed over all subcarriers of the RB as much as possible.

Further, according to the embodiment of the present disclosure, the process of determining the frequency domain position of the RE in step S220 may include: the number of REs occupied by the PRS on each OFDM symbol does not exceed two. For example, two REs are occupied by the PRS on each OFDM. In this way, the frequency resource can be saved.

FIG. 4(*a*) to FIG. 4(*d*) show schematic diagrams of configurations of the PRS under different subcarrier configurations according to embodiments of the present disclosure. Specifically, FIG. 4(*a*) shows a schematic diagram of configurations of the PRS according to an embodiment of the present disclosure in a case that the subcarrier interval is 15 KHZ or 30 KHZ; FIG. 4(*b*) shows a schematic diagram of configurations of the PRS according to an embodiment of the present disclosure in a case that the subcarrier interval is 60 KHZ; FIG. 4(*c*) shows a schematic diagram of configurations of the PRS according to an embodiment of the present disclosure in a case that the subcarrier interval is 120 KHZ; and FIG. 4(*d*) shows a schematic diagram of configurations of the PRS according to an embodiment of the present disclosure in a case that the subcarrier interval is 240 KHZ or 480 KHZ.

As shown by FIG. 4(*a*) to FIG. 4(*d*), in addition to OFDM symbols occupied by PDCCH, DMRS and CSI-RS, a PRS is located on each OFDM symbol. Further, the PRS on each OFDM symbol occupies two REs. In addition, for configurations of the subcarrier interval being 30 KHZ, 60 KHZ, 120 KHZ, 240 KHZ and 480 KHZ, a PRS is located on each subcarrier. In this way, the span of the PRS in the frequency domain and the time domain can be maximized, and the frequency resources can be saved. It should be noted that, FIG. 4(*a*) to FIG. 4(*d*) show only one possible design scheme for the PRS for each subcarrier interval, but the present disclosure is not limited thereto.

According to the embodiment of the present disclosure, the process of determining the frequency domain position of the RE in step S220 may further include: determining a frequency domain position of the RE according to the time domain position of the RE.

Further, according to the embodiment of the present disclosure, the process of determining the frequency domain position of the RE in step S220 may include determining a frequency domain position of the RE according to at least one of the following parameters: physical layer cell identification of a cell where a user to be positioned is located; a bandwidth for transmitting the PRS; and a bandwidth for transmitting downlink data. For example, the frequency domain position k of the RE may be determined according to the following equations:

$$k = 6(m + N_{BWP}^{size} - N_{RB}^{new}) + (16 - 1 + v_{shift}) \bmod 6 \quad (2)$$

$$m = 0, 1, \ldots, 2N_{RB}^{new} - 1 \quad (3)$$

$$v_{shift} = N_{ID}^{cell} \bmod 6. \quad (4)$$

in which, $N_{BWP}^{size}$ indicates a bandwidth for transmitting downlink data, and is specifically a ratio of the bandwidth for transmitting downlink data and a bandwidth occupied by one RB; $N_{RB}^{new}$ indicates a bandwidth for transmitting the PRS, and is specifically a ratio of the bandwidth for transmitting the PRS and the bandwidth occupied by one RB; and $N_{ID}^{cell}$ indicates physical layer cell identification of a cell where a user equipment to be positioned is located. In addition, $N_{RB}^{new} \leq N_{BWP}^{size}$.

As shown by the above equation (4), values of k may be related to $N_{ID}^{cell}$. In a cellular architecture, one cell is adjacent to six cells. Therefore, with such design, the adjacent cells may adopt different PRS configurations, thereby avoiding interferences. In addition, the PRS may be used to position the user equipment. Therefore, the position of the PRS may be designed for the user equipment to be positioned. Practically, the position of the PRS may be designed for a cell. In this case, $N_{ID}^{cell}$ may indicate physical layer cell identification of a certain cell, and the designed PRS is for the cell, that is, adapting to all user equipment in the cell.

According to the embodiment of the present disclosure, the frequency domain position of the RE may be determined according to only the time domain position of the RE and the physical layer cell identification of the cell where the user equipment to be positioned is located. In this case, the above equation (2) may be simplified into $k = 6m + (16 - 1 + v_{shift}) \bmod 6$, where m=0 or m=1. The calculated k ranges in [0, 11], that is, indicating the frequency domain position of the RE on each RB transmitting the PRS regardless of the bandwidth for transmitting the PRS.

According to the embodiment of the present disclosure, as shown by the above equations (2) and (3), values of k may be related to $N_{BWP}^{size}$ and $N_{RB}^{new}$. That is, the frequency domain position of the RE may be determined according to the time domain position of the RE, the physical layer cell identification of the cell where the user equipment to be positioned is located, the bandwidth for transmitting the PRS and the bandwidth for transmitting downlink data. Here, $N_{BWP}^{size}$ indicates a bandwidth for transmitting downlink data, and is specifically a ratio of the bandwidth for transmitting downlink data and the bandwidth occupied by one RB. According to the embodiment of the present disclosure, the bandwidth occupied by one RB is 12 subcarriers. It is assumed that the bandwidth for transmitting the downlink data is 24 subcarriers, and thus a value of $N_{BWP}^{size}$ is 2. The method for calculating $N_{RB}^{new}$ is similar.

The determining of the PRS position is described in detail by assuming that the subcarrier interval is 15 KHZ or 30 KHZ. It is assumed that $v_{shift}=0$, $N_{BWP}^{size}=1$ and $N_{RB}^{new}=1$, and thus m=0 or 1. The time frequency positions of the RE occupied by the PRS may be obtained as follows according to the above equations (1) to (4):

| l | k |
|---|---|
| 6 | 4, 10 |
| 7 | 3, 9 |
| 9 | 1, 7 |
| 10 | 0, 6 |
| 12 | 4, 10 |
| 13 | 3, 9 |

Figure 4A:
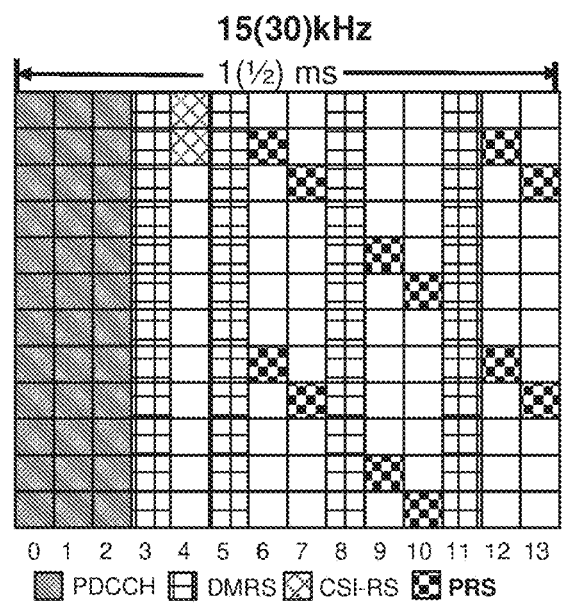
FIG. 4(a) shows a schematic diagram of configurations of PRS according to an embodiment of the present disclosure, in a case that the subcarrier interval is 15 KHZ or 30 KHZ.
Figure 4B:
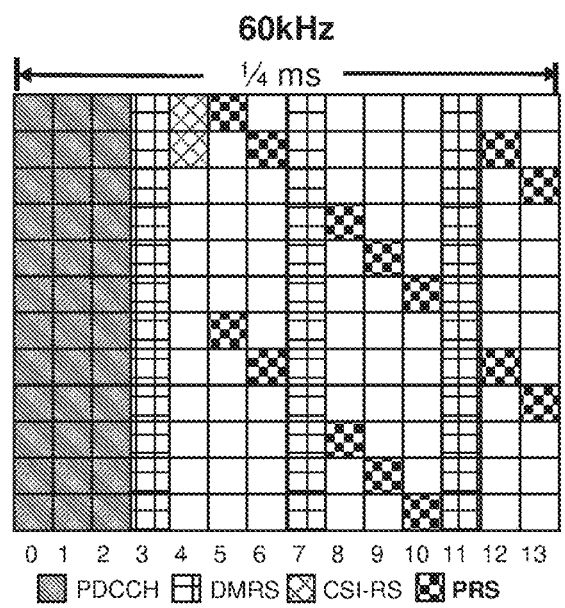
FIG. 4(b) shows a schematic diagram of configurations of PRS according to an embodiment of the present disclosure, in a case that the subcarrier interval is 60 KHZ.
Figure 4C:
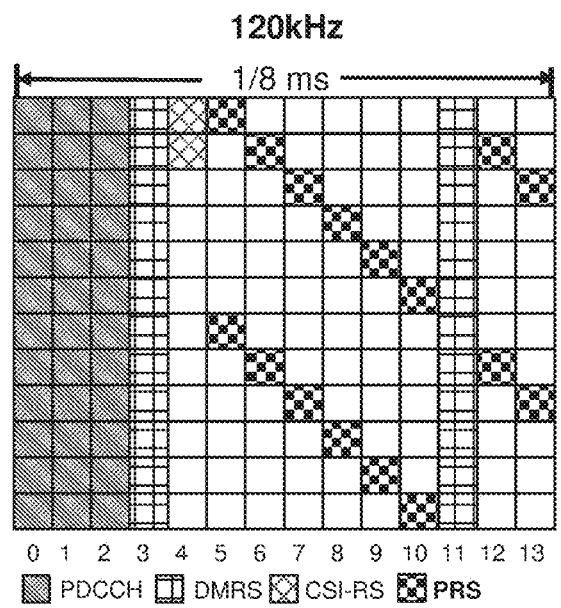
FIG. 4(c) shows a schematic diagram of configurations of PRS according to an embodiment in a case that the subcarrier interval is 120 KHZ.
Figure 4D:
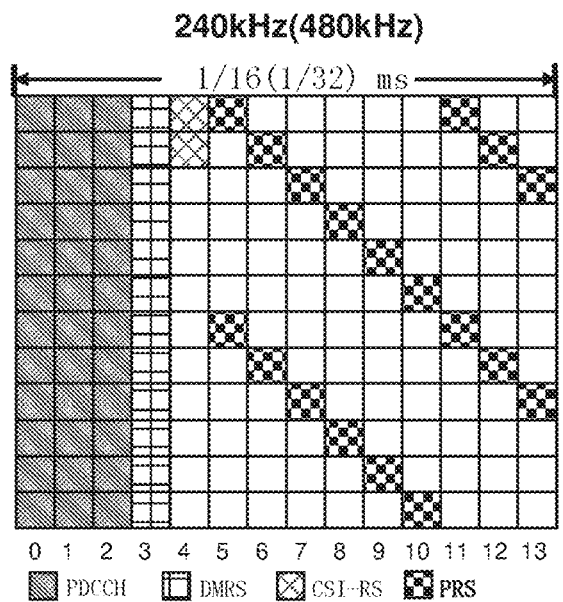
FIG. 4(d) shows a schematic diagram of configurations of PRS according to an embodiment of the present disclosure in a case that the subcarrier interval is 240 KHZ or 480 KHZ.

In this way, the configurations shown in FIG. 4(a) can be obtained. Practically, for different values of $v_{shift}$, $N_{BWP}^{size}$ and $N_{RB}^{new}$, different positions of PRSs can be obtained. Therefore, the present disclosure is not limited to positions of the PRSs shown in FIG. 4(a). The cases for other subcarrier intervals are similar.

As described above, according to the embodiment of the present disclosure, the position of the PRS may be determined according to the subcarrier interval. Specifically, the time domain position of the PRS may be determined according to the subcarrier interval, and the frequency domain position of the PRS may be determined according to the time domain position of the PRS. Further, the frequency domain position of the PRS may be determined according to the physical layer cell identification of the cell where the user equipment to be positioned is located, the bandwidth for transmitting the PRS and/or the bandwidth for transmitting the downlink data. In this way, the position of the PRS can be designed more reasonably according to the NR communication system.

<2.2 Classifying Design of PRS>

According to the embodiment of the present disclosure, after the position of the PRS is determined as above, and the PRSs may be classified, to assign to multiple network side devices for positioning the user equipment.

Figure 5:
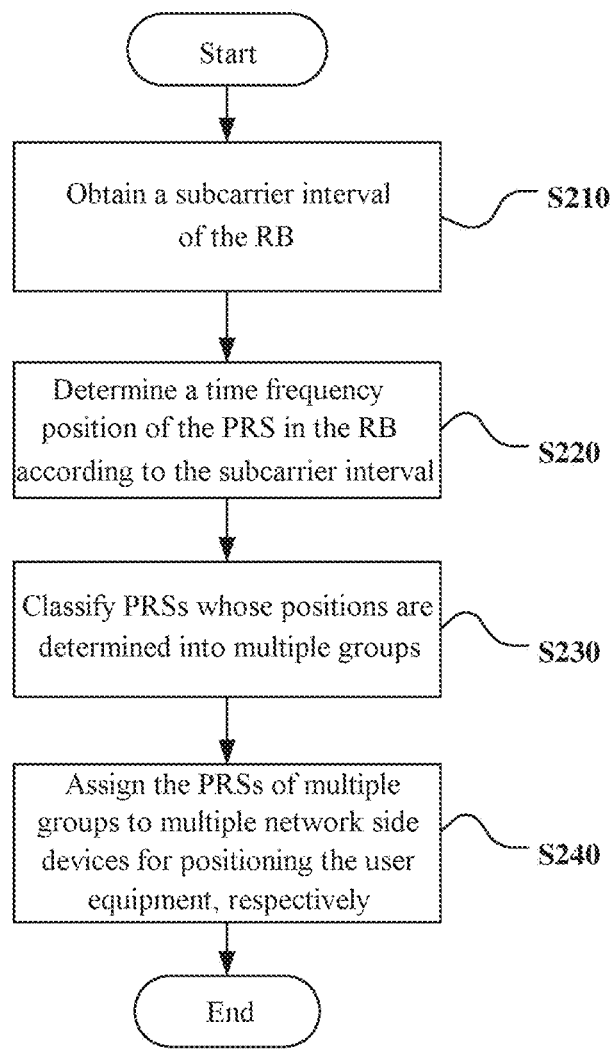
FIG. 5 shows a flowchart of a method for classifying PRSs according to an embodiment of the present disclosure.

FIG. 5 shows a flowchart of a method for classifying PRSs according to an embodiment of the present disclosure. As shown in FIG. 5, in step S230, PRSs whose positions are determined are classified into multiple groups. Subsequently, in step S240, PRSs of multiple groups are assigned to multiple network side devices for positioning the user equipment, respectively.

According to the embodiment of the present disclosure, the number of groups of PRSs may be the same as the number of network side devices for positioning the user equipment. That is, in a case that the user equipment is positioned by using two network side devices, the PRSs are classified into two groups; in a case that the user equipment is positioned by using three network side devices, the PRSs are classified into three groups; and in a case that the user equipment is positioned by using four network side devices, the PRSs are classified into four groups, and so on.

As described above, according to the embodiment of the present disclosure, the PRSs may be classified and assigned to multiple network side devices. In this case, the classified PRSs may be used for beamforming and positioning based on a beam angel, so that the multiple network side devices cooperate to position the user equipment, thereby optimizing the positioning of the user equipment.

According to the embodiment of the present disclosure, step S230 may include: numbering the multiple groups obtained by classifying, for example, numbering the multiple groups as n, where n ranges in [0, N−1] and N indicates the number of the groups. Further, the time domain position and the frequency domain position of the RE occupied by the PRS in each group may be determined according to a serial number of the group. The classifying process is described in detail hereinafter.

According to the embodiment of the present disclosure, step S230 may further include: assigning one or more REs on a same subcarrier occupied by the PRS to one group. That is, PRSs on subcarrier 0 to subcarrier 11 may be allocated to different groups. That is, REs in different groups are orthogonal in the frequency domain, and REs in the same group may use the same frequency domain resource.

Figure 6A:
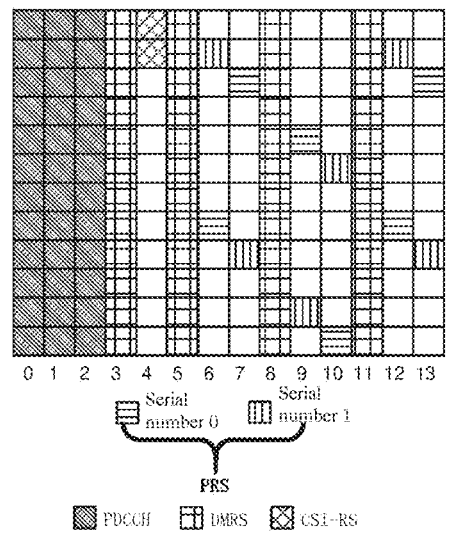
FIG. 6(a) shows a schematic diagram of configurations when PRSs are classified into two groups according to an embodiment of the present disclosure, in a case that the subcarrier interval is 15 KHZ or 30 KHz.
Figure 6B:
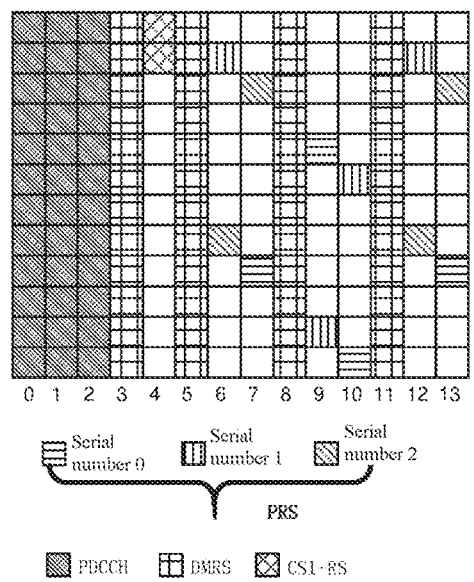
FIG. 6(b) shows a schematic diagram of configurations when PRSs are classified into three groups according to an embodiment of the present disclosure, in a case that the subcarrier interval is 15 KHZ or 30 KHZ.
Figure 6C:
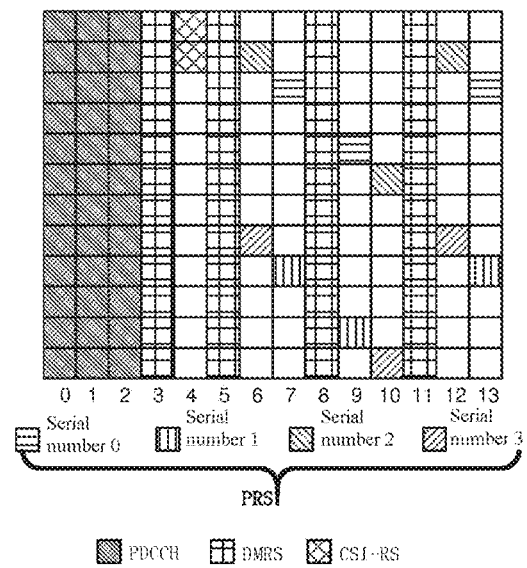
FIG. 6(c) shows a schematic diagram of configurations when PRSs are classified into four groups according to an embodiment of the present disclosure, in a case that the subcarrier interval is 15 KHZ or 30 KHZ.

FIG. 6(a) to FIG. 6(c) show cases that the PRSs are classified according to the above method in a case that the subcarrier interval is 15 KHZ or 30 KHZ. Specifically, FIG. 6(a) shows a schematic diagram of configurations when the PRSs are classified into two groups according to an embodiment of the present disclosure, in a case that the subcarrier interval is 15 KHZ or 30 KHZ; FIG. 6(b) shows a schematic diagram of configurations when the PRSs are classified into three groups according to an embodiment of the present disclosure, in a case that the subcarrier interval is 15 KHZ or 30 KHZ; and FIG. 6(c) shows a schematic diagram of configurations when the PRSs are classified into four groups according to an embodiment of the present disclosure, in a case that the subcarrier interval is 15 KHZ or 30 KHZ.

As shown in FIG. 6(a), it is assumed that subcarriers are numbered as 11 to 0 from top to bottom (such numbering manner is used in the following). In this case, PRSs on subcarrier 10 occupy two REs, and the two REs are assigned to a group 1; PRSs on subcarrier 9 occupy two REs, and the two REs are assigned to a group 0; PRSs on subcarrier 7 occupy one RE, and the RE is assigned to the group 0; PRSs on subcarrier 6 occupy one RE, and the RE is allocated to the group 1; PRSs on subcarrier 4 occupy two REs, and the two REs are assigned to the group 0; PRSs on subcarrier 3 occupy two REs, and the two REs are assigned to the group 1; PRSs on subcarrier 1 occupy one RE, and the RE is assigned to the group 1; and PRSs on subcarrier 0 occupy one RE, the RE is assigned to the group 0.

As shown in FIG. 6(b), it is assumed that subcarriers are numbered as 11 to 0 from top to bottom. In this case, PRSs on subcarrier 10 occupy two REs, and the two REs are assigned to the group 1; PRSs on subcarrier 9 occupy two REs, and the two REs are assigned to the group 2; PRSs on subcarrier 7 occupy one RE, and the RE is assigned to the group 0; PRSs on subcarrier 6 occupy one RE, the RE is assigned to the group 1; PRSs on subcarrier 4 occupy two REs, and the two REs are assigned to a group 2; PRSs on subcarrier 3 occupy two REs, and the two REs are assigned to the group 0; PRSs on subcarrier 1 occupy one RE, and the RE is assigned to the group 1; and PRSs on subcarrier 0 occupy one RE, and the RE is assigned to the group 0.

As shown in FIG. 6(c), it is assumed that subcarriers are numbered as 11 to 0 from top to bottom. In this case, PRSs on subcarrier 10 occupy two REs, and the two REs are assigned to the group 2; PRSs on subcarrier 9 occupy two REs, and the two REs are assigned to the group 0; PRSs on subcarrier 7 occupy one RE, and the RE is assigned to the group 0; PRSs on subcarrier 6 occupy one RE, the RE is assigned to the group 2; PRSs on subcarrier 4 occupy two REs, and the two REs are assigned to a group 3; PRSs on subcarrier 3 occupy two REs, and the two REs are assigned to the group 1; PRSs on subcarrier 1 occupy one RE, and the RE is assigned to the group 1; and PRSs on subcarrier 0 occupy one RE, and the RE is assigned to the group 3.

Figure 7A:
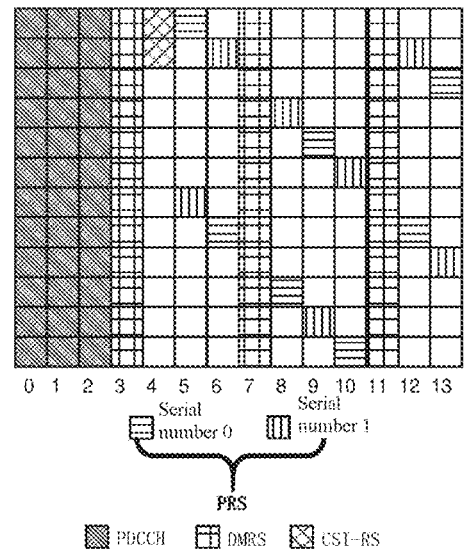
FIG. 7(a) shows a schematic diagram of configurations when PRSs are classified into two groups according to an embodiment of the present disclosure, in a case that the subcarrier interval is 60 KHZ.
Figure 7B:
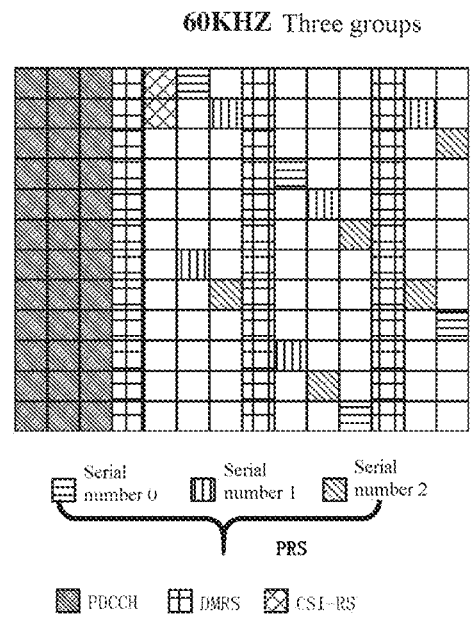
FIG. 7(b) shows a schematic diagram of configurations when PRSs are classified into three groups according to an embodiment of the present disclosure, in a case that the subcarrier interval is 60 KHZ.
Figure 7C:
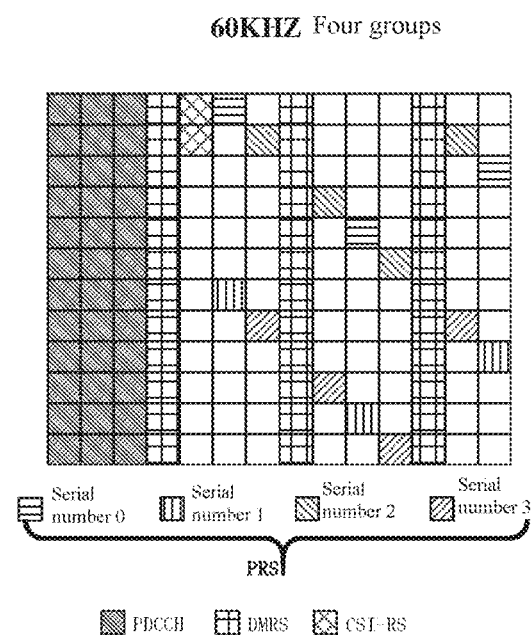
FIG. 7(c) shows a schematic diagram of configurations when PRSs are classified into four groups according to an embodiment of the present disclosure, in a case that the subcarrier interval is 60 KHZ.

FIG. 7(a) to FIG. 7(c) show cases that the PRSs are classified according to the above method in a case that the subcarrier interval is 60 KHZ. Specifically, FIG. 7(a) shows a schematic diagram of configurations when the PRSs are classified into two groups according to an embodiment of the present disclosure, in a case that the subcarrier interval is 60 KHZ; FIG. 7(b) shows a schematic diagram of configurations when the PRSs are classified into three groups according to an embodiment of the present disclosure, in a case that the subcarrier interval is 60 KHZ; and FIG. 7(c) shows a schematic diagram of configurations when the PRSs are classified into four groups according to an embodiment of the present disclosure, in a case that the subcarrier interval is 60 KHZ.

As shown in FIG. 7(a), it is assumed that subcarriers are numbered as 11 to 0 from top to bottom. In this case, PRSs on subcarrier 11 occupy one RE, and the RE is assigned to a group 0; PRSs on subcarrier 10 occupy two REs, and the two REs are assigned to a group 1; PRSs on subcarrier 9 occupy one RE, and the RE is allocated to the group 0; PRSs on subcarrier 8 occupy one RE, and the RE is allocated to the group 1; PRSs on subcarrier 7 occupy one RE, and the RE is assigned to the group 0; PRSs on subcarrier 6 occupy one RE, and the RE is assigned to the group 1; PRSs on subcarrier 5 occupy one RE, and the RE is assigned to the group 1; PRSs on subcarrier 4 occupy two REs, and the two REs are allocated to the group 0; PRSs on subcarrier 3 occupy one RE, the RE is assigned to the group 1; PRSs on subcarrier 2 occupy one RE, and the RE is assigned to the group 0; PRSs on subcarrier 1 occupy one RE, the RE is assigned to the group 1; PRSs on subcarrier 0 occupy one RE, the RE is assigned to the group 0.

As shown in FIG. 7(b), it is assumed that subcarriers are numbered as 11 to 0 from top to bottom. In this case, PRSs on subcarrier 11 occupy one RE, and the RE is assigned to a group 0; PRSs on subcarrier 10 occupy two REs, and the two REs are assigned to a group 1; PRSs on subcarrier 9 occupy one RE, and the RE is assigned to the group 2; PRSs on subcarrier 8 occupy one RE, and the RE is assigned to the group 0; PRSs on subcarrier 7 occupy one RE, and the RE is assigned to the group 1; PRSs on subcarrier 6 occupy one RE, and the RE is assigned to the group 2; PRSs on subcarrier 5 occupy one RE, and the RE is assigned to the group 1; PRSs on subcarrier 4 occupy two REs, the two REs are assigned to the group 2; PRSs on subcarrier 3 occupy one RE, and the RE is assigned to the group 0; PRSs on subcarrier 2 occupy one RE, the RE is assigned to the group 1; PRSs on subcarrier 1 occupy one RE, and the RE is assigned to the group 2; PRSs on subcarrier 0 occupy one RE, the RE is assigned to the group 0.

As shown in FIG. 7(c), it is assumed that subcarriers are numbered as 11 to 0 from top to bottom. In this case, PRSs on subcarrier 11 occupy one RE, and the RE is assigned to the group 0; PRSs on subcarrier 10 occupy two REs, and the two REs are assigned to the group 2; PRSs on subcarrier 9 occupy one RE, and the RE is assigned to the group 0; PRSs on subcarrier 8 occupy one RE, and the RE is assigned to the group 2; PRSs on subcarrier 7 occupy one RE, and the RE is assigned to the group 0; PRSs on subcarrier 6 occupy one RE, and the RE is assigned to the group 2; PRSs on subcarrier 5 occupy one RE, and the RE is assigned to the group 1; PRSs on subcarrier 4 occupy two REs, the two REs are assigned to the group 3; PRSs on subcarrier 3 occupy one RE, and the RE is assigned to the group 1; PRSs on subcarrier 2 occupy one RE, the RE is assigned to the group 3; PRSs on subcarrier 1 occupy one RE, and the RE is assigned to the group 1; PRSs on subcarrier 0 occupy one RE, the RE is assigned to the group 3

Figure 8A:
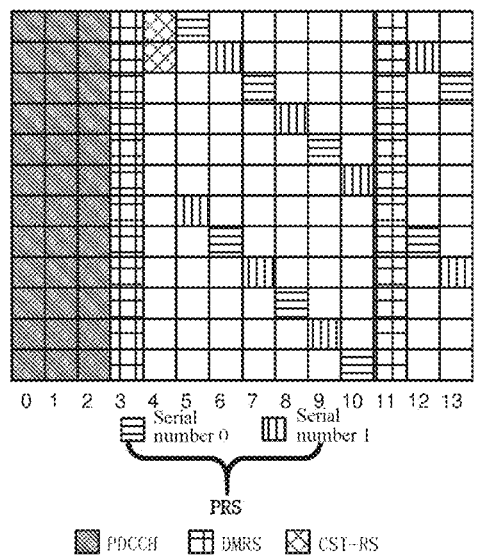
FIG. 8(a) shows a schematic diagram of configurations when PRSs are classified into two groups according to an embodiment of the present disclosure, in a case that the subcarrier interval is 120 KHZ.
Figure 8B:
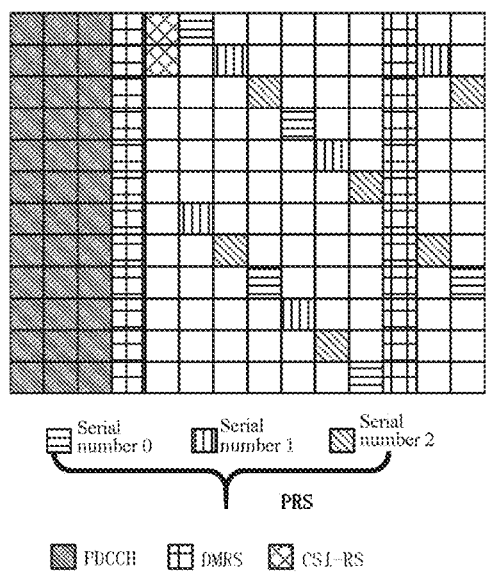
FIG. 8(b) shows a schematic diagram of configurations when PRSs are classified into three groups according to an embodiment of the present disclosure, in a case that the subcarrier interval is 120 KHZ.
Figure 8C:
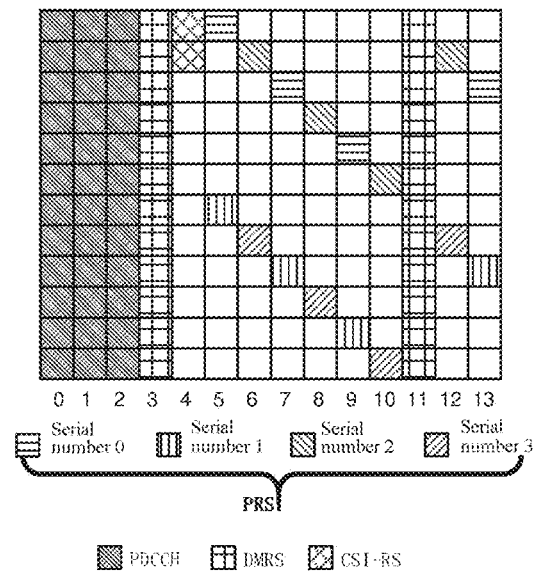
FIG. 8(c) shows a schematic diagram of configurations when PRSs are classified into four groups according to an embodiment of the present disclosure, in a case that the subcarrier interval is 120 KHZ.

FIG. 8(a) to FIG. 8(c) show cases that the PRSs are classified according to the above method in a case that the subcarrier interval is 120 KHZ. Specifically, FIG. 8(a) shows a schematic diagram of configurations when the PRSs are classified into two groups according to an embodiment of the present disclosure, in a case that the subcarrier interval is 120 KHZ; FIG. 8(b) shows a schematic diagram of configurations when the PRSs are classified into three groups according to an embodiment of the present disclosure, in a case that the subcarrier interval is 120 KHZ; and FIG. 8(c) shows a schematic diagram of configurations when the PRSs are classified into four groups according to an embodiment of the present disclosure, in a case that the subcarrier interval is 120 KHZ.

As shown in FIG. 8(a), it is assumed that subcarriers are numbered as 11 to 0 from top to bottom. In this case, PRSs on subcarrier 11 occupy one RE, and the RE is assigned to a group 0; PRSs on subcarrier 10 occupy two REs, and the two REs are assigned to a group 1; PRSs on subcarrier 9 occupy two REs, and the two REs are assigned to the group 0; PRSs on subcarrier 8 occupy one RE, and the RE is assigned to the group 1; PRSs on subcarrier 7 occupy one RE, and the RE is assigned to the group 0; PRSs on subcarrier 6 occupy one RE, and the RE is assigned to the group 1; PRSs on subcarrier 5 occupy one RE, and the RE is assigned to the group 1; PRSs on subcarrier 4 occupy two REs, the REs are assigned to the group 0; PRSs on subcarrier 3 occupy two REs, and the two REs are assigned to the group 1; PRSs on subcarrier 2 occupy one RE, the RE is assigned to the group 0; PRSs on subcarrier 1 occupy one RE, and the RE is assigned to the group 1; PRSs on subcarrier 0 occupy one RE, the RE is assigned to the group 0.

As shown in FIG. 8(b), it is assumed that subcarriers are numbered as 11 to 0 from top to bottom. In this case, PRSs on subcarrier 11 occupy one RE, and the RE is assigned to the group 0; PRSs on subcarrier 10 occupy two REs, and the two REs are assigned to the group 1; PRSs on subcarrier 9 occupy two REs, and the two REs are assigned to the group 2; PRSs on subcarrier 8 occupy one RE, and the RE is assigned to the group 0; PRSs on subcarrier 7 occupy one RE, and the RE is assigned to the group 1; PRSs on subcarrier 6 occupy one RE, and the RE is assigned to the group 2; PRSs on subcarrier 5 occupy one RE, and the RE is assigned to the group 1; PRSs on subcarrier 4 occupy two REs, the two REs are assigned to the group 2; PRSs on subcarrier 3 occupy two REs, and the two REs are assigned to the group 0; PRSs on subcarrier 2 occupy one RE, the RE is assigned to the group 1; PRSs on subcarrier 1 occupy one RE, and the RE is assigned to the group 2; PRSs on subcarrier 0 occupy one RE, the RE is assigned to the group 0.

As shown in FIG. 8(c), it is assumed that subcarriers are numbered as 11 to 0 from top to bottom. In this case, PRSs on subcarrier 11 occupy one RE, and the RE is assigned to the group 0; PRSs on subcarrier 10 occupy two REs, and the two REs are assigned to the group 2; PRSs on subcarrier 9 occupy two REs, and the two REs are assigned to the group 0; PRSs on subcarrier 8 occupy one RE, and the RE is assigned to the group 2; PRSs on subcarrier 7 occupy one RE, and the RE is assigned to the group 0; PRSs on subcarrier 6 occupy one RE, and the RE is assigned to the group 2; PRSs on subcarrier 5 occupy one RE, and the RE is assigned to the group 1; PRSs on subcarrier 4 occupy two REs, the two REs are assigned to the group 3; PRSs on subcarrier 3 occupy two REs, and the two REs are assigned to the group 1; PRSs on subcarrier 2 occupy one RE, the RE is assigned to the group 3; PRSs on subcarrier 1 occupy one RE, and the RE is assigned to the group 1; PRSs on subcarrier 0 occupy one RE, the RE is assigned to the group 3.

Figure 9A:
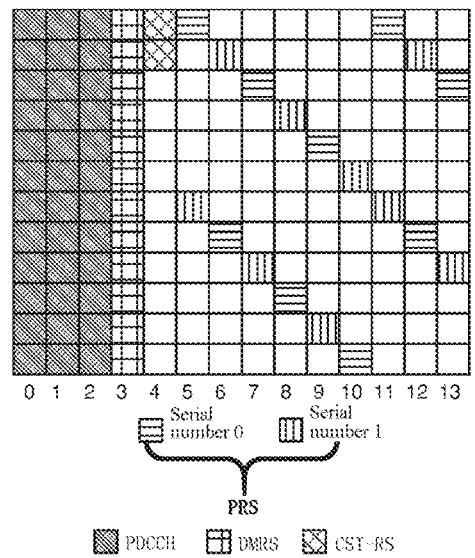
FIG. 9(a) shows a schematic diagram of configurations when PRSs are classified into two groups according to an embodiment of the present disclosure, in a case that the subcarrier interval is 240 KHZ or 480 KHz.
Figure 9B:
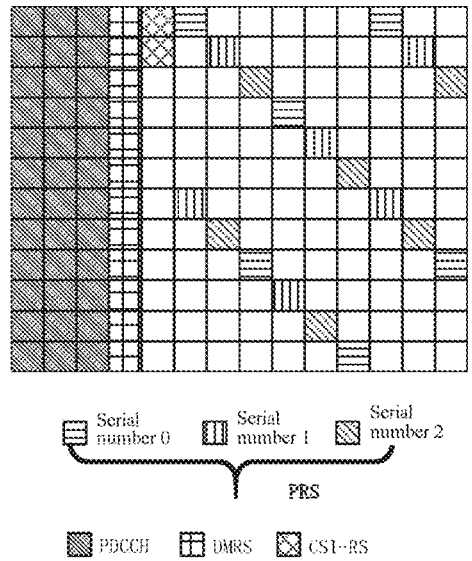
FIG. 9(b) shows a schematic diagram of configurations when PRSs are classified into three groups according to an embodiment of the present disclosure, in a case that the subcarrier interval is 240 KHZ or 480 KHZ.
Figure 9C:
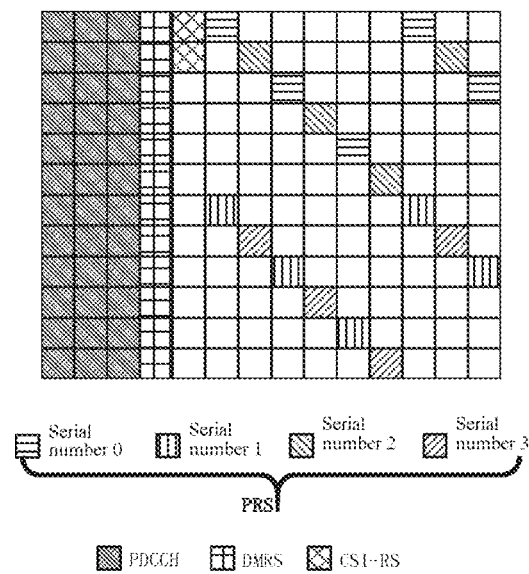
FIG. 9(c) shows a schematic diagram of configurations when PRSs are classified into four groups according to an embodiment of the present disclosure, in a case that the subcarrier interval is 240 KHZ or 480 KHZ.

FIG. 9(a) to FIG. 9(c) show cases that the PRSs are classified according to the above method in a case that the subcarrier interval is 240 KHZ or 480 KHZ. Specifically, FIG. 9(a) shows a schematic diagram of configurations when the PRSs are classified into two groups according to an embodiment of the present disclosure, in a case that the subcarrier interval is 240 KHZ or 480 KHZ; FIG. 9(b) shows a schematic diagram of configurations when the PRSs are classified into three groups according to an embodiment of the present disclosure, in a case that the subcarrier interval is 240 KHZ or 480 KHZ; and FIG. 9(c) shows a schematic diagram of configurations when the PRSs are classified into four groups according to an embodiment of the present disclosure, in a case that the subcarrier interval is 240 KHZ or 480 KHZ.

As shown in FIG. 9(a), it is assumed that subcarriers are numbered as 11 to 0 from top to bottom. In this case, PRSs on subcarrier 11 occupy two REs, and the two REs are assigned to a group 0; PRSs on subcarrier 10 occupy two REs, and the two REs are assigned to a group 1; PRSs on subcarrier 9 occupy two REs, and the two REs are assigned to the group 0; PRSs on subcarrier 8 occupy one RE, and the RE is assigned to the group 1; PRSs on subcarrier 7 occupy one RE, and the RE is assigned to the group 0; PRSs on subcarrier 6 occupy one RE, and the RE is assigned to the group 1; PRSs on subcarrier 5 occupy two REs, and the two REs are assigned to the group 1; PRSs on subcarrier 4 occupy two REs, the two REs are assigned to the group 0; PRSs on subcarrier 3 occupy two REs, and the two REs are assigned to the group 1; PRSs on subcarrier 2 occupy one RE, the RE is assigned to the group 0; PRSs on subcarrier 1 occupy one RE, and the RE is assigned to the group 1; PRSs on subcarrier 0 occupy one RE, the RE is assigned to the group 0.

As shown in FIG. 9(b), it is assumed that subcarriers are numbered as 11 to 0 from top to bottom. In this case, PRSs on subcarrier 11 occupy two REs, and the two REs are assigned to a group 10; PRSs on subcarrier 1 occupy two REs, and the two REs are assigned to a group 1; PRSs on subcarrier 9 occupy two REs, and the two REs are assigned to the group 2; PRSs on subcarrier 8 occupy one RE, and the RE is assigned to the group 0; PRSs on subcarrier 7 occupy one RE, and the RE is assigned to the group 1; PRSs on subcarrier 6 occupy one RE, and the RE is assigned to the group 2; PRSs on subcarrier 5 occupy two REs, and the two REs are assigned to the group 1; PRSs on subcarrier 4 occupy two REs, the two REs are assigned to the group 2; PRSs on subcarrier 3 occupy two REs, and the two REs are assigned to the group 0; PRSs on subcarrier 2 occupy one RE, the RE is assigned to the group 1; PRSs on subcarrier 1 occupy one RE, and the RE is assigned to the group 2; and PRSs on subcarrier 0 occupy one RE, the RE is assigned to the group 0.

As shown in FIG. 9(c), it is assumed that subcarriers are numbered as 11 to 0 from top to bottom. In this case, PRSs on subcarrier 11 occupy two REs, and the two REs are assigned to the group 0; PRSs on subcarrier 10 occupy two REs, and the two REs are assigned to the group 2; PRSs on subcarrier 9 occupy two REs, and the two REs are assigned to the group 0; PRSs on subcarrier 8 occupy one RE, and the RE is assigned to the group 2; PRSs on subcarrier 7 occupy one RE, and the RE is assigned to the group 0; PRSs on subcarrier 6 occupy one RE, and the RE is assigned to the group 2; PRSs on subcarrier 5 occupy two REs, and the two REs are assigned to the group 1; PRSs on subcarrier 4 occupy two REs, the two REs are assigned to the group 3; PRSs on subcarrier 3 occupy two REs, and the two REs are assigned to the group 1; PRSs on subcarrier 2 occupy one RE, the RE is assigned to the group 3; PRSs on subcarrier 1 occupy one RE, and the RE is assigned to the group 1; PRSs on subcarrier 0 occupy one RE, the RE is assigned to the group 3.

As shown in FIG. 6(a) to FIG. 9(c), the one or more REs on the same subcarrier occupied by the PRSs are assigned to one group. Practically, FIG. 6(a) to FIG. 9(c) are schematic rather than restrictive.

According to the embodiment of the present disclosure, step S230 may further include: assigning one or more REs on a same OFDM symbol occupied by the PRS to one group. That is, PRSs on OFDM symbol 0 to OFDM symbol 13 are assigned to different groups. That is, REs in different groups are orthogonal in the time domain, and REs in the same group may use the same time domain resource.

Figure 10A:
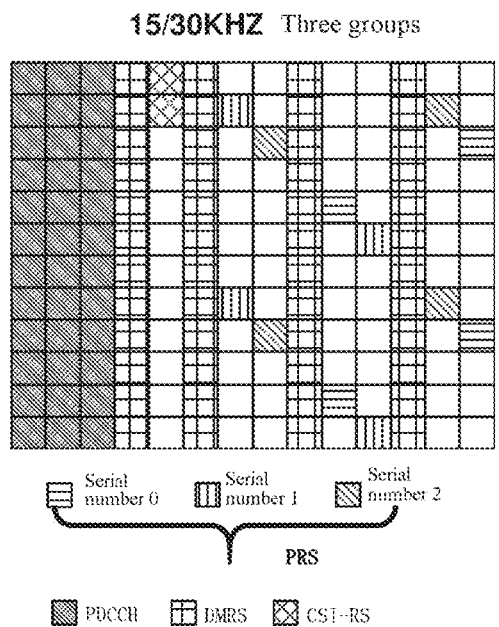
FIG. 10(a) shows a schematic diagram of configurations when PRSs are classified into three groups according to another embodiment of the present disclosure, in a case that the subcarrier interval is 15 KHZ or 30 KHZ.
Figure 10B:
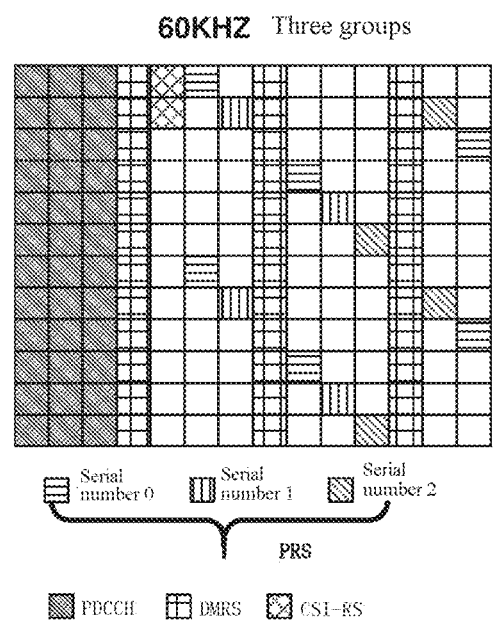
FIG. 10(b) shows a schematic diagram of configurations when PRSs are classified into three groups according to another embodiment of the present disclosure, in a case that the subcarrier interval is 60 KHZ.
Figure 10C:
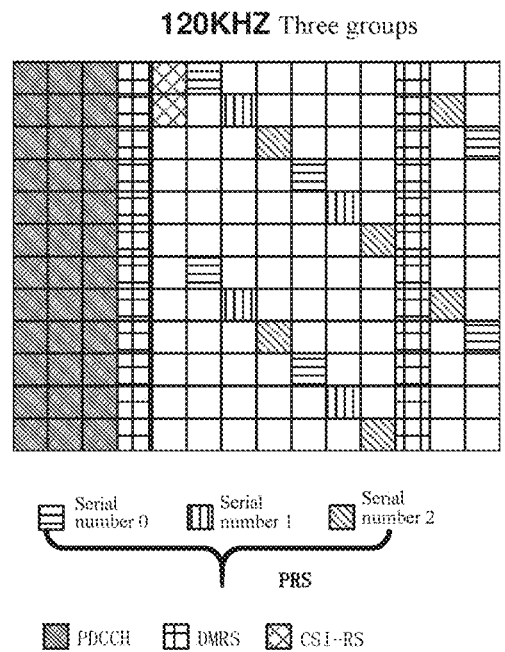
FIG. 10(c) shows a schematic diagram of configurations when PRSs are classified into three groups according to another embodiment of the present disclosure, in a case that the subcarrier interval is 120 KHZ.
Figure 10D:
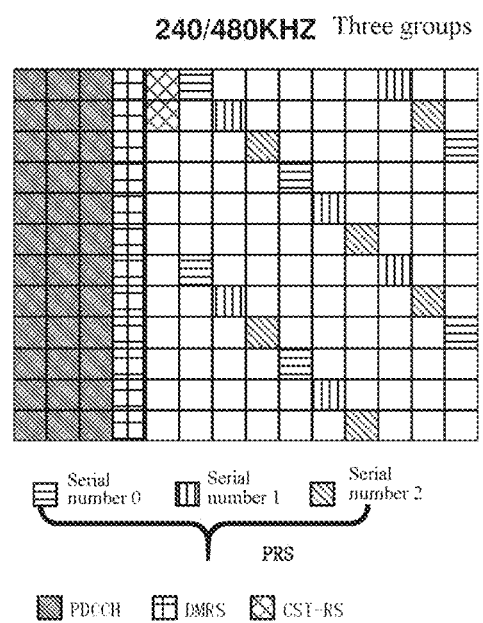
FIG. 10(d) shows a schematic diagram of configurations when PRSs are classified into three groups according to another embodiment of the present disclosure, in a case that the subcarrier interval is 240 KHZ or 480 KHZ.

FIG. 10(a) to FIG. 10(d) show that the PRSs are classified into three groups for example by using the above method under different subcarrier intervals. Specifically, FIG. 10(a) shows a schematic diagram of configurations when the PRSs are classified into three groups according to another embodiment of the present disclosure, in a case that the subcarrier interval is 15 KHZ or 30 KHZ; FIG. 10(b) shows a schematic diagram of configurations when the PRSs are classified into three groups according to another embodiment of the present disclosure, in a case that the subcarrier interval is 60 KHZ; FIG. 10(c) shows a schematic diagram of configurations when the PRSs are classified into three groups according to another embodiment of the present disclosure, in a case that the subcarrier interval is 120 KHZ; and FIG. 10(d) shows a schematic diagram of configurations when the PRSs are classified into three groups according to another embodiment of the present disclosure, in a case that the subcarrier interval is 240 KHZ or 480 KHZ.

As shown in FIG. 10(a), it is assumed that OFDM symbols are numbered as 0 to 13 from left to right. In this case, PRSs on OFDM symbol 6 occupy two REs, and the two REs are assigned to a group 1; PRSs on OFDM symbol 7 occupy two REs, and the two REs are assigned to a group 2; PRSs on OFDM symbol 9 occupy two REs, and the two REs are assigned to the group 0; PRSs on OFDM symbol 10 occupy two REs, and the two REs are assigned to the group 1; PRSs on OFDM symbol 12 occupy two REs, and the two REs are assigned to the group 2; PRSs on OFDM symbol 13 occupy two REs, and the two REs are assigned to the group 0.

As shown in FIG. 10(b), it is assumed that OFDM symbols are numbered as 0 to 13 from left to right. In this case, PRSs on OFDM symbol 5 occupy two REs, and the two REs are assigned to a group 0; PRSs on OFDM symbol 6 occupy two REs, and the two REs are assigned to a group 1; PRSs on OFDM symbol 8 occupy two REs, and the two REs are assigned to the group 0; PRSs on OFDM symbol 9 occupy two REs, and the two REs are assigned to the group 1; PRSs on OFDM symbol 10 occupy two REs, and the two REs are assigned to the group 2; PRSs on OFDM symbol 12 occupy two REs, and the two REs are assigned to the group 2; and PRSs on OFDM symbol 13 occupy two REs, and the two REs are assigned to the group 0.

As shown in FIG. 10(c), it is assumed that OFDM symbols are numbered as 0 to 13 from left to right. In this case, PRSs on OFDM symbol 5 occupy two REs, and the two REs are assigned to the group 0; PRSs on OFDM symbol 6 occupy two REs, and the two REs are assigned to the group 1; PRSs on OFDM symbol 7 occupy two REs, and the two REs are assigned to the group 2; PRSs on OFDM symbol 8 occupy two REs, and the two REs are assigned to the group 0; PRSs on OFDM symbol 9 occupy two REs, and the two REs are assigned to the group 1; PRSs on OFDM symbol 10 occupy two REs, and the two REs are assigned to the group 2; PRSs on OFDM symbol 12 occupy two REs, and the two REs are assigned to the group 2; PRSs on OFDM symbol 13 occupy two REs, and the two REs are assigned to the group 0.

As shown in FIG. 10(d), it is assumed that OFDM symbols are numbered as 0 to 13 from left to right. In this case, PRSs on OFDM symbol 5 occupy two REs, and the two REs are assigned to the group 0; PRSs on OFDM symbol 6 occupy two REs, and the two REs are assigned to the group 1; PRSs on OFDM symbol 7 occupy two REs, and the two REs are assigned to the group 2; PRSs on OFDM symbol 8 occupy two REs, and the two REs are assigned to the group 0; PRSs on OFDM symbol 9 occupy two REs, and the two REs are assigned to the group 1; PRSs on OFDM symbol 10 occupy two REs, and the two REs are assigned to the group 2; PRSs on OFDM symbol 11 occupy two REs, and the two REs are assigned to the group 1; PRSs on OFDM symbol 12 occupy two REs, and the two REs are assigned to the group 2; and PRSs on OFDM symbol 13 occupy two REs, and the two REs are assigned to the group 0.

As shown in FIG. 10(a) to FIG. 10(d), the one or more REs on the same OFDM symbol occupied by the PRS are assigned to one group. Practically, FIG. 10(a) to FIG. 10(d) are schematic rather than restrictive. In addition, the cases that the PRSs are classified into two groups or four groups are similar, and details are not repeated herein.

According to the embodiment of the present disclosure, step S230 may include: assigning one or more REs on the same subcarrier occupied by the PRS to different groups, and assigning one or more REs on the same OFDM symbol occupied by the PRS to different groups. That is, time domain positions and frequency domain positions of multiple REs in the same group are orthogonal.

Figure 11A:
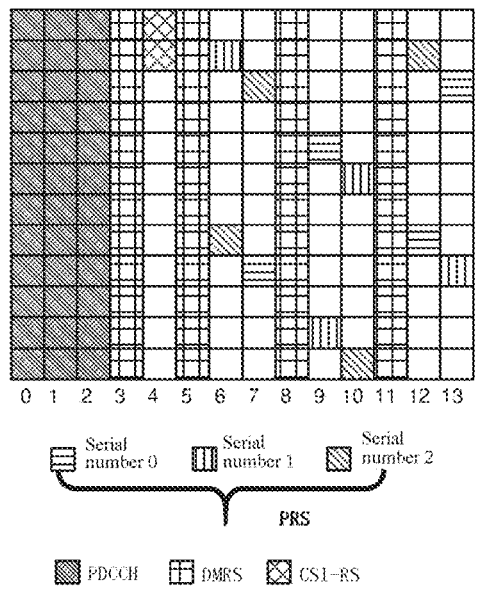
FIG. 11(a) shows a schematic diagram of configurations when PRSs are classified into three groups according to another embodiment of the present disclosure, in a case that the subcarrier interval is 15 KHZ or 30 KHZ.
Figure 11B:
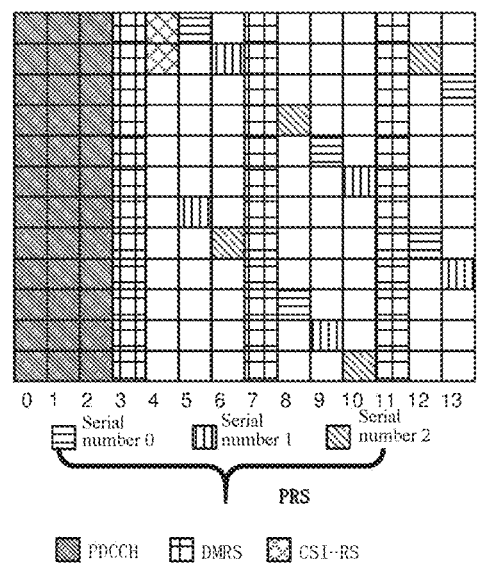
FIG. 11(b) shows a schematic diagram of configurations when PRSs are classified into three groups according to another embodiment of the present disclosure, in a case that the subcarrier interval is 60 KHZ.
Figure 11C:
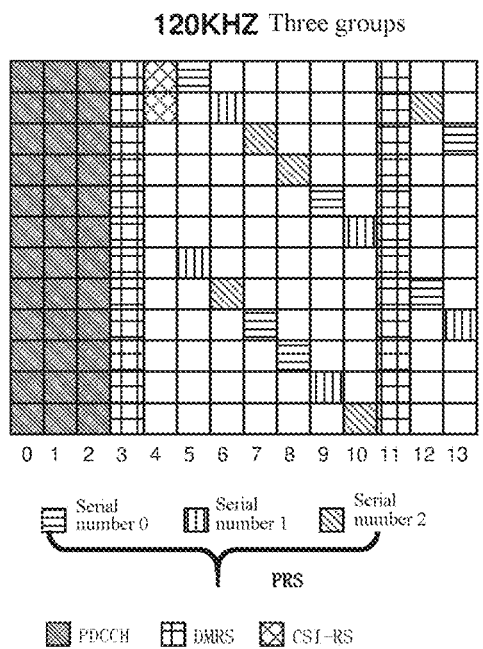
FIG. 11(c) shows a schematic diagram of configurations when PRSs are classified into three groups according to another embodiment of the present disclosure, in a case that the subcarrier interval is 120 KHZ.
Figure 11D:
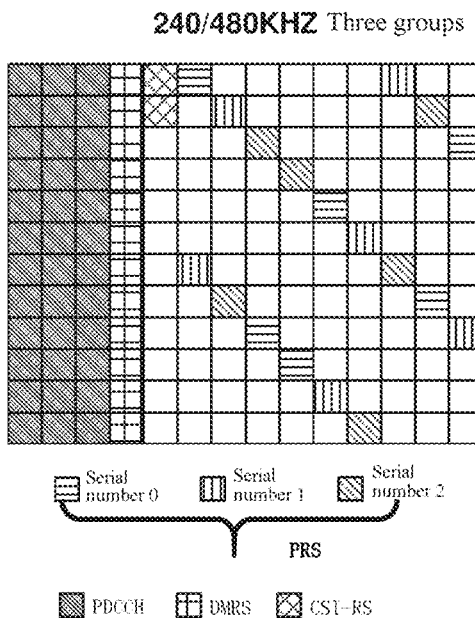
FIG. 11(d) shows a schematic diagram of configurations when PRSs are classified into three groups according to another embodiment of the present disclosure, in a case that the subcarrier interval is 240 KHZ or 480 KHZ.

FIG. 11(a) to FIG. 11(d) show that PRSs are classified into three groups for example by using the above method under different subcarrier intervals. Specifically, FIG. 11(a) shows a schematic diagram of configurations when PRSs are classified into three groups according to another embodiment of the present disclosure, in a case that the subcarrier interval is 15 KHZ or 30 KHZ; FIG. 11(b) shows a schematic diagram of configurations when PRSs are classified into three groups according to another embodiment of the present disclosure, in a case that the subcarrier interval is 60 KHZ; FIG. 11(c) shows a schematic diagram of configurations when PRSs are classified into three groups according to another embodiment of the present disclosure, in a case that the subcarrier interval is 120 KHZ; and FIG. 11(d) shows a schematic diagram of configurations when PRSs are classified into three groups according to another embodiment of the present disclosure, in a case that the subcarrier interval is 240 KHZ or 480 KHZ.

As shown in FIG. 11(a), from the view of time domain, PRSs on OFDM symbol 6 occupies two REs, and the two REs are assigned to different groups; PRSs on OFDM symbol 7 occupy two REs, and the two REs are assigned to different groups; PRSs on OFDM symbol 9 occupy two REs, and the two REs are assigned to different groups; PRSs on OFDM symbol 10 occupy two REs, and the two REs are assigned to different groups; PRSs on OFDM symbol 12 occupy two REs, and the two REs are assigned to different groups; and PRSs on OFDM symbol 13 occupy two REs, and the two REs are assigned to different groups. From the view of frequency domain, PRSs on subcarrier 10 occupy two REs, and the two REs are assigned to different groups; PRSs on subcarrier 9 occupy two REs, and the two REs are assigned to different groups; PRSs on subcarrier 4 occupy two REs, and the two REs are assigned to different groups; and PRSs on subcarrier 3 occupy two REs, and the two REs are assigned to different groups. FIG. 11(b), FIG. 11(c) and FIG. 11(d) show similar cases, and details are not described herein.

As shown in FIG. 11(a) to FIG. 11(d), one or more REs on the same OFDM symbol occupied by the PRS are assigned to different groups, and one or more REs on the same subcarrier occupied by PRS are assigned to different groups. Practically, FIG. 11(a) to FIG. 11(d) are schematic rather than restrictive. In addition, the cases that the PRSs are classified into two groups or four groups are similar, and details are not repeated herein.

For embodiments in which the one or more REs on the same subcarrier occupied by PRSs are assigned to different groups and the one or more REs on the same OFDM symbol occupied by PRSs are assigned to different groups, a time domain position and a frequency domain position of each RE are determined according to the following equations (5) to (21) in the present disclosure. Similarly, the position of the RE occupied by the PRS is indicated by coordinates (1, k). In which, 1 indicates a coordinate of the time domain position of the RE, and k indicates a coordinate of the frequency domain position of the RE. That is, the RE occupied by the PRS is located on the 1-th OFDM symbol in the time domain, and is located on the k-th subcarrier in the frequency domain. In which, 1=[0, 13], $$k = \left[ 12 \text{ floor}\left(\frac{N_{BWP}^{Size} - N_{RB}^{new}}{2}\right), 12\left(N_{RB}^{new} + \text{floor}\left(\frac{N_{BWP}^{Size} - N_{RB}^{new}}{2}\right)\right) - 1 \right].$$

In a case that the PRSs are classified into two groups, $$k = 12\left(m + \text{floor}\left(\frac{N_{BWP}^{Size} - N_{RB}^{new}}{2}\right)\right) + \quad (5)$$
$$(16 - l + v_{shift})\text{mod}6 + 6n + 6(1 - 2n)(l \mod 2)$$

-continued $$l = \begin{cases} 6, 7, 9, 10, 12, 13 & \Delta f = 15\ (30)\ \text{kHz} \\ 5, 6, 8, 9, 10, 12, 13 & \Delta f = 60\ \text{kHz} \\ 5, 6, 7, 8, 9, 10, 12, 13 & \Delta f = 120\ \text{kHz} \\ 5, 6, 7, 8, 9, 10, 11, 12, 13 & \Delta f = 240\ (480)\ \text{kHz} \end{cases} \quad (6)$$

$$m = 0, 1, \ldots, N_{RB}^{new} - 1 \quad (7)$$

$$v_{shift} = N_{ID}^{cell} \bmod 6 \quad (8)$$

$$n = 0, 1. \quad (9)$$

In which, $N_{BWP}^{size}$ indicates a bandwidth for transmitting downlink data, and is specifically a ratio of the bandwidth for transmitting downlink data and the bandwidth occupied by one RB; $N_{RB}^{new}$ indicates the bandwidth for transmitting PRS, and is specifically a ratio of the bandwidth for transmitting PRS and the bandwidth occupied by one RB; and $N_{ID}^{cell}$ indicates physical layer identification of a cell where a user equipment to be positioned is located. In addition, $N_{RB}^{new} \leq N_{BWP}^{size}$, indicates a serial number of the group, $\Delta f$ indicates the subcarrier interval, and floor ( ) indicates rounding down.

That is, for the case that the PRSs are classified into two groups, the time domain position of the RE of a certain group may be determined according to the subcarrier interval, and the frequency domain position of the RE of the group is determined according to the time domain position of the RE and the serial number of the group. Further, the frequency domain position of the RE of the group may be determined according to at least one of the following parameters: physical layer cell identification of a cell where a user equipment to be positioned is located; a bandwidth for transmitting PRS; and a bandwidth for transmitting downlink data.

In a case that the PRSs are classified into three groups, $$k = k_0 + \bar{k} \quad (10)$$

$$k_0 = 12\left(m + \text{floor}\left(\frac{N_{BWP}^{Size} - N_{RB}^{new}}{2}\right)\right) + (16 - l + v_{shift}) \bmod 6 \quad (11)$$

$$\bar{k} = \begin{cases} 6 & (n = 0\ \text{并且}\ l = 5, 9, 13) \\ \text{或者} & (n = 1\ \text{并且}\ l = 6, 10, 11) \\ \text{或者} & (n = 2\ \text{并且}\ l = 7, 8, 12) \\ 0 & \text{其它} \end{cases} \quad (12)$$

$$l = \begin{cases} 7, 9, 12, 13 & n = 0\ \text{并且}\ \Delta f = 15\ (30)\ \text{kHz} \\ 6, 9, 10, 13 & n = 1\ \text{并且}\ \Delta f = 15\ (30)\ \text{kHz} \\ 6, 7, 10, 12 & n = 2\ \text{并且}\ \Delta f = 15\ (30)\ \text{kHz} \\ 5, 8, 9, 12, 13 & n = 0\ \text{并且}\ \Delta f = 60\ \text{kHz} \\ 5, 6, 9, 10, 13 & n = 1\ \text{并且}\ \Delta f = 60\ (120)\ \text{kHz} \\ 6, 8, 10, 12 & n = 2\ \text{并且}\ \Delta f = 60\ \text{kHz} \\ 5, 7, 8, 9, 12, 13 & n = 0\ \text{并且}\ \Delta f = 120\ (240, 480)\ \text{kHz} \\ 6, 7, 8, 10, 12 & n = 2\ \text{并且}\ \Delta f = 120\ \text{kHz} \\ 5, 6, 9, 10, 11, 13 & n = 1\ \text{并且}\ \Delta f = 240\ (480)\ \text{kHz} \\ 6, 7, 8, 10, 11, 12 & n = 2\ \text{并且}\ \Delta f = 240\ (480)\ \text{kHz} \end{cases} \quad (13)$$

$$m = 0, 1, \ldots, N_{RB}^{new} - 1 \quad (14)$$

$$v_{shift} = N_{ID}^{cell} \bmod 6 \quad (15)$$

$$n = 0, 1, 2. \quad (16)$$

In which, $N_{BWP}^{size}$ indicates the bandwidth for transmitting downlink data, and is specifically a ratio of the bandwidth for transmitting downlink data and the bandwidth occupied by one RB; $N_{RB}^{new}$ indicates the bandwidth for transmitting PRS, and is specifically a ratio of the bandwidth for transmitting the PRS and the bandwidth occupied by one RB; and $N_{ID}^{cell}$ indicates physical layer cell identification of a cell where a user equipment to be positioned is located. In addition, $N_{RB}^{new} \leq N_{BWP}^{size}$, n indicates a serial number of the group, $\Delta f$ indicates the subcarrier interval, and floor ( ) indicates rounding down.

That is, for the case that the PRSs are classified into three groups, the time domain position of the RE of the group may be determined according to the subcarrier interval and the serial number of the group, and the frequency domain position of the RE of the group is determined according to the time domain position of the RE and the serial number of the group. Further, the frequency domain position of the RE of the group may be determined according to at least one of the following parameters: physical layer cell identification of a cell where a user equipment to be positioned is located; a bandwidth for transmitting PRS; and a bandwidth for transmitting downlink data.

In a case that the PRSs are classified into four groups, $$k = 12\left(m + \text{floor}\left(\frac{N_{BWP}^{Size} - N_{RB}^{new}}{2}\right)\right) + \quad (17)$$
$$(16 - l + v_{shift}) \bmod 6 + 6((n + 1) \bmod 2)$$

$$l = \begin{cases} 7, 9, 13 & n = 0\ (1)\ \text{并且}\ \Delta f = 15\ (30)\ \text{kHz} \\ 6, 10, 12 & n = 2\ (3)\ \text{并且}\ \Delta f = 15\ (30)\ \text{kHz} \\ 5, 9, 13 & n = 0\ (1)\ \text{并且}\ \Delta f = 60\ \text{kHz} \\ 6, 8, 10, 12 & n = 2\ (3)\ \text{并且}\ \Delta f = 60(120, 240, 480)\ \text{kHz} \\ 5, 7, 9, 13 & n = 0\ (1)\ \text{并且}\ \Delta f = 120\ \text{kHz} \\ 5, 7, 9, 11, 13 & n = 0\ (1)\ \text{并且}\ \Delta f = 240\ (480)\ \text{kHz} \end{cases} \quad (18)$$

$$m = 0, 1, \ldots, N_{RB}^{new} - 1 \quad (19)$$

$$v_{shift} = N_{ID}^{cell} \bmod 6 \quad (20)$$

$$n = 0, 1, 2, 3. \quad (21)$$

In which, $N_{BWP}^{size}$ indicates the bandwidth for transmitting downlink data, and is specifically a ratio of the bandwidth for transmitting downlink data and the bandwidth occupied by one RB; $N_{RB}^{new}$ indicates the bandwidth for transmitting PRS, and is specifically a ratio of the bandwidth for transmitting the PRS and the bandwidth occupied by one RB; and $N_{ID}^{cell}$ indicates physical layer cell identification of a cell where a user equipment to be positioned is located. In addition, $N_{RB}^{new} \leq N_{BWP}^{size}$, n indicates a serial number of the group, $\Delta f$ indicates the subcarrier interval, and floor ( ) indicates rounding down.

That is, for the case that the PRSs are classified into four groups, the time domain position of the RE of the group may be determined according to the subcarrier interval and the serial number of the group, and the frequency domain position of the RE of the group is determined according to the time domain position of the RE and the serial number of the group. Further, the frequency domain position of the RE of the group may be determined according to at least one of the following parameters: physical layer cell identification of a cell where a user equipment to be positioned is located; a bandwidth for transmitting the PRS; and a bandwidth for transmitting downlink data.

As described above, according to the embodiment of the present disclosure, the designed PRSs are classified, to assign to different network side devices for positioning a user equipment. In this way, multiple network side devices cooperate to position the user equipment, thereby saving positioning time. In addition, the classified PRSs can be used for beamforming and positioning based on a beam angle, so that the positioning is more accurate. In this way, the PRSs can be designed more reasonably for the NR communication system, thereby optimizing positioning of the user equipment.

<2.3 Correct Positions of PRSs>

According to the embodiment of the present disclosure, in order to diversify and rationalize the design of PRSs, the position of the PRS may be corrected after the PRSs are classified.

Figure 12:
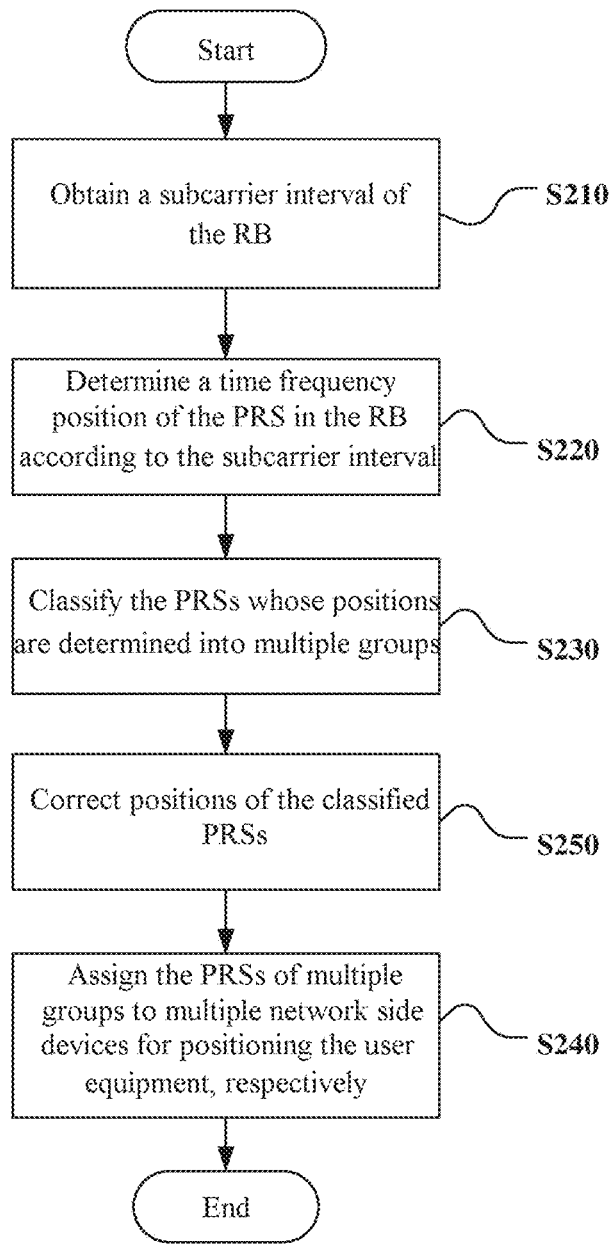
FIG. 12 shows a flowchart of a method for classifying PRSs and correcting positions of the PRSs according to an embodiment of the present disclosure.

FIG. 12 shows a flowchart of a method for classifying PRSs and correcting positions of PRSs according to an embodiment of the present disclosure. As shown in FIG. 12, in step S250 before step S240, the position of the classified PRS is corrected. Subsequently, in step S240, PRSs of multiple groups are assigned to multiple network side devices, respectively. Here, the PRSs assigned to multiple network side devices may be PRSs subjected to position correcting.

According to the embodiment of the present disclosure, step S250 may include: setting an offset parameter to correct the position of the PRS. Specifically, the offset parameter may be used to shift the frequency domain position of the RE occupied by the PRS, that is, shifting the frequency position of the RE of a certain group by subcarriers of which the number is equal to an offset parameter for the group. Therefore, the correcting or shifting of the position of the PRS may also be referred to as frequency shift of the position of the PRS.

According to the embodiment of the present disclosure, the offset parameter may include: offset parameters based on a group and/or offset parameters based on a user equipment. Here, it is assumed that $V_{shift}^n$ indicates the offset parameter, $V_{shift}^n$ indicates the offset parameter based on the group, and $V_{UEshift}^n$ indicates the offset parameter based on the user equipment. The following equations (22) to (24) can be obtained:

$$V_{shift}^n = V_{gshift}^n \quad (22)$$

$$V_{shift}^n = V_{UEshift}^n \quad (23)$$

$$V_{shift}^n = V_{gshift}^n + V_{UEshift}^n \quad (24).$$

As shown in equation (22), the offset parameter includes the offset parameter based on the group. As shown in equation (23), the offset parameter includes the offset parameter based on the user equipment. As shown in equation (24), the offset parameter includes the offset parameter based on the group and the offset parameter based on the user equipment. According to the embodiment of the present disclosure, after the frequency domain position k of the RE occupied by the PRS of each group is determined as described above, a value of k may be corrected by using $V_{shift}^n$, for example, adding value of $V_{shift}^n$ with the value of k.

According to the embodiment of the present disclosure, the offset parameter based on the group $V_{gshift}^n$ may be determined based on a serial number n of the group. That is, the position of the PRS subjected to classifying may be corrected according to the serial number of the group. For example, $V_{gshift}^n$ may be calculated according to the following equation:

$$v_{gshift}^n = \overline{p}_n \quad (25).$$

In which, $\overline{p}_n$ is a function of the serial number n of the group, including but not limited to linear function, quadratic function, exponential function, power function. Types of the function are not limited in the present disclosure Further, according to the embodiment of the present disclosure, when the offset parameter based on the group is determined according to the serial number of the group, the REs of different groups may conflict after being subjected to frequency domain position shifting. Therefore, the equation (25) may be corrected to obtain equation (26) as follows:

$$v_{gshift}^n = \overline{p}_n + p_{n0} \quad (26).$$

In which, in a case that the REs of different groups conflict after being subjected to the frequency domain position shifting based on the group, $p_{n0}=n$; in a case that the REs of different groups do not conflict after being subjected to the frequency domain position shifting, $p_{n0}=0$. That is, in a case that the offset parameter based on the group is determined according to the serial number of the group and the REs of different groups conflict after being subjected to the frequency domain position shifting, extra shifting $p_{n0}$ may be performed, to solve the conflict FIG. 13 and FIG. 14 show schematic diagrams of configurations when frequency shifting based on a group is performed on a position of the PRS according to an embodiment of the present disclosure.

Figure 13:
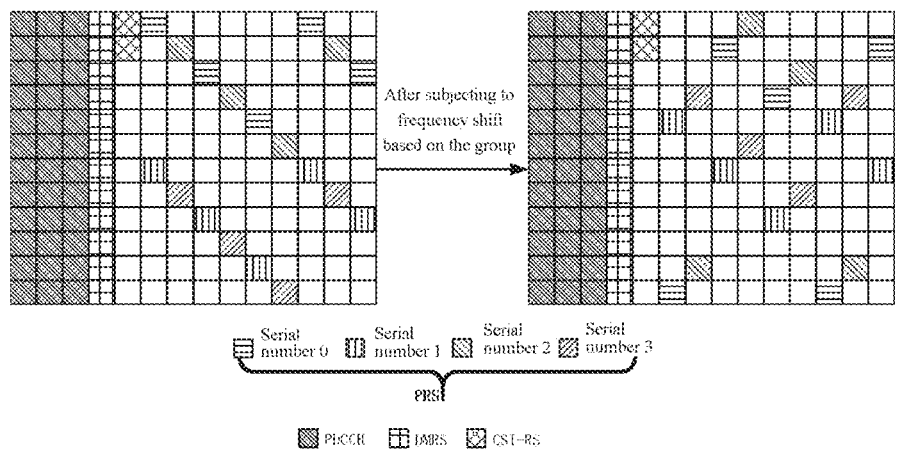
FIG. 13 shows a schematic diagram of configuring positions of PRSs by frequency shifting based on the group according to an embodiment of the present disclosure.

In FIG. 13, the schematic diagram of configurations of the classified PRSs is shown by a left diagram. In which, the number of groups N is 4, that is, serial numbers of the groups n are 0, 1, 2 and 3. It is assumed that $\overline{p}_n=n+1$. That is, an offset parameter based on the group of group 0 is $v_{gshift}^0=1+p_{n0}$; an offset parameter based on the group of group 1 is $v_{gshift}^1=2+p_{n0}$; an offset parameter based on the group of group 2 is $v_{gshift}^2=3+p_{n0}$; and an offset parameter based on the group of group 3 is $v_{gshift}^3=4+p_{n0}$.

As shown by a right diagram of FIG. 13, after subjecting to the frequency shifting based on the group, a frequency domain position of the RE occupied by the PRS of the group 0 shifts upward by one subcarrier, a frequency domain position of the RE occupied by the PRS of the group 1 shifts upward by two subcarriers, a frequency domain position of the RE occupied by the PRS of the group 2 shifts upward by three subcarriers, and a frequency domain position of the RE occupied by the PRS of the group 3 shifts upward by four subcarriers. In the example shown in FIG. 13, the positions of the REs do not conflict, and thus $P_{n0}$ of each group is 0.

Figure 14:
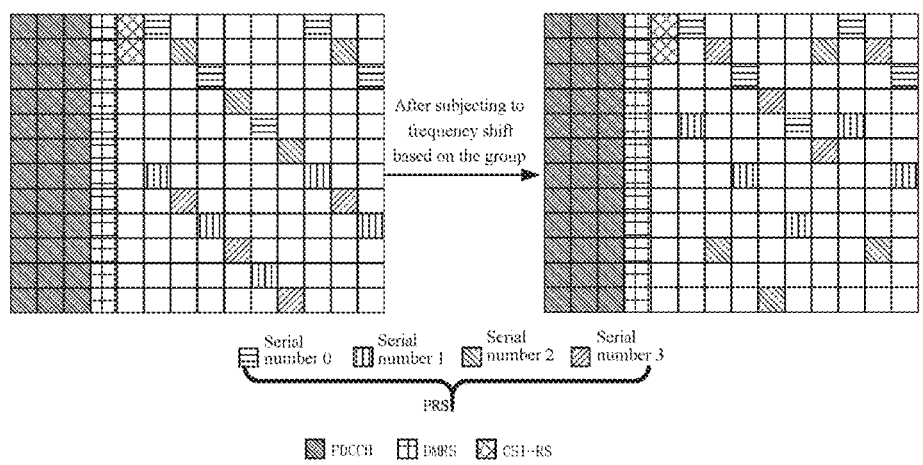
FIG. 14 shows a schematic diagram of configuring positions of PRSs by frequency shifting based on the group according to an embodiment of the present disclosure.

In FIG. 14, the schematic diagram of configurations of the classified PRSs is shown by a left diagram. In which, the number of groups N is 4, that is, serial numbers of the groups n are 0, 1, 2 and 3. It is assumed that $\overline{p}_n=2n$. That is, an offset parameter based on the group of group 0 is $v_{gshift}^0=0+p_{n0}$; an offset parameter based on the group of group 1 is $v_{gshift}^1=2+p_{n0}$; an offset parameter based on the group of group 2 is $v_{gshift}^2=4+p_{n0}$; and an offset parameter based on the group of group 3 is $v_{gshift}^3=6+p_{n0}$.

As shown by a right diagram of FIG. 14, after subjecting to the frequency shifting based on the group, a frequency domain position of the RE occupied by the PRS of the group 0 does not shift, a frequency domain position of the RE occupied by the PRS of the group 1 shifts upward by two subcarriers, a frequency domain position of the RE occupied by the PRS of the group 2 shifts upward by four subcarriers, and a frequency domain position of the RE occupied by the PRS of the group 3 shifts upward by six subcarriers. In the example shown in FIG. 14, the positions of the REs do not conflict, and thus $P_{n0}$ of each group is 0.

The offset parameter $V_{gshift}^n$ based on the group is described in detail above, and the offset parameter $V_{UEshift}^n$ based on the user equipment is described in detail below.

According to the embodiment of the present disclosure, an offset parameter $V_{UEshift}^n$ based on the user equipment assigned to a certain network side device may be determined according to at least one of the following parameters: link quality between the network side device and the user equipment; and identification of the user equipment. Here, the link quality between the network side device and the user equipment may include link quality on each subcarrier of the RB between the network side device and the user equipment. That is, the position of the classified PRS may be corrected according to the link quality between the network side device and the user equipment and/or the identification of the user equipment. The following equations may be obtained:

$$v_{UEshift}^n = p_{UEn} \quad (27)$$

$$v_{UEshift}^n = p_{RNTI} \quad (28)$$

$$v_{UEshift}^n = p_{UEn} + p_{RNTI} \quad (29)$$

In which, $p_{UEn}$ indicates an offset parameter related to the link quality between the network side device and the user equipment, and $p_{RNTI}$ indicates an offset parameter related to the identification of the user equipment According to the embodiment of the present disclosure, after the shifting based on the user equipment is performed, REs of different groups may conflict. Therefore, extra shifting $P_{n0}$ may be performed to solve the conflict. Similarly, in a case that REs of different groups conflict after being subjected to the frequency domain position shifting based on the user equipment, $P_{n0}=n$; in a case that REs of different groups do not conflict after being subjected to the frequency domain position shifting based on the user equipment, $P_{n0}=0$. That is, an extra offset parameter $P_{n0}$ may be added to the equations (27) to (29), to obtain the following equations (30) to (32):

$$v_{UEshift}^n = p_{UEn} + p_{n0} \quad (30)$$

$$v_{UEshift}^n = p_{RNTI} + p_{n0} \quad (31)$$

$$v_{UEshift}^n = p_{UEn} + p_{RNTI} + p_{n0} \quad (32).$$

According to the embodiment of the present disclosure, as shown by equations (28) and (31), the offset parameter based on the user equipment may be determined according to the identification of the user equipment, including but not limited to RNTI (Radio Network Tempory Identity). For example, may be a function of the identification of the user equipment, and types of the function are not limited in the present disclosure. Here, the identification of the user equipment is irrelevant to the group, and thus the offset parameters based on the user equipment are the same for different groups.

Figure 15:
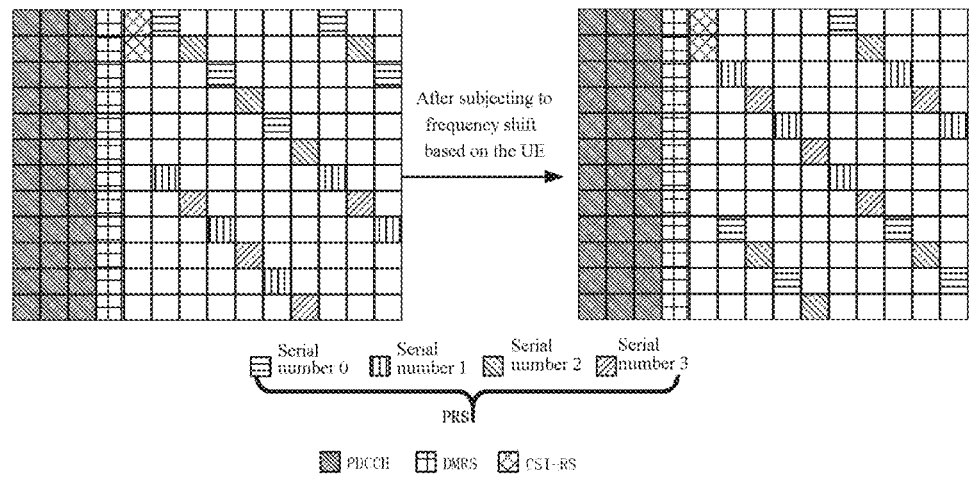
FIG. 15 shows a schematic diagram of configuring positions of PRSs by frequency shifting based on UE according to an embodiment of the present disclosure.

FIG. 15 shows a schematic diagram of configurations when frequency shifting based on UE is performed on a position of the PRS according to an embodiment of the present disclosure. Here, in FIG. 15, the schematic diagram of configurations of the classified PRSs is shown by a left diagram. In which, the number of groups N is 4. That is, serial numbers of the groups n are 0, 1, 2 and 3. It is assumed that the offset parameter based on the user equipment is determined based on the identification of the user equipment and $p_{RNTI}=4$. Therefore, $v_{UEshift}^0 = v_{UEshift}^1 = v_{UEshift}^2 = v_{UEshift}^3 = 4$. As shown by a right diagram of FIG. 15, after subjecting to the shifting based on the user equipment, the frequency domain position of the RE occupied by the PRS of each of the groups 0, 1, 2 and 3 shifts upward by four subcarriers. In the example shown in FIG. 15, the positions of the REs do not conflict, and thus $P_{n0}$ of each group is 0.

According to the embodiment of the present disclosure, as shown by equations (27) to (30), the offset parameter of the user equipment may be determined according to link quality of each subcarrier between the network side device and the user equipment. Further, the RE occupied by the PRS may be shifted to a subcarrier with better link quality.

Figure 16:
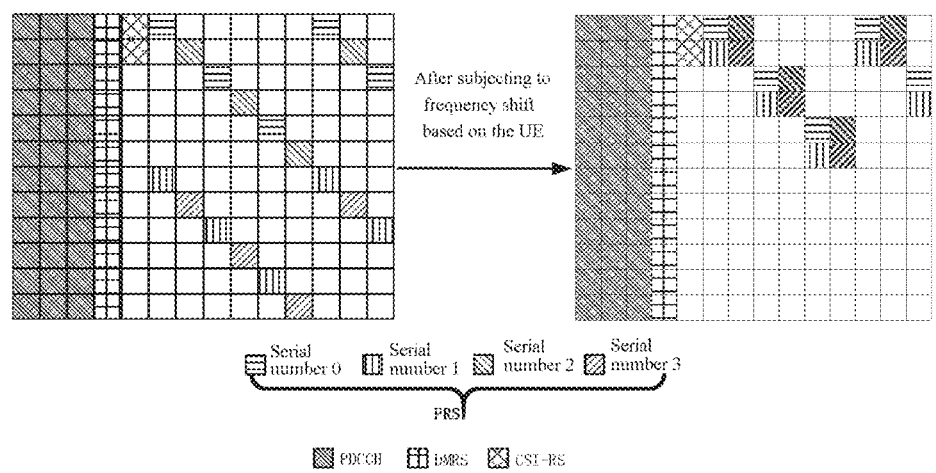
FIG. 16 shows a schematic diagram of configuring positions of PRSs by frequency shifting based on UE according to an embodiment of the present disclosure.

FIG. 16 shows a schematic diagram of configurations when frequency shifting based on UE is performed on the position of the PRS according to an embodiment of the present disclosure. Here, in FIG. 16, the schematic diagram of configurations of the classified PRS is shown by a left diagram. In which, the number of groups N is 4, that is, serial numbers of the groups n are 0, 1, 2 and 3. It is assumed that the offset parameter based on the user equipment is determined based on the link quality of each subcarrier between the network side device and the user equipment. Further, it is assumed that link quality between different network side devices and the user equipment is similar, and link quality of subcarriers 6-11 is better than link quality of subcarriers 0-5. That is, for links between all network side devices and the user equipment, link quality of subcarriers 6-11 is better than link quality of subcarriers 0-5. As shown by a right diagram of FIG. 16, after subjecting to the shifting based on the user equipment, the RE occupied by the PRS of each of the groups 0, 1, 2 and 3 shifts to subcarriers 6-11. In the example shown in FIG. 16, the positions of the REs do not conflict, and thus $P_{n0}$ of each group is 0.

According to the embodiment of the present disclosure, as shown by equations (29) and (32), the offset parameter based on the user equipment may be determined according to the link quality between the network side device and the user equipment and the identification of the user equipment. That is, shifting may be performed based on the identification of the user equipment, and then the RE occupied by the PRS is shifted to a subcarrier with better link quality.

Figure 17:
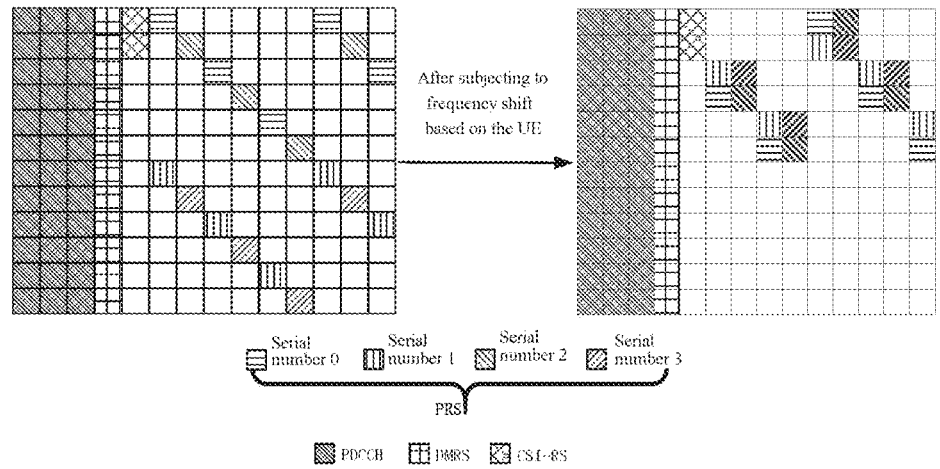
FIG. 17 shows a schematic diagram of configuring positions of PRSs by frequency shifting based on UE according to an embodiment of the present disclosure.

FIG. 17 shows a schematic diagram of configurations when frequency shifting based on UE is performed on a position of the PRS according to an embodiment of the present disclosure. As shown in FIG. 17, the schematic diagram of configurations of the classified PRS is shown by a left diagram. In which, the number of groups N is 4, that is, serial numbers of the groups are 0, 1, 2 and 3. It is assumed that link quality between different network side devices and the user equipment is similar, link quality of subcarriers 6-11 is better than link quality of subcarriers 0-5, and $p_{RNTI}=4$. As shown by a right diagram of FIG. 17, based on FIG. 15, the RE occupied by the PRS of each group is shifted to subcarriers 6-11. In the example shown in FIG. 17, the positions of the REs do not conflict, and $P_{n0}$ of each group is 0.

The offset parameter based on the group $V_{gshift}^n$ and the offset parameter based on the user equipment $V_{UEshift}^n$ are described in detail above. According to the embodiment of the present disclosure, the offset parameter based on the group and the offset parameter based on the user equipment may be used in combination to correct the position of the PRS, and details are not repeated in the present disclosure.

As described above, according to the embodiment of the present disclosure, the frequency domain position of the classified PRS may be shifted by using the offset parameter. The offset parameter may include the offset parameter based on the group and the offset parameter based on the user equipment. The offset parameter based on the group is related to the serial number of the group, the offset parameter based on the user equipment is irrelevant to the serial number of the group, and is related to information of the user equipment, for example identification of the user equipment, and/or link quality of each subcarrier between the network side device and the user equipment. That is, according to the embodiment of the present disclosure, the position of the PRS assigned to the network side device may be corrected according to at least one of the following parameters: link quality between the network side device and the user equipment; identification of the user equipment; and the serial number of the group. In this way, the design of the PRS can be enriched and diversified. In addition, the PRSs are designed in consideration of information related to the user equipment and the group, so that the PRSs are designed more reasonably.

As described above, according to the embodiment of the present disclosure, the PRS for the NR communication system may be designed according to different subcarriers. Further, the PRSs may be classified into multiple groups to allocate to multiple network side devices for positioning the user equipment. In addition, in order to rationalize and diversify the design of the PRSs, the position of the PRS may be corrected. In this way, the PRSs can be designed more reasonably for the NR communication system, thereby optimizing the positioning of the user equipment.

<3. Examples of Configurations of a Network Side Device>

Figure 18:
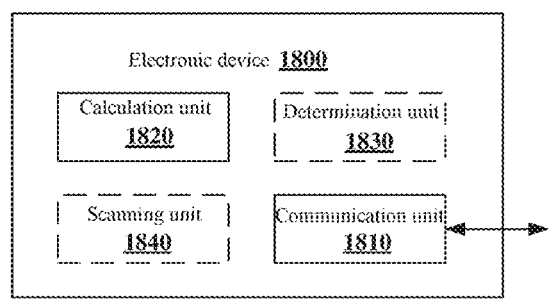
FIG. 18 shows a block diagram of an example of configurations of an electronic device according to an embodiment of the present disclosure.

FIG. 18 shows a block diagram of an example of configurations of an electronic device 1800 according to an embodiment of the present disclosure. The electronic device 1800 here may function as a network side device in a wireless communication system, for example, functioning as a base station device or TRP in a wireless communication system such as an NR wireless communication system.

As shown in FIG. 18, the electronic device 1800 may include a communication unit 1810 and a calculation unit 1820.

Here, units of the electronic device 1800 may be included in processing circuitry. It should be noted that, the electronic device 1800 may include one or more processing circuitry. Further, the processing circuit may include various discrete functional units to perform various different functions and/or operations. It should be noted that, the functional units may be physical entities or logical entities, and units with different names may be implemented by the same physical entity.

According to the embodiment of the present disclosure, the communication unit 1810 may acquire a serial number of the electronic device 1800 among a group composed of electronic devices for positioning a user equipment. As described above, the electronic devices for positioning the user equipment each may be network side devices, and the group includes multiple network side devices. The serial number may be n, n=[0, N−1], where N indicates the number of electronic devices included in the group.

According to the embodiment of the present disclosure, the calculation unit 1820 may determine a time frequency position of a PRS of the electronic device 1800 according to the serial number of the electronic device 1800 in the group.

As described above, according to the embodiment of the present disclosure, the electronic device 1800 may determine the time frequency position of the PRS of the electronic device 1800 according to the serial number of the electronic device 1800 among the group composed of electronic devices for positioning the user equipment, so that the electronic devices in the group can cooperate to position the user equipment, thereby saving positioning time.

According to the embodiment of the present disclosure, a positioning server or an electronic device providing service for the user equipment determines the group composed of electronic devices for positioning the user equipment and a serial number of each electronic device in the group. The positioning server includes but not limited to E-SMLC (Evolved Serving Mobile Location Center).

That is, according to the embodiment of the present disclosure, the communication unit 1810 may receive the serial number of the electronic device 1800 and other information of the group from the positioning server. In addition, other electronic device in the group may also receive a serial number of other electronic device in the group and other information of the group from the positioning server.

According to the embodiment of the present disclosure, in a case that the electronic device 1800 is not a network side device providing service for the user equipment, the electronic device 1800 may receive the serial number of the electronic device 1800 in the group and other information of the group from other electronic device in the group, that is, a network side device providing service for the user equipment. In addition, an electronic device in the group other than the electronic device 1800 and the network side device providing service for the user equipment, may receive a serial of the electronic device in the group and other information of the group from the network side device providing service for the user equipment.

According to the embodiment of the present disclosure, in a case that the electronic device 1800 is a network side device providing service for the user equipment, the electronic device 1800 may determine the group of electronic devices for positioning the user equipment and a serial number of each electronic device in the group.

As shown in FIG. 18, the electronic device 1800 may include a determination unit 1830 configured to determine the group of electronic devices for positioning the user equipment and a serial number of each electronic device in the group.

According to the embodiment of the present disclosure, the determination unit 1830 may determine the group composed of electronic devices for positioning the user equipment from multiple network side devices. Here, multiple network side devices may be located in a certain range around the user equipment. The determination unit 1830 may select network side devices from the multiple network side devices to form the group. Generally, since the electronic device 1800 is a network side device providing service for the user equipment, the group includes the electronic device 1800.

According to the embodiment of the present disclosure, the determination unit 1830 may select network side devices to form the group from the multiple network side devices according to at least one of the following parameters: link quality between each of the multiple network side devices and the user equipment; a position of each network side device; a coverage of each network side device; and antenna array information of each network side device.

According to the embodiment of the present disclosure, each network side device may report its position, coverage and antenna array information to the electronic device 1800, and thus the electronic device 1800 obtains the information. Further, the user equipment may transmit a reference signal to multiple network side devices around the user equipment, and each network side device measures a signal-to-noise ratio or power of a reception signal via the reference signal, to determine link quality between each network side device and the user equipment. Further, each network side device may report the measured link quality to the electronic device 1800. According to the embodiment of the present disclosure, the electronic device 1800 may select some network side devices with good link quality from the multiple network side devices, to form the group. The network side devices in the group may be determined in consideration of one or more of the above parameters.

Further, after the determination unit 1830 determines the group composed of network side devices for positioning the user equipment, the network side devices in the group may be numbered according to a certain rule, for example, numbers 0, 1, . . . , N−1. It follows that, a serial number of the electronic device 1800 and a serial number of other electronic device in the group may be determined.

According to the embodiment of the present disclosure, in a case that the positioning server determines the group composed of network side devices for positioning the user equipment, a manner similar to the above embodiment may be adopted, and details are not repeated here.

According to the embodiment of the present disclosure, each network side device in the group needs to know a time frequency position of PRS for the network side device, and the user equipment needs to know time frequency positions of PRS of all network side devices in the group. In order to achieve the above object, according to the embodiment of the present disclosure, for a network side device, each network side device in the group may calculate a time frequency position of a PRS for the network side device according to a serial number of the network side device in the group, or a network side providing service for the user equipment calculates a time frequency position of a PRS for each network side deice in the group. For a user equipment, the user equipment may calculate a time frequency position of a PRS for each network side device according to a serial number of each network side device in the group, may acquire the time frequency position of the PRS for each network side device from each network side device, or may acquire the time frequency position of the PRS of each network side device in the group from the network side device providing service for the user equipment.

That is, according to the embodiment of the present disclosure, in a case that the electronic device 1800 is a network side device providing service for the user equipment, the electronic device 1800 may transmit a serial number of other electronic device in the group to other electronic device via the communication unit 1810, so that other electronic device determines a time frequency position of a PRS for other electronic device according to the serial number of other electronic device in the group. That is, each network side device calculates a time frequency position of a PRS for the network side device, respectively. Since the electronic device 1800 only needs to transmit the serial number of other electronic device to other electronic device, thereby saving signaling overhead.

According to the embodiment of the present disclosure, in a case that the electronic device 1800 is a network side device providing service for the user equipment, the calculation unit 1820 may determine the time frequency position of the PRS for other electronic device according to the serial number of other electronic device in the group, and the communication unit 1810 may transmit the time frequency position of the PRS for other electronic device to other electronic device. That is, the electronic device 1800 may calculate the time frequency position of PRS of all network side devices in the group, thereby reducing calculation load of other network side devices.

According to the embodiment of the present disclosure, in a case that the electronic device 1800 is a network side device providing service for the user equipment, the communication unit 1810 transmits the serial number of the electronic device 1800 in the group and the serial number of other electronic device in the group to the user equipment, so that the user equipment determines the time frequency position of the PRS for each electronic device in the group. That is, the user equipment may calculate the time frequency position of the PRS for each network side device in the group. Since the electronic device 1800 only needs to transmit the serial numbers of all network side devices to the user equipment, thereby saving signaling overhead.

According to the embodiment of the present disclosure, the communication unit 1810 may transmit the time frequency position of the PRS for the electronic device 1800 to the user equipment. Here, an electronic device other than the electronic device 1800 in the group may transmit the time frequency position of the PRS for other electronic device to the user equipment. Optionally, if the electronic device 1800 calculates the time frequency position of the PRS of other electronic device, the electronic device 1800 transmits the time frequency position of the PRS of all network side devices in the group to the user equipment.

According to the embodiment of the present disclosure, after the positioning server or the network side device providing service for the user equipment determines the group and the serial number of the network side device in the group, group parameters may be transmitted to related devices, so that the related devices calculate the time frequency position of the corresponding PRS. The related devices may include the network side device providing service for the user equipment, a network side device other than the network side device providing service for the user equipment in the group, and the user equipment. Here, the transmission may be performed by broadcast or unicast. The group parameters may include identification information of all network side devices included in the group, a serial number of each network side device, and so on.

According to the embodiment of the present disclosure, after the positioning server or the network side device providing service for the user equipment determines the group and the serial number of the network side device in the group, offset parameters may be transmitted to the above related devices, so that the related devices calculate the time frequency position of corresponding PRS. Similarly, the transmission may be performed by broadcast or unicast. Here, the offset parameter may include the offset parameter based on the group and the offset parameter based on the user equipment, for example.

According to the embodiment of the present disclosure, after the positioning server or the network side device providing service for the user equipment determines the group and the serial number of the network side device in the group, a positioning time slot configuration parameter may be transmitted to the related devices, so that the related devices perform configurations for positioning time slot. Similarly, the transmission may be performed by broadcast or unicast. Here, the positioning time slot configuration parameter may include: an initial time slot for positioning, a positioning time slot duration, a beam scanning direction, and a beam scanning period and so on.

FIG. 19 to FIG. 24 show signaling flowcharts of determining a position of a PRS of each network side device according to an embodiment of the present disclosure. In FIG. 19 to FIG. 24, it is assumed that TRP1 provides service for the UE, and the finally determined group for positioning the UE includes TRP1 and TRP2. In addition, FIG. 19 to FIG. 24 only show examples in which the UE initiates the positioning request. Actually, the positioning request may be initiated by MME (Mobility Management Entity), and such example is not shown in the drawings in the present disclosure.

Figure 19:
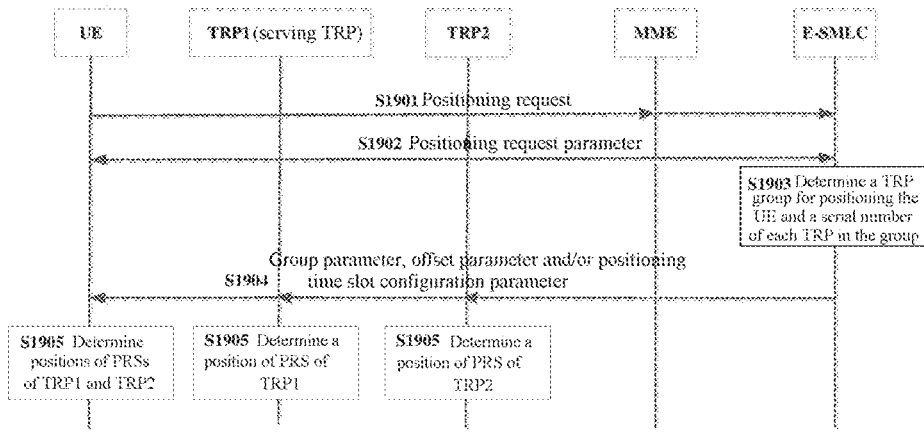
FIG. 19 shows a signaling flowchart of determining a position of PRS of each network side device according to an embodiment of the present disclosure.

As shown in FIG. 19, in step S1901, the UE initiates the positioning request, and the request is transmitted to E-SMLC via the MME. Subsequently, in step S1902, the UE and the E-SMLC exchange positioning request parameters. Subsequently, in step S1903, the E-SMLC selects TRP1 and TRP2 from multiple TRPs to form a TRP group for positioning the UE, and determines serial numbers of TRP1 and TRP2 in the group. Subsequently, in step S1904, the E-SMLC transmits the group parameters to TRP1, TRP2 and UE. Optionally, the E-SMLC may transmit the offset parameter and/or the positioning time slot configuration parameter to TRP1, TRP2 and UE. As described above, the above information may be transmitted by broadcast or unicast. Subsequently, in step S1905, TRP1 determines a time frequency position of a PRS for TRP1 according to the serial number of TRP1 in the group, TRP2 determines a time frequency position of a PRS for TRP2 according to the serial number of TRP2 in the group, the UE determines the time frequency position of the PRS for TRP1 according to the serial number of TRP1 in the group and determines the time frequency position of the PRS for TRP2 according to the serial number of TRP2 in the group. It follows that, in the embodiment shown in FIG. 19, the E-SMLC determines the group and the serial number in the group, each network side device in the group calculates the time frequency position of the PRS for the network side device, and the user equipment calculates the time frequency position of the PRS of each network side device in a user group.

Figure 20:
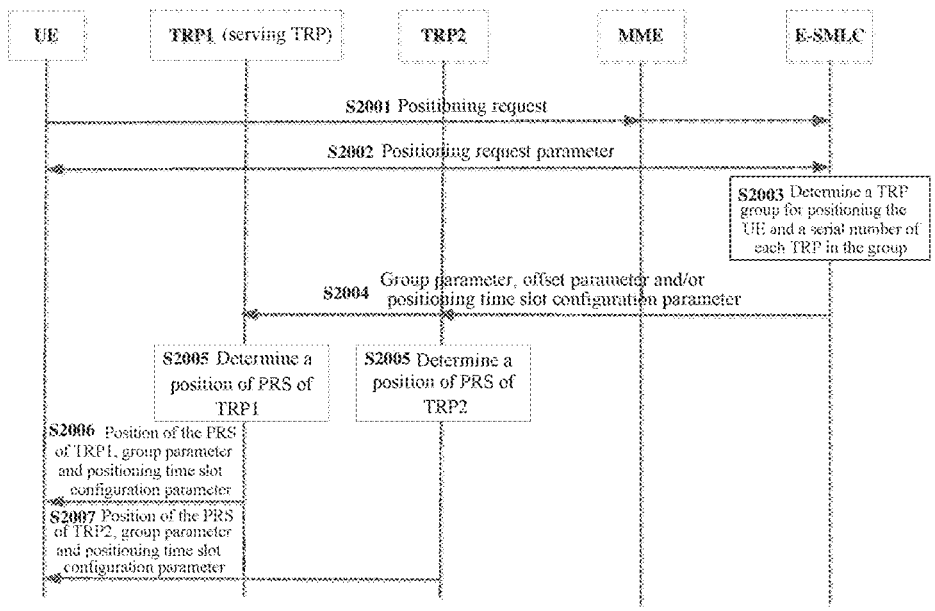
FIG. 20 shows a signaling flowchart of determining a position of PRS of each network side device according to an embodiment of the present disclosure.

As shown by FIG. 20, in step S2001, the UE initiates the positioning request, and the positioning request is transmitted to E-SMLC via the MME. Subsequently, in step S2002, the UE and the E-SMLC exchange positioning request parameters. Subsequently, in step S2003, the E-SMLC selects TRP1 and TRP2 from multiple TRPs to form a TRP group for positioning the UE, and determines serial numbers of TRP1 and TRP2 in the group. Subsequently, in step S2004, the E-SMLC transmits the group parameters to TRP1 and TRP2. Optionally, the E-SMLC may transmit the offset parameter and/or the positioning time slot configuration parameter to TRP1 and TRP2. As described above, the above information may be transmitted by broadcast or unicast. Subsequently, in step S2005, TRP1 determines a time frequency position of a PRS for TRP1 according to the serial number of TRP1 in the group, TRP2 determines a time frequency position of a PRS for TRP2 according to the serial number of TRP2 in the group. Subsequently, in step S2006, TRP1 transmits the time frequency position of the PRS for TRP1 to the UE. Optionally, the group parameters and the positioning time slot configuration parameters may be transmitted. Subsequently, in step S2007, TRP2 transmits the time frequency position of the PRS for TRP2. Optionally, the group parameters and the positioning time lost configuration parameter may be transmitted. Here, in step S2006 and step S2007, only one TRP of TRP1 and TRP2 may transmit the group parameter and the positioning time lost configuration parameter to the UE. Preferably, for TRP1, the group parameter and the positioning time slot configuration parameter may be sent to the UE. It follows that, in the embodiment shown in FIG. 20, the E-SMLC determines the group and the serial number in the group, each network side device in the group calculates the time frequency position of the PRS for the network side device, and each network side device transmits the time frequency position of the PRS of each network side device to the user equipment.

Figure 21:
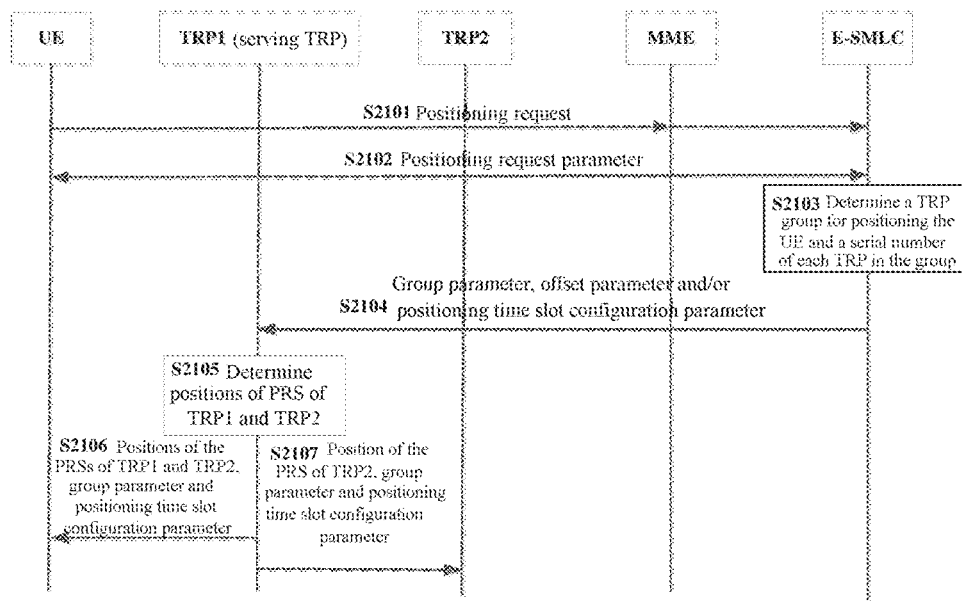
FIG. 21 shows a signaling flowchart of determining a position of PRS of each network side device according to an embodiment of the present disclosure.

As shown by FIG. 21, in step S2101, the UE initiates the positioning request, and the positioning request is transmitted to E-SMLC via the MIME. Subsequently, in step S2102, the UE and the E-SMLC exchange positioning request parameters. Subsequently, in step S2103, the E-SMLC selects TRP1 and TRP2 from multiple TRPs to form a TRP group for positioning the UE, and determines serial numbers of TRP1 and TRP2 in the group. Subsequently, in step S2104, the E-SMLC transmits the group parameters to TRP1. Optionally, the E-SMLC may transmit the offset parameter and/or the positioning time slot configuration parameter to TRP1. Subsequently, in step S2105, TRP1 determines a time frequency position of a PRS for TRP1 according to the serial number of TRP1 in the group, and determines a time frequency position of a PRS for TRP2 according to the serial number of TRP2 in the group. Subsequently, in step S2106, TRP1 transmits the time frequency position of the PRS for TRP1 and the time frequency position of the PRS for TRP2 to the UE. Optionally, the group parameters and the positioning time slot configuration parameters may be transmitted. Subsequently, in step S2107, TRP1 transmits the time frequency position of the PRS for TRP2 to TRP2. Optionally, the group parameters and the positioning time lost configuration parameter may be transmitted. It follows that, in the embodiment shown in FIG. 21, the E-SMLC determines the group and the serial number in the group, the network side device providing service for the user equipment calculates the time frequency position of the PRS for each network side device in the group, transmits the time frequency position of the PRS of each network side device, and transmits the time frequency position of the PRS of other network side device to other network side device.

Figure 22:
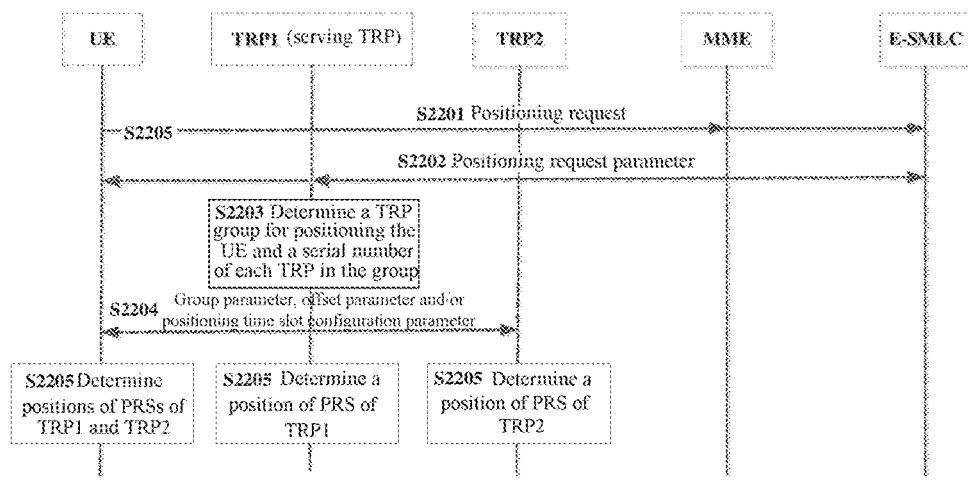
FIG. 22 shows a signaling flowchart of determining a position of PRS of each network side device according to an embodiment of the present disclosure.

As shown by FIG. 22, in step S2201, the UE initiates the positioning request, and the positioning request is transmitted to E-SMLC via the MME. Subsequently, in step S2202, the UE, the TRP1 and the E-SMLC exchange positioning request parameters. Subsequently, in step S2203, the TRP1 selects TRP1 and TRP2 from multiple TRPs to form a TRP group for positioning the UE, and determines serial numbers of TRP1 and TRP2 in the group. Subsequently, in step S2204, the TRP1 transmits the group parameters to TRP2 and UE. Optionally, the TRP1 may transmit the offset parameter and/or the positioning time slot configuration parameter to TRP2 and UE. As described above, the information may be transmitted by broadcast or unicast. Subsequently, in step S2205, TRP1 determines a time frequency position of a PRS for TRP1 according to the serial number of TRP1 in the group, TRP2 determines a time frequency position of a PRS for TRP2 according to the serial number of TRP2 in the group, and the UE determines the time frequency position of the PRS for TRP1 according to the serial number of TRP1 in the group and determines the time frequency position of the PRS for TRP2 according to the serial number of TRP2 in the group. It follows that, in the embodiment shown in FIG. 22, the network side device providing service for the user equipment determines the group and the serial number in the group, each network side device in the group calculates the time frequency position of the PRS for the network side device, and the user equipment calculates the time frequency position of the PRS of each network side device in the group.

Figure 23:
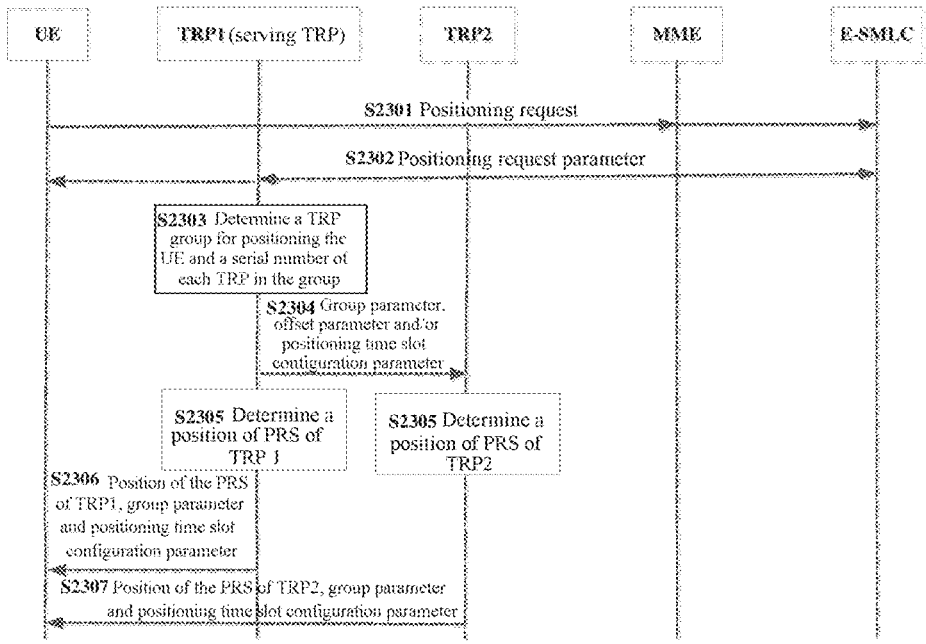
FIG. 23 shows a signaling flowchart of determining a position of PRS of each network side device according to an embodiment of the present disclosure.

As shown by FIG. 23, in step S2301, the UE initiates the positioning request, and the positioning request is transmitted to E-SMLC via the MME. Subsequently, in step S2302, the UE, the TRP1 and the E-SMLC exchange positioning request parameters. Subsequently, in step S2303, the TRP1 selects TRP1 and TRP2 from multiple TRPs to form a TRP group for positioning the UE, and determines serial numbers of TRP1 and TRP2 in the group. Subsequently, in step S2304, the TRP1 transmits the group parameters to TRP2. Optionally, the TRP1 may transmit the offset parameter and/or the positioning time slot configuration parameter to TRP2. Subsequently, in step S2305, TRP1 determines a time frequency position of a PRS for TRP1 according to the serial number of TRP1 in the group, and TRP2 determines a time frequency position of a PRS for TRP2 according to the serial number of TRP2 in the group. Subsequently, in step S2306, the TRP1 transmits the time frequency position of the PRS for TRP1 to the UE. Optionally, the group parameters and the positioning time slot configuration parameters may be transmitted. Subsequently, in step S2307, TRP2 transmits the time frequency positions of the PRS for TRP2 to the UE. Optionally, the group parameters and the positioning time slot configuration parameter may be transmitted. Here, in step S2306 and step S2307, only one TRP of TRP1 and TRP2 transmits the group parameter and the positioning time slot configuration parameter to the UE. Preferably, for TRP1, the group parameters and the positioning time slot configuration parameter are sent to the UE. It follows that, in the embodiment shown in FIG. 23, the network side device providing service for the user equipment determines the group and the serial number in the group, each network side device in the group calculates the time frequency position of the PRS for the network side device, and each network side device transmits the time frequency position of the PRS of the network side device to the user equipment.

Figure 24:
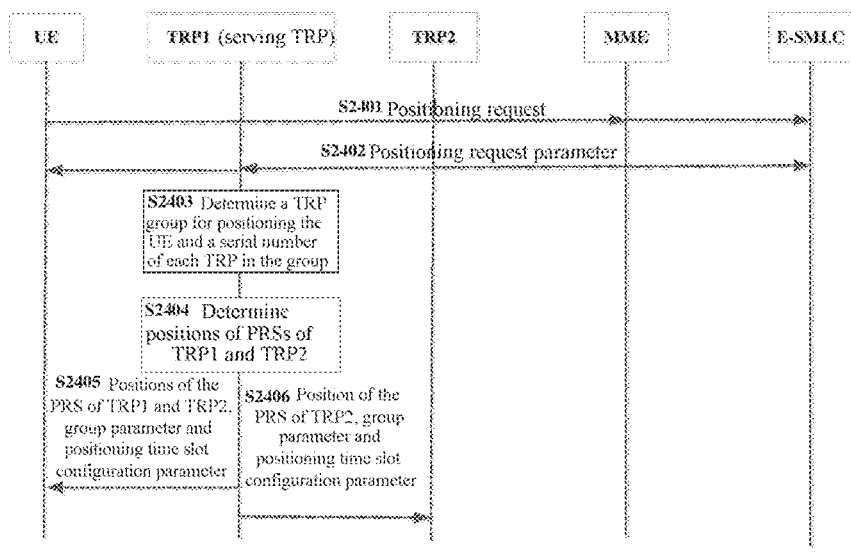
FIG. 24 shows a signaling flowchart of determining a position of PRS of each network side device according to an embodiment of the present disclosure.

As shown by FIG. 24, in step S2401, the UE initiates the positioning request, and the positioning request is transmitted to E-SMLC via the MME. Subsequently, in step S2402, the UE, the TRP1 and the E-SMLC exchange positioning request parameters. Subsequently, in step S2403, the TRP1 selects TRP1 and TRP2 from multiple TRPs to form a TRP group for positioning the UE, and determines serial numbers of TRP1 and TRP2 in the group. Subsequently, in step S2404, the TRP1 determines the time frequency position of the PRS for TRP1 according to the serial number of the TRP1 in the group, and determines the time frequency position of the PRS for TRP2 according to the serial number of TRP2 in the group. Subsequently, in step S2405, TRP1 transmits a time frequency position of a PRS for TRP1 and a time frequency position of a PRS for TRP2 to the UE. Optionally, the group parameters and the positioning time lost configuration parameter may be transmitted. Subsequently, in step S2406, the TRP1 transmits the time frequency position of the PRS for TRP2 to TRP2. Optionally, the group parameters and the positioning time slot configuration parameters may be transmitted. It follows that, in the embodiment shown in FIG. 24, the network side device providing service for the user equipment determines the group and the serial number in the group, the network side device providing service for the user equipment calculates the time frequency position of the PRS for each network side device in the group, transmits the time frequency position of the PRS for each network side device to the user equipment, and transmits the time frequency position of the PRS for other network side device to other network side device.

According to the embodiment of the present disclosure, the positioning server or the network side device providing service for the user equipment may determine a beam scanning direction of each network side device in the group. For example, different network side devices may have different beam scanning directions, that is, beam scanning planes of the network side devices intersect with each other. Practically, the network side devices may have the same beam scanning direction, and the beam scanning direction is not limited in the present disclosure.

Figure 25:
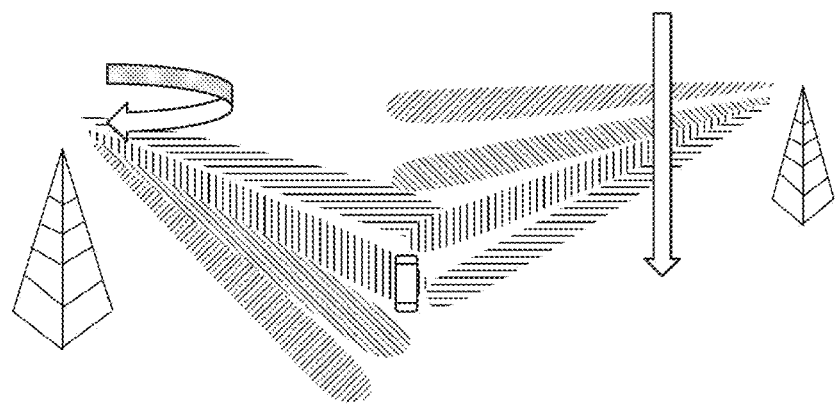
FIG. 25 shows a schematic diagram of beam scanning directions of two network side devices according to an embodiment of the present disclosure.

FIG. 25 shows a schematic diagram of beam scanning directions of two network side devices according to an embodiment of the present disclosure. As shown in FIG. 25, the group includes two network side devices. A network side device at left have a horizontal beam scanning direction, that is, a plane composed of scanning beams is parallel with the ground. A network side device at right have a vertical beam scanning direction, that is, a plane composed of scanning beams is vertical to the ground.

According to the embodiment of the present disclosure, the positioning server or the network side device providing service for the user equipment may determine a beam scanning period of each network side device in the group. For example, the positioning server or the network side device providing service for the user equipment may determine the beam scanning period according to the beam scanning direction of the network side device. For example, with respect to a vertical direction, the position of the user equipment changes faster in a horizontal direction. Therefore, a beam scanning period in the horizontal direction may be set to be less than a beam scanning period in the vertical direction.

As described above, according to the embodiment of the present disclosure, the group composed of network side devices and the serial number of each network side device in the group may be determined by the network side device providing service for the user equipment or the positioning server. Further, the time frequency position of the PRS for each network side device may be calculated by the network side device providing service for the user equipment, a network side device other than the network side device providing service for the user equipment, or the user equipment. The calculation method is consistent for different entities calculating the time frequency positions of the PRS. In the following, the calculation method is described in detail by taking the electronic device 1800 as an example.

According to the embodiment of the present disclosure, the calculation unit 1820 may determine the time frequency position of the PRS in the RB according to the subcarrier interval of the RB and the serial number of the electronic device 1800 in the group. Here, the time frequency position of the PRS includes a time domain position and a frequency domain position of each of multiple REs occupied by the PRS.

According to the embodiment of the present disclosure, the calculation unit 1820 may determine the time domain position of the PRS according to the subcarrier interval. Further, the calculation unit 1820 may determine the time domain position of the PRS according to the subcarrier interval and the serial number of the electronic device 1800 in the group. Further, according to the embodiment of the present disclosure, the calculation unit 1820 may determine the frequency domain position of the PRS according to the time domain position of the PRS and the serial number of the electronic device in the group.

According to the embodiment of the present disclosure, the calculation unit 1820 may determine the time domain position of the PRS, so that the PRS does not overlap with each of PDCCH, DMRS and CSI-RS in a time domain.

According to the embodiment of the present disclosure, the calculation unit 1820 may determine the time frequency position of the PRS, so that multiple REs occupied by the PRS are located on different OFDM symbols; and/or multiple REs occupied by the PRS are located on different subcarriers.

As shown in FIG. 6(*a*) to FIG. 9(*c*), the multiple REs occupied by the PRS may be located on different OFDM symbols. That is, multiple REs occupied by the PRS are orthogonal in the time domain, and two or more REs may be located on the same subcarrier among the multiple REs.

As shown in FIG. 10(*a*) to FIG. 10(*d*), multiple REs occupied by the PRS may be located on different subcarriers. That is, multiple REs occupied by the PRS are orthogonal in the frequency domain, and two or more REs are located on the same OFDM symbol among the multiple REs.

As shown in FIG. 11(*a*) to FIG. 11(*d*), the multiple REs occupied by PRS may be located on different OFDM symbols and located on different subcarriers. That is, multiple REs occupied by the PRS are orthogonal in the time domain and the frequency domain. In this case, the calculation unit 1820 may calculate the time domain position and the frequency domain position of multiple REs occupied by the PRS according to the equations (5) to (21) described above.

That is, according to the embodiment of the present disclosure, the calculation unit 1820 may determine the time frequency position of the PRS according to at least one of the following parameters: physical layer cell identification of a cell where a user equipment is located; a bandwidth for transmitting the PRS; and a bandwidth for transmitting downlink data and the number of electronic devices in the group.

In addition, as described above, a time frequency position of the corrected PRS may be determined according to the offset parameter. The offset parameter may include an offset parameter based on a user equipment and an offset parameter based on a group, for example. The calculation unit 1820 may determine the offset parameter based on the group according to a serial number of the electronic device 1800 in the group. Further, the calculation unit 1820 may determine the offset parameter based on the user equipment according to link quality of each subcarrier between the electronic device 1800 and the user equipment and/or identification of the user equipment. That is, the calculation unit 1820 may determine the corrected time frequency position of the PRS according to at least one of the following parameters: the serial number of the electronic device 1800 in the group, link quality of each subcarrier between the electronic device 1800 and the user equipment; and identification of the user equipment.

In this case, the calculation unit 1820 calculates time domain positions and frequency domain positions of multiple REs occupied by the PRS according to equations (22) to (32) described above.

The embodiments of designing and classifying the PRSs descried above may be applied to the above case, and details are not repeated here.

According to the embodiment of the present disclosure, as shown in FIG. 18, the electronic device 1800 may further include a scanning unit 1840 configured to perform beam scanning on the user equipment by using the PRS for the electronic device 1800, so that the user equipment obtains beam emission angle information of the electronic device 1800. Here, the scanning unit 1840 may perform the beam scanning process according to the positioning time slot configuration parameter configured for the electronic device 1800.

It follows that, with the electronic device 1800 according to the embodiment of the present disclosure, the time frequency position of the PRS of the electronic device 1800 can be determined according to the serial number of the electronic device among the group composed of electronic devices for positioning the user equipment, so that the electronic device 1800 can cooperate with other electronic devices in the group to position the user equipment, thereby saving positioning time. Further, the classified PRS may be used to perform beamforming and positioning based on the beam angle, thereby positioning more accurately. In this way, the PRSs can be designed more reasonably for the NR communication system, thereby optimizing positioning of the user equipment.

<4. Examples of Configurations of the User Equipment>

Figure 26:
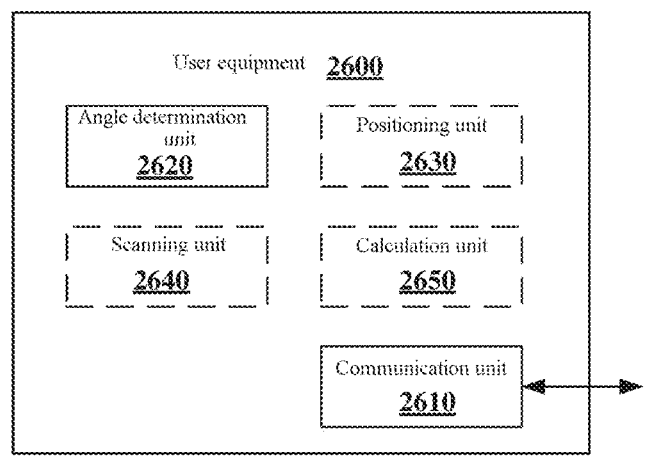
FIG. 26 shows a block diagram of an example of configurations of an electronic device according to an embodiment of the present disclosure.

FIG. 26 shows a block diagram of a structure of a user equipment 2600 in a wireless communication system according to an embodiment of the present disclosure. As shown in FIG. 26, the user equipment 2600 may include a communication unit 2610 and an angle determination unit 2620.

Here, units of the user equipment 2600 may be included in processing circuitry. It should be noted that, the user equipment 2600 may include one or more processing circuitry. Further, the processing circuitry may include various discrete functional units to perform various different functions and/or operations. It should be noted that, the functional units may be physical entities or logical entities, and units with different names may be implemented by the same physical entity.

According to the embodiment of the present disclosure, the communication unit 2610 may receive PRSs from multiple network side devices. A time frequency position of a PRS for each network side device is determined according to a serial number of the network side device among a group composed of multiple network side devices.

According to the embodiment of the present disclosure, the angle determination unit 2620 may determine beam emission angle information of each network side device according to the PRS received from each network side device. For example, the angle determination unit 2620 may measure the PRS transmitted by the network side device on corresponding RE according to the time frequency position of the PRS of the network side device, thereby obtaining the beam emission angle information of the network side device.

It follows that, according to the embodiment of the present disclosure, the user equipment 2600 may determine the beam emission angle information of each network side device according to the PRS received from multiple network side devices, and such beam emission angle information may be used to position the user equipment 2600. In this way, positioning can be achieved based on the beam angle, so that the positioning is more accurate.

According to the embodiment of the present disclosure, as shown in FIG. 26, the user equipment 2600 may include a positioning unit 2630 configured to determine a position of the user equipment 2600 according to beam emission angle information of each network side device. That is, the user equipment 2600 may determine the position of the user equipment 2600. Here, after obtaining the beam emission angle information of each network side device, the user equipment 2600 may calculate the position of the user equipment 2600 according to any method well-known in the art, and the method is not limited in the present disclosure.

According to the embodiment of the present disclosure, the communication unit 2610 may transmit the beam emission angle information of each network side device to a positioning server, so that the positioning server determines the position of the user equipment 2600. The positioning server includes but not limited to E-SMLC. That is, the positioning server may determine the position of the user equipment 2600. Similarly, after obtaining the beam emission angle information of each network side device, the positioning server may calculate the position of the user equipment 2600 according to any method well-known in the art, and the method is not limited in the present disclosure.

According to the embodiment of the present disclosure, as shown in FIG. 26, the user equipment 2600 may further include a calculation unit 2650 configured to calculate a time frequency position of a PRS of each network side device.

According to the embodiment of the present disclosure, the calculation unit 2650 may determine the time frequency position of the PRS of each network side device according to a serial number of each of multiple network side devices in a group. Further, the communication unit 2610 may receive the serial number of each network side device in the group from a network side device providing service for the user equipment or the positioning server. Specific calculation methods are described in detail above, and are not repeated here.

According to the embodiment of the present disclosure, the communication unit 2610 may receive the time frequency position of the PRS for each of the multiple network side devices from the network side device.

According to the embodiment of the present disclosure, the communication unit 2610 may receive the time frequency position of the PRS of each network side device in the group from the network side device providing service for the user equipment 2600.

As described above, according to the embodiment of the present disclosure, the user equipment 2600 may calculate the time frequency position of the PRS for each network side device, may receive the time frequency position of the PRS for each network side device from the network side device, or may receive the time frequency position of the PRS for each network side device in the group from the network side device providing service for the user equipment 2600.

According to the embodiment of the present disclosure, as shown in FIG. 26, the user equipment 2600 may further include a scanning unit 2640 configured to perform beam scanning on multiple network side devices, so that the network side device obtains the beam emission angle information of the user equipment. Here, the beam emission angle information of the user equipment may include beam emission angle information of the user equipment for each network side device. Further, the beam emission angle information of the user equipment for each network side device may include beam emission angle information in multiple scanning directions. Further, the network side device may transmit the obtained beam emission angle information of the user equipment to the user equipment 2600.

According to the embodiment of the present disclosure, the positioning unit 2630 may determine the position of the user equipment 2600 according to the beam emission angle information of each network side device and the beam emission angle information of the user equipment. Optionally, the communication unit 2610 may transmit the beam emission angle information of the user equipment transmitted from the network side device to the positioning server, so that the positioning server determines the position of the user equipment 2600 according to the beam emission angle information of each network side device and the beam emission angle information of the user equipment.

According to the embodiment of the present disclosure, the user equipment 2600 or the positioning server may determine the position of the user equipment 2600 based on the beam emission angle information of each network side device and the beam emission angle information of the user equipment, by using any method well-known in the art. A non-limiting example is described below.

It is assumed that a beam scanning direction of TRP1 is a horizontal direction, and a beam scanning direction of TRP2 is a vertical direction. By the beam scanning process of TRP1 and TRP 2, the UE may obtain a beam emission angle $\alpha_1$ of the TRP1 and a beam emission angle $\beta_1$ of the TRP2. Further, by the beam scanning process of the UE, four beam emission angles of the UE may be obtained: a horizontal emission angle $\alpha_2$ of the UE for the TRP1; a vertical emission angle $\beta_2$ of the UE for the TRP1; a horizontal emission angle $\alpha_3$ of the UE for the TRP2; and a vertical emission angle $\beta_3$ of the UE for the TRP2. In which, the first two beam emission angles of the UE are obtained and transmitted to the UE by the TRP1, and the last two beam emission angles of the UE are obtained and transmitted to the UE by the TRP2.

Subsequently, the UE or the positioning server may calculate the position of the UE by using a triangulation method. First, two position coordinates $\vec{p}_1$ and $\vec{p}_2$ are calculated according to the following equations:

$$\vec{p_1} = \begin{pmatrix} x \\ y \\ z \end{pmatrix} = \begin{pmatrix} -\tan\alpha_1 & 1 & 0 \\ 1 & 0 & -\tan\beta_1 \\ \tan\beta_2 & 0 & -\cos\alpha_2 \end{pmatrix}^{-1} \begin{pmatrix} y_1 - x_1 \tan\alpha_1 \\ x_2 - z_2 \tan\beta_1 \\ x_1 \tan\beta_2 - z_1 \cos\alpha_2 \end{pmatrix} \quad (33)$$

$$\vec{p_2} = \begin{pmatrix} x \\ y \\ z \end{pmatrix} = \begin{pmatrix} -\tan\alpha_1 & 1 & 0 \\ 1 & 0 & -\tan\beta_1 \\ -\tan\alpha_3 & 1 & 0 \end{pmatrix}^{-1} \begin{pmatrix} y_1 - x_1 \tan\alpha_1 \\ x_2 - z_2 \tan\beta_1 \\ y_2 - x_2 \tan\alpha_3 \end{pmatrix} \quad (34)$$

in which, $(x_1, y_1, z_1)$ and $(x_1, y_1, z_1)$ respectively indicate three-dimensional coordinates of TRP1 and TRP2.

Subsequently, the final position $\vec{p}$ of the UE may be calculated with the weighted averaging method according to the following equation:

$$\vec{p} = \gamma_1 \vec{p_1} + \gamma_2 \vec{p_2} \quad (35)$$

in which, $\gamma_1$ and $\gamma_2$ are weighted coefficients ($\gamma_1 + \gamma_2 = 1$), which may be proportional to maximum reception signal to noise ratios at TRP1 and TRP2 respectively when UE performs beam scanning.

The embodiment of determining the position of the UE is described above, and the embodiment is illustrative rather than restrictive.

It follows that, according to the embodiment of the present disclosure, multiple network side devices may perform beam scanning on the user equipment simultaneously to obtain the beam emission angle information of the network side device, and the user equipment may perform beam scanning on the multiple network side devices to obtain the beam emission angle information of the user equipment. In this way, the positioning accuracy of the user equipment can be further improved.

According to the embodiment of the present disclosure, the beam scanning of the network side device and the user equipment may be performed by TDD, or the beam scanning of the network side device and the user equipment may be performed by FDD.

Figure 27A:
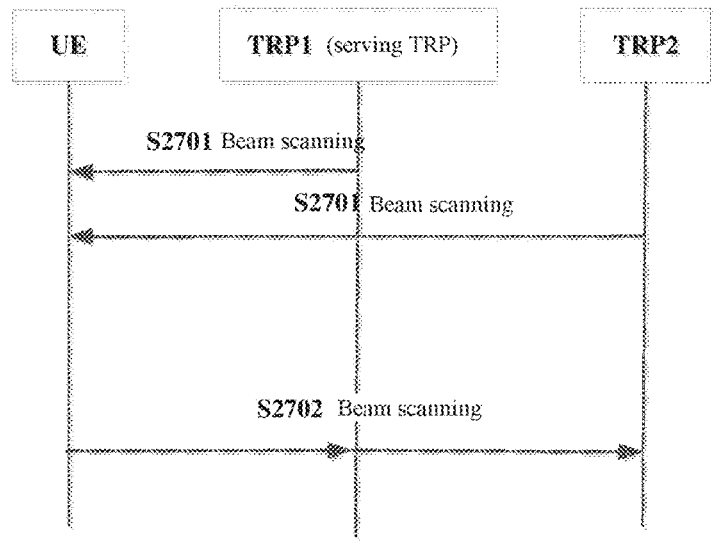
FIG. 27(a) shows a signaling flowchart of performing beam scanning by a user equipment and a network side device respectively in a TDD (Time Division Duplexing) mode according to an embodiment of the present disclosure.

FIG. 27(a) shows a signaling flowchart of performing beam scanning by a user equipment and a network side device in a TDD mode according to an embodiment of the present disclosure. As shown in FIG. 27(a), in step S2701, TRP1 and TRP2 perform beam scanning for the UE. Subsequently, in step S2702, the UE perform beam scanning for TRP1 and TRP2. Beam scanning in the above two steps is performed at different time and the same frequency.

Figure 27B:
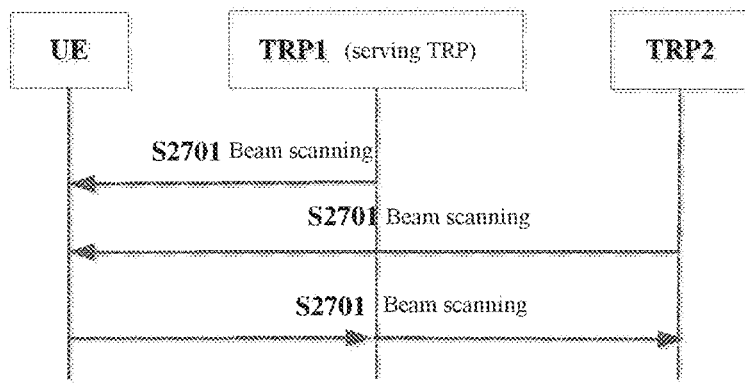
FIG. 27(b) shows a signaling flowchart of performing beam scanning by a user equipment and a network side device respectively in an FDD (Frequency Division Duplexing) mode according to an embodiment of the present disclosure.

FIG. 27(b) shows a signaling flowchart of performing beam scanning by a user equipment and a network side device in an FDD mode according to an embodiment of the present disclosure. As shown in FIG. 27(b), in step S2701, TRP1 and TRP2 perform beam scanning for the UE. At the same time, the UE perform beam scanning for TRP1 and TRP2. Beam scanning in the above two steps is performed at the same time and different frequencies.

As described above, with the user equipment 2600 according to the present disclosure, the beam emission angle information of each network side device can be determined according to the PRSs received from multiple network side devices, and such beam emission angle information can be used to position the user equipment 2600. In this way, the positioning based on the beam angle can be achieved, thereby positioning more accurately. In addition, the user equipment 2600 may perform beam scanning for the multiple network side devices, thereby further improving the positioning accuracy.

The electronic device 1800 according to the embodiment of the present disclosure may function as the network side device, that is, the electronic device 1800 can provide service for the user equipment 2600. Therefore, all embodiments of the electronic device 1800 described above are applied to the network side device.

<5. Method Embodiments>

A wireless communication method performed by an electronic device 1800 used as a network side device in a wireless communication system according to an embodiment of the present disclosure is described in detail hereinafter.

Figure 28:
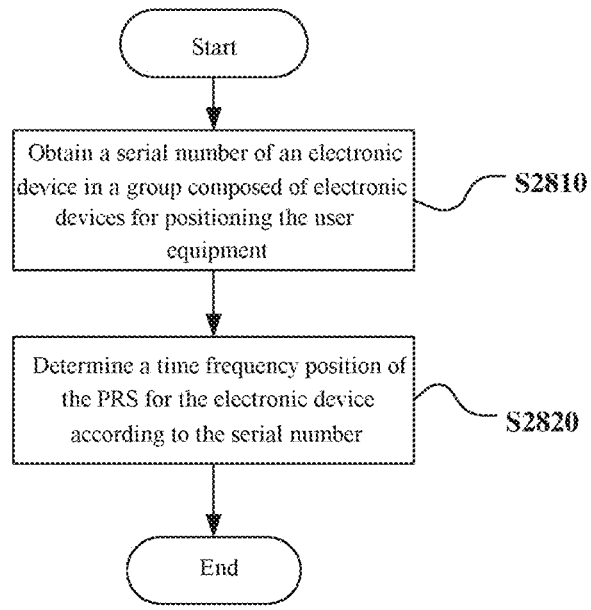
FIG. 28 shows a flowchart of a wireless communication method performed by an electronic device used as a network side device according to an embodiment of the present disclosure.

FIG. 28 shows a flowchart of a wireless communication method performed by an electronic device 1800 used as a network side device in a wireless communication system according to an embodiment of the present disclosure.

As shown in FIG. 28, in step S2810, a serial number of an electronic device in a group composed of electronic devices for positioning a user equipment is obtained.

Subsequently, in step S2820, a time frequency position of a positioning reference signal PRS of the electronic device is determined according to a serial number of the electronic device in the group.

Preferably, the process of obtaining a serial number of the electronic device in the group composed of electronic devices for positioning the user equipment may include: receiving the serial number of the electronic device in the group from the positioning server or other electronic device in the group.

Preferably, the process of obtaining a serial number of the electronic device in the group composed of electronic devices for positioning the user equipment may include: determining a group composed of the electronic devices for positioning the user equipment from multiple network side devices; and determining the serial number of the electronic device in the group and the serial number of other electronic device in the group.

Preferably, the process of determining the group composed of electronic devices for positioning the user equipment from the multiple network side device may include selecting a group from the multiple network side devices according to at least one of the following parameters: link quality between each of the multiple network side devices and the user equipment; a position of each network side device; a coverage of each network side device; and antenna array information of each network side device.

Preferably, the method further includes: transmitting the serial number of other electronic device in the group to other electronic device, so that other electronic device determines the time frequency position of the PRS for other electronic device according to the serial number of other electronic device in the group.

Preferably, the method further includes: determining the time frequency position of the PRS of other electronic device according to the serial number of other electronic device in the group; and transmitting the time frequency position of the PRS for other electronic device to other electronic device.

Preferably, the method further includes: transmitting the serial number of the electronic device in the group and the serial number of other electronic device in the group to the user equipment, so that the user equipment determines the time frequency position of the PRS for each electronic device in the group.

Preferably, the method further includes: transmitting the time frequency position of the PRS of the electronic device to the user equipment.

Preferably, the process of determining the time frequency position of the positioning reference signal PRS for the electronic device includes: determining a time frequency position of the PRS in the RB according to a subcarrier interval of a resource block RB and the serial number of the electronic device in the group.

Preferably, the process of determining the time frequency position of the positioning reference signal PRS for the electronic device may include: determining a time domain position of the PRS according to the subcarrier interval; and determining a frequency domain position of the PRS according to the time domain position of the PRS and the serial number of the electronic device in the group.

Preferably, the process of determining the time frequency position of the positioning reference signal PRS for the electronic device includes: determining the time domain position of the PRS, so that the PRS does not overlap with each of physical downlink control channel PDCCH, demodulation reference signal DMRS and channel state information reference signal CSI-RS on the RB in the time domain.

Preferably, the process of determining the time frequency position of the positioning reference signal PRS for the electronic device includes: determining the time frequency position of the PRS so that multiple resource elements REs occupied by the PRS are located on different orthogonal frequency division multiplexing OFDM symbols; and/or multiple REs occupied by the PRS are located on different subcarriers.

Preferably, the process of determining the time frequency position of the positioning reference signal PRS for the electronic device includes determining the time frequency position of the PRS according to at least one of the following parameters: physical layer cell identification of a cell where the user equipment is located; a bandwidth for transmitting the PRS; a bandwidth for transmitting downlink data; the number of electronic devices in the group; link quality between the electronic device and the user equipment; and identification of the user equipment.

Preferably, the method further includes: performing beam scanning on the user equipment by using the PRS of the electronic device.

Preferably, the electronic device 1800 includes a transmit and receive port TRP in a new radio NR communication system.

According to the embodiment of the present disclosure, the above method may be performed by the electronic device 1800 according to the embodiment of the present disclosure. Therefore, all embodiments of the electronic device 1800 described above adapt to the method.

Subsequently, a wireless communication method performed by a user equipment 2600 in a wireless communication system according to an embodiment of the present disclosure is described in detail.

Figure 29:
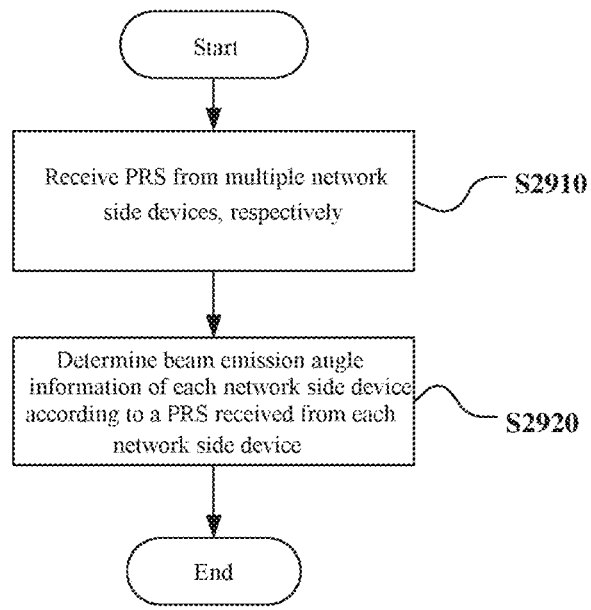
FIG. 29 shows a flowchart of a wireless communication method performed by a user equipment according to an embodiment of the present disclosure.

FIG. 29 shows a flowchart of a wireless communication method performed by a user equipment 2600 in a wireless communication system according to an embodiment of the present disclosure.

As shown in FIG. 29, in step S2910, a positioning reference signal PRS is received from multiple network side devices. In which, a time frequency position of the PRS for each network side device is determined according to a serial number of the network side device in a group composed of multiple network side devices.

Subsequently, in step S2920, beam emission angle information of each network side device is determined according to the PRS received from each network side device.

Preferably, the method further includes: determining a position of the user equipment according to the beam emission angle information of each network side device.

Preferably, the method further includes: transmitting the beam emission angle information of each network side device to a positioning server, so that the positioning server determines the position of the user equipment.

Preferably, the method further includes: performing beam scanning on multiple network side devices to obtain the beam emission angle information of the user equipment; and determining the position of the user equipment according to the beam emission angle information of each network side device and the beam emission angle information of the user equipment.

Preferably, the method further includes: receiving a time frequency position of the PRS for the network side device from each of the multiple network side devices.

Preferably, the method further includes: determining the time frequency position of the PRS for each network side device according to a serial number of each of the multiple network side devices in the group.

Preferably, the method further includes: receiving the serial number of each network side device in the group from a network side device providing service for the user equipment or the positioning server.

According to the embodiment of the present disclosure, the method may be performed by the user equipment 2600 according to the embodiment of the present disclosure. Therefore, all embodiments of the user equipment 2600 described above adapt to the method.

<6 Application Examples>

The technology of the present disclosure can be applied to various products.

The network side device may be implemented as any type of TRP. The TRP may have transmission and receiving functions. For example, the TRP may receive information from a user equipment and a base station device, and may transmit information to the user equipment and the base station device. In a typical example, the TRP may provide services for the user equipment, and is controlled by the base station device. Further, the TRP may have a similar structure as the base station device described below, or may have only a structure related to information transmission and reception in the base station device.

The network side device may be implemented as any type of base station device, such as a macro eNB and a small eNB, and may also be implemented as any type of gNB (a base station in a 5G system). The small eNB amy be an eNB covering a cell smaller than a macro cell, such as a pico eNB, a micro eNB and a home (femto) eNB. Alternatively, the base station may be implemented as any other type of base station, such as NodeB and a base station transceiver station (BTS). The base station may include: a body configured to control wireless communication (also referred to as a base station device); and one or more remote radio head end (RRH) located at a place different from the body.

The user equipment may be a mobile terminal (for example a smartphone, a tablet personal computer (PC), a notebook PC, a portable game terminal, a portable/dongle mobile router and a digital camera) or a vehicle terminal (such as a vehicle navigation device). The user equipment may be implemented as a communication terminal performing machine to machine (M2M) (also referred to as a machine type communication (MTC) terminal). In addition, the user equipment may be a wireless communication module (for example an integrated circuit module including a single chip) installed in each of the user equipments.

<Application Examples of the Base Station>

(First Application Example)

Figure 30:
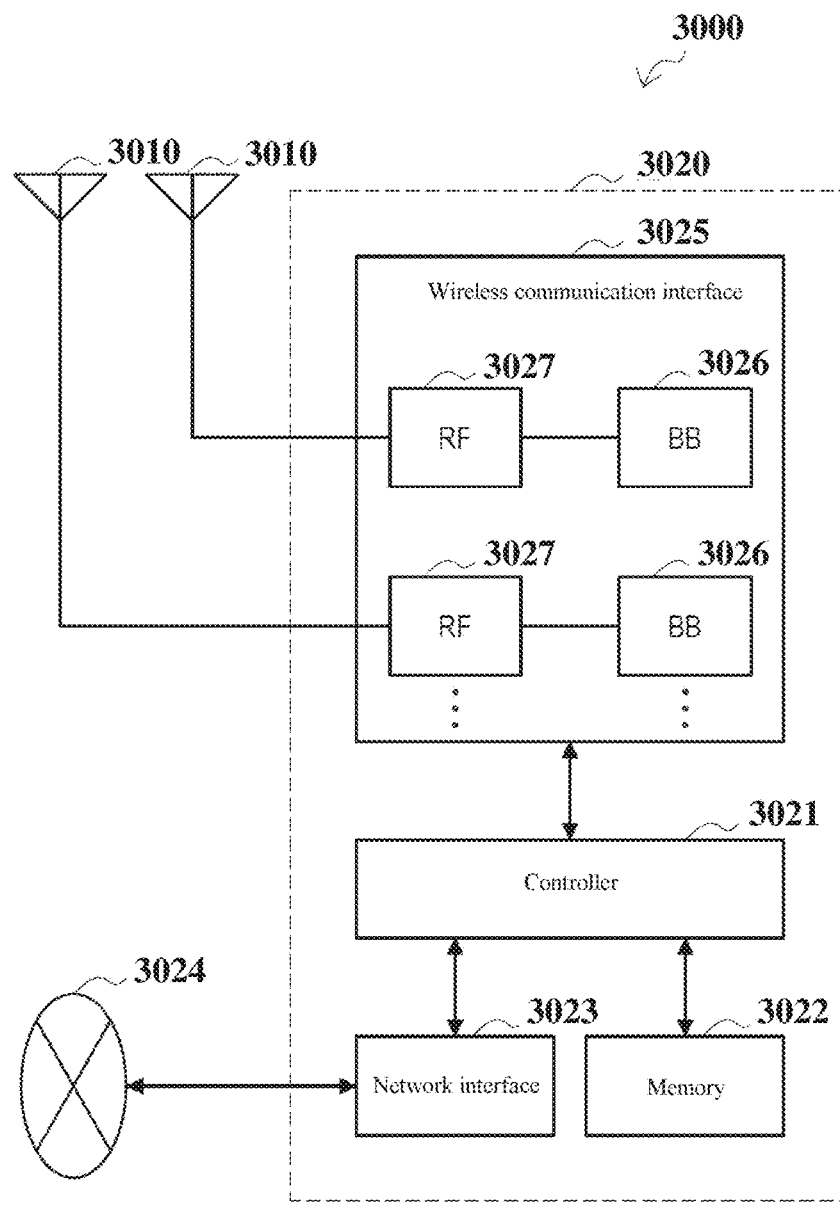
FIG. 30 shows a block diagram of a first example of a schematic configuration of an eNB (Evolved Node B)

FIG. 30 is a block diagram showing a first example of a schematic configuration of an eNB to which the technology of the present disclosure may be applied. An eNB 3000 includes one or more antennas 3010 and a base station device 3020. The base station device 3020 and each of the antennas 3010 may be connected with each other via an RF cable.

Each of the antennas 3010 includes one or more antenna elements (such as multiple antenna elements included in a multiple-input multiple-output (MIMO) antenna), and is used for transmitting and receiving a radio signal by the base station device 1820. The eNB 3000 may include the multiple antennas 3010, as shown in FIG. 30. For example, the multiple antennas 3010 may be compatible with multiple frequency bands used by the eNB 3000. Although FIG. 30 illustrates an example in which the eNB 3000 includes multiple antennas 3010, the eNB 3000 may also include a single antenna 3010.

The base station device 3020 includes a controller 3021, a memory 3022, a network interface 3023, and a wireless communication interface 3025.

The controller 3021 may be a CPU or a DSP and control various functions of higher layers of the base station device 3020. For example, the controller 3021 generates a data packet based on data in a signal processed by the wireless communication interface 3025, and transfers the generated packet via a network interface 3023. The controller 3021 may bundle data from multiple baseband processors to generate bundled packet, and transfer the generated bundled packet. The controller 3021 may have logical functions of performing control such as radio resource control, radio bearer control, mobility management, admission control, and scheduling. The control may be performed in conjunction with an adjacent eNB or a core network node. The memory 3022 includes RAM and ROM, and stores a program that is executed by the controller 3021, and various types of control data (such as a terminal list, transmission power data, and scheduling data).

The network interface 3023 is a communication interface for connecting the base station device 3020 to a core network 3024. The controller 3021 may communicate with a core network node or another eNB via the network interface 3023. In that case, the eNB 3000 and the core network node or the other eNB may be connected to each other through a logical interface (such as an S1 interface and an X2 interface). The network interface 3023 may also be a wired communication interface or a wireless communication interface for radio backhaul. If the network interface 3023 is a wireless communication interface, it may use a higher frequency band for wireless communication than a frequency band used by the wireless communication interface 3025.

The wireless communication interface 3025 supports any cellular communication scheme (such as Long Term Evolution (LTE) and LTE-Advanced), and provides wireless connection to a terminal positioned in a cell of the eNB 3000 via the antenna 3010. The wireless communication interface 3025 may typically include, for example, a base band (BB) processor 3026 and an RF circuit 3027. The BB processor 3026 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 3021, the BB processor 3026 may have a part or all of the above-described logical functions. The BB processor 3026 may be a memory that stores the communication control program, or a module that includes a processor and related circuitry configured to perform the program. In this way, the function of the BB processor 3026 may be changed when the programs are updated. The module may be a card or a blade that is inserted into a slot of the base station device 3020. Alternatively, the module may be a chip that is mounted on the card or the blade. Meanwhile, the RF circuit 3027 may include, for example, a frequency mixer, a filter and an amplifier, and transmit and receive a radio signal via the antenna 3010.

As shown in FIG. 30, the wireless communication interface 3025 may include multiple BB processors 3026. For example, multiple BB processors 3026 may be compatible with multiple frequency bands used by the eNB 3000. As shown in FIG. 30, the wireless communication interface 3025 may include multiple RF circuits 3027. For example, the multiple RF circuits 3027 may be compatible with multiple antenna elements. Although an example in which the wireless communication interface 3025 includes multiple BB processors 3026 and multiple RF circuits 3027 is shown in FIG. 30, the wireless communication interface 3025 may also include a single BB processor 3026 or a single RF circuit 3027.

(Second Application Example)

Figure 31:
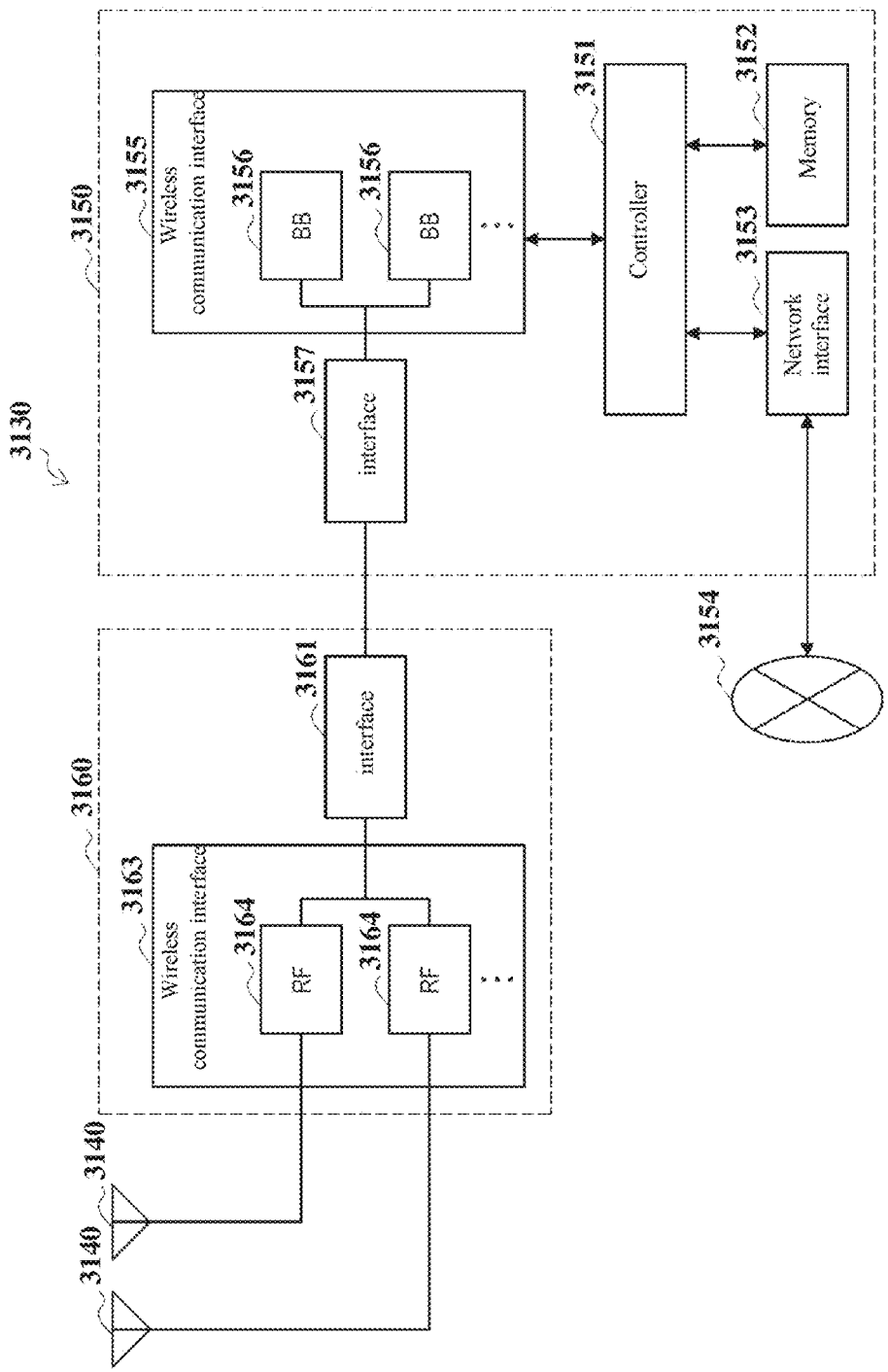
FIG. 31 shows a block diagram of a second example of the schematic configuration of the eNB.

FIG. 31 is a block diagram showing a second example of a schematic configuration of an eNB to which the technology according to the present disclosure may be applied. An eNB 3130 includes one or more antennas 3140, a base station device 3150 and an RRH 3160. Each antenna 3140 and the RRH 3160 may be connected to each other via an RF cable. The base station device 3150 and the RRH 3160 may be connected to each other via a high-speed line such as a fiber cable.

Each of the antennas 3140 includes one or more antenna elements (such as the multiple antenna elements included in the MIMO antenna), and is used for transmitting and receiving the radio signal by the RRH 3160. As shown in FIG. 31, the eNB 3130 may include multiple antennas 3140. For example, the multiple antennas 3140 may be compatible with multiple frequency bands used by the eNB 3130. Although an example in which the eNB 3130 includes multiple antennas 3140 is shown in FIG. 31, the eNB 3130 may also include a single antenna 3140.

The base station device 3150 includes a controller 3151, a memory 3152, a network interface 3153, a wireless communication interface 3155, and a connection interface 3157. The controller 3151, the memory 3152, and the network interface 3153 are the same as the controller 3021, the memory 3022, and the network interface 3023 described with reference to FIG. 30.

The wireless communication interface 3155 supports any cellular communication solution (such as LTE and LTE-advanced), and provides wireless communication with a terminal located in a sector corresponding to the RRH 3160 via the RRH 3160 and the antenna 3140. The wireless communication interface 3155 may typically include, for example, a BB processor 3156. Other than connecting to an RF circuit 3164 of the RRH 3160 via the connection interface 3157, the BB processor 3156 is the same as the BB processor 3026 described with reference to FIG. 30. As show in FIG. 31, the wireless communication interface 3155 may include multiple BB processors 3156. For example, the multiple BB processors 3156 may be compatible with the multiple frequency bands used by the eNB 3130. Although FIG. 31 illustrates an example in which the wireless communication interface 3155 includes multiple BB processors 3156, the wireless communication interface 3155 may also include a single BB processor 3156.

The connection interface 3157 is an interface for connecting the base station device 3150 (the wireless communication interface 3155) to the RRH 3160. The connection interface 3157 may also be a communication module for communication in the above-described high-speed line that connects the base station device 3150 (the wireless communication interface 3155) to the RRH 3160.

The RRH 3160 includes a connection interface 3161 and a wireless communication interface 3163.

The connection interface 3161 is an interface for connecting the RRH 3160 (the wireless communication interface 3163) to the base station device 3150. The connection interface 3161 may also be a communication module for the communication in the above high-speed line.

The wireless communication interface 3163 transmits and receives a radio signal via the antenna 3140. The wireless communication interface 3163 may generally include, for example, the RF circuit 3164. The RF circuit 3164 may include, for example, a frequency mixer, a filter and an amplifier, and transmit and receive a radio signal via the antenna 3140. The wireless communication interface 3163 may include multiple RF circuits 3164, as shown in FIG. 31. For example, the multiple RF circuits 3164 may support multiple antenna elements. Although FIG. 31 illustrates the example in which the wireless communication interface 3163 includes the multiple RF circuits 3164, the wireless communication interface 3163 may also include a single RF circuit 3164.

In the eNB 3100 shown in FIG. 30 and the eNB 3130 shown in FIG. 31, the calculation unit 1820, the determination unit 1830 and the scanning unit 1840 described in FIG. 18 may be implemented by the controller 3021 and/or the controller 3151. At least a part of functions may be implemented by the controller 3021 and the controller 3151. For example, the controller 3021 and/or the controller 3151 may classify the network side devices, determine the position of the PRS and perform beam scanning by executing instructions stored in a corresponding memory.

<Application Example of a Terminal Device>

(First Application Example)

Figure 32:
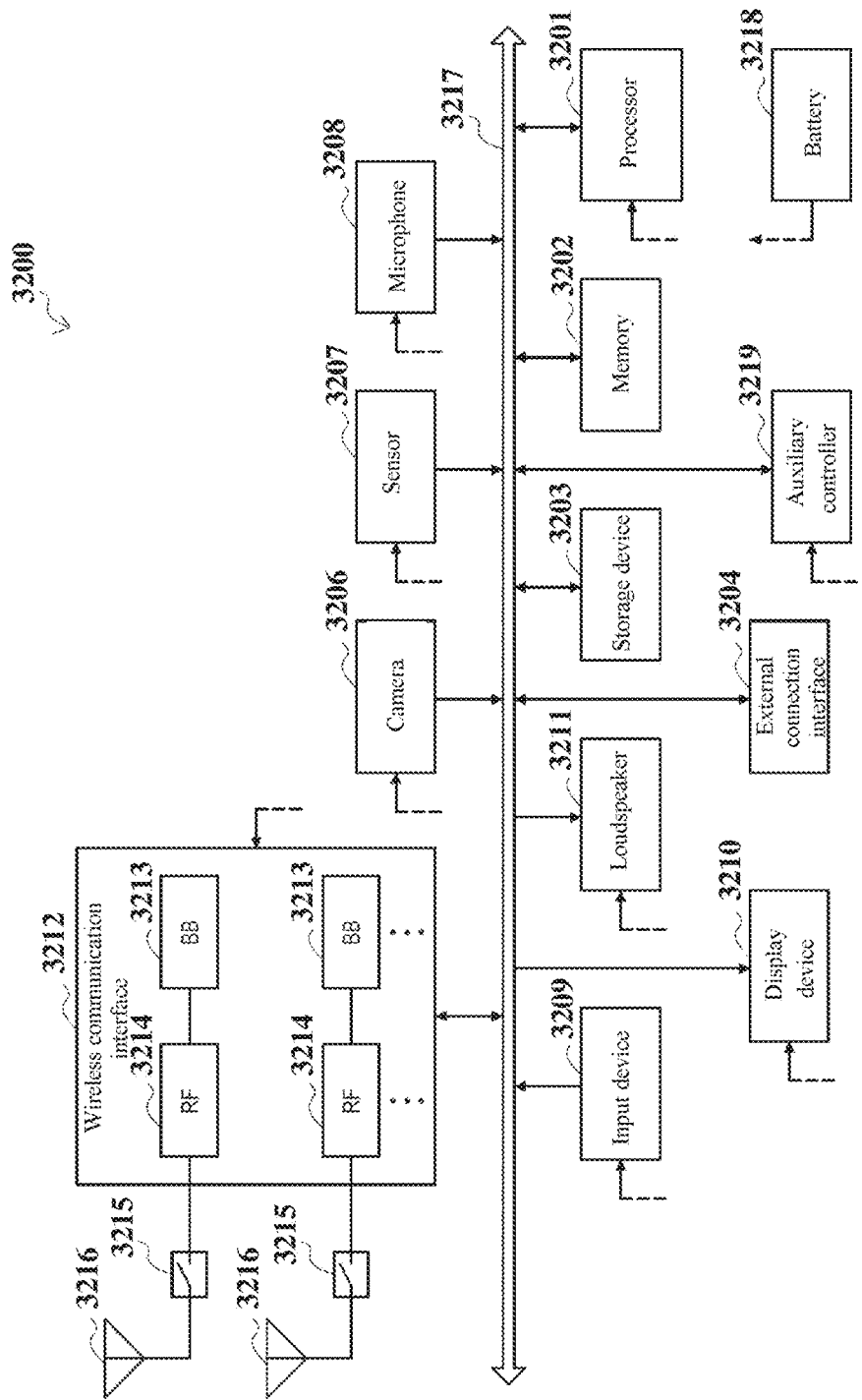
FIG. 32 shows a block diagram of an example of a schematic configuration of a smartphone.

FIG. 32 is a block diagram showing an example of exemplary configuration of a smartphone 3200 to which the technology of the present disclosure may be applied. The smart phone 3200 includes a processor 3201, a memory 3202, a storage device 3203, an external connection interface 3204, a camera 3206, a sensor 3207, a microphone 3208, an input device 3209, a display device 3210, a speaker 3211, a wireless communication interface 3212, one or more antenna switches 3215, one or more antennas 3216, a bus 3217, a battery 3218 and an auxiliary controller 3219.

The processor 3201 may be, for example, a CPU or a system on chip (SoC), and control functions of an application layer and other layers of the smart phone 3200. The memory 3202 includes a RAM and a ROM, and stores a program that is executed by the processor 3201, and data. The storage device 3203 may include a storage medium such as a semiconductor memory and a hard disk. The external connection interface 3204 is an interface for connecting an external device (such as a memory card and a universal serial bus (USB) device) to the smart phone 3200.

The camera 3206 includes an image sensor such as a charge coupled device (CCD) and a complementary metal oxide semiconductor (CMOS), and generates a captured image. The sensor 3207 may include a group of sensors such as a measurement sensor, a gyro sensor, a geomagnetic sensor, and an acceleration sensor. The microphone 3208 converts sounds that are inputted to the smart phone 3200 into audio signals. The input device 3209 includes, for example, a touch sensor configured to detect touch onto a screen of the display device 3210, a keypad, a keyboard, a button, or a switch, and receive an operation or information inputted from a user. The display device 3210 includes a screen such as a liquid crystal display (LCD) and an organic light-emitting diode (OLED) display, and displays an output image of the smart phone 3200. The speaker 3211 converts audio signals that are outputted from the smartphone 3200 to sounds.

The wireless communication interface 3212 supports any cellular communication scheme (such as LTE and LTE-Advanced), and performs wireless communication. The wireless communication interface 3212 may typically include, for example, a base band (BB) processor 3213 and a RF circuit 3214. The BB processor 3213 may perform encoding/decoding, modulating/demodulating and multiplexing/demultiplexing, for example, and perform various types of signal processing for wireless communication. The RF circuit 3214 may include a frequency mixer, a filter and an amplifier, for example, and transmit and receive a radio signal via the antenna 3216. The wireless communication interface 3212 may be a chip module having the BB processor 3213 and the RF circuit 3214 integrated thereon. The wireless communication interface 3212 may include multiple BB processors 3213 and multiple RF circuits 3214, as shown in FIG. 32. Although FIG. 32 illustrates the example in which the wireless communication interface 3212 includes the multiple BB processors 3213 and the multiple RF circuits 3214, the wireless communication interface 3212 may also include a single BB processor 3213 or a single RF circuit 3214.

Moreover, in addition to a cellular communication scheme, the wireless communication interface 3212 may also support a wireless communication scheme of another type, such as a short-distance wireless communication scheme, a near field communication scheme, and a wireless local area network (LAN) scheme. In this case, the wireless communication interface 3212 may include a BB processor 3213 and an RF circuit 3214 for each wireless communication scheme.

Each of the antenna switches 3215 switches connection destinations of the antennas 3216 among multiple circuits (such as circuits for different wireless communication schemes) included in the wireless communication interface 3212.

Each of the antennas 3216 includes one or more antenna elements (such as multiple antenna elements included in an MIMO antenna), and is used for the wireless communication interface 3212 to transmit and receive radio signals. The smartphone 3200 may include the multiple antennas 3216, as shown in FIG. 32. Although FIG. 32 illustrates the example in which the smartphone 3200 includes the multiple antennas 3216, the smartphone 3200 may also include a single antenna 3216.

In addition, the smart phone 3200 may include an antenna 3216 for each wireless communication scheme. In this case, the antenna switches 3215 may be omitted from the configuration of the smart phone 3200.

The bus 3217 connects the processor 3201, the memory 3202, the storage device 3203, the external connection interface 3204, the camera 3206, the sensor 3207, the microphone 3208, the input device 3209, the display device 3210, the speaker 3211, the wireless communication interface 3212, and the auxiliary controller 3219 to each other. The battery 3218 supplies power to each block of the smartphone 3200 shown in FIG. 32 via feeders which are partially shown by dashed lines in the figure. The auxiliary controller 3219 operates a minimum necessary function of the smartphone 3200, for example, in a sleep mode.

In the smartphone 3200 shown in FIG. 32, the determination unit 2620, the positioning unit 2630, the scanning unit 2640 and the calculation unit 3650 described in FIG. 26 may be implemented by a processor 3201 or an auxiliary controller 3219. At least a part of function may be implemented by the processor 3201 or the auxiliary controller 3219. For example, the processor 3201 or the auxiliary controller 3219 may determine a beam emission angle, position, calculate the position of the PRS and perform beam scanning on the network side device, by executing instructions stored in the memory 3202 or the storage device 3203.

(Second Application Example)

Figure 33:
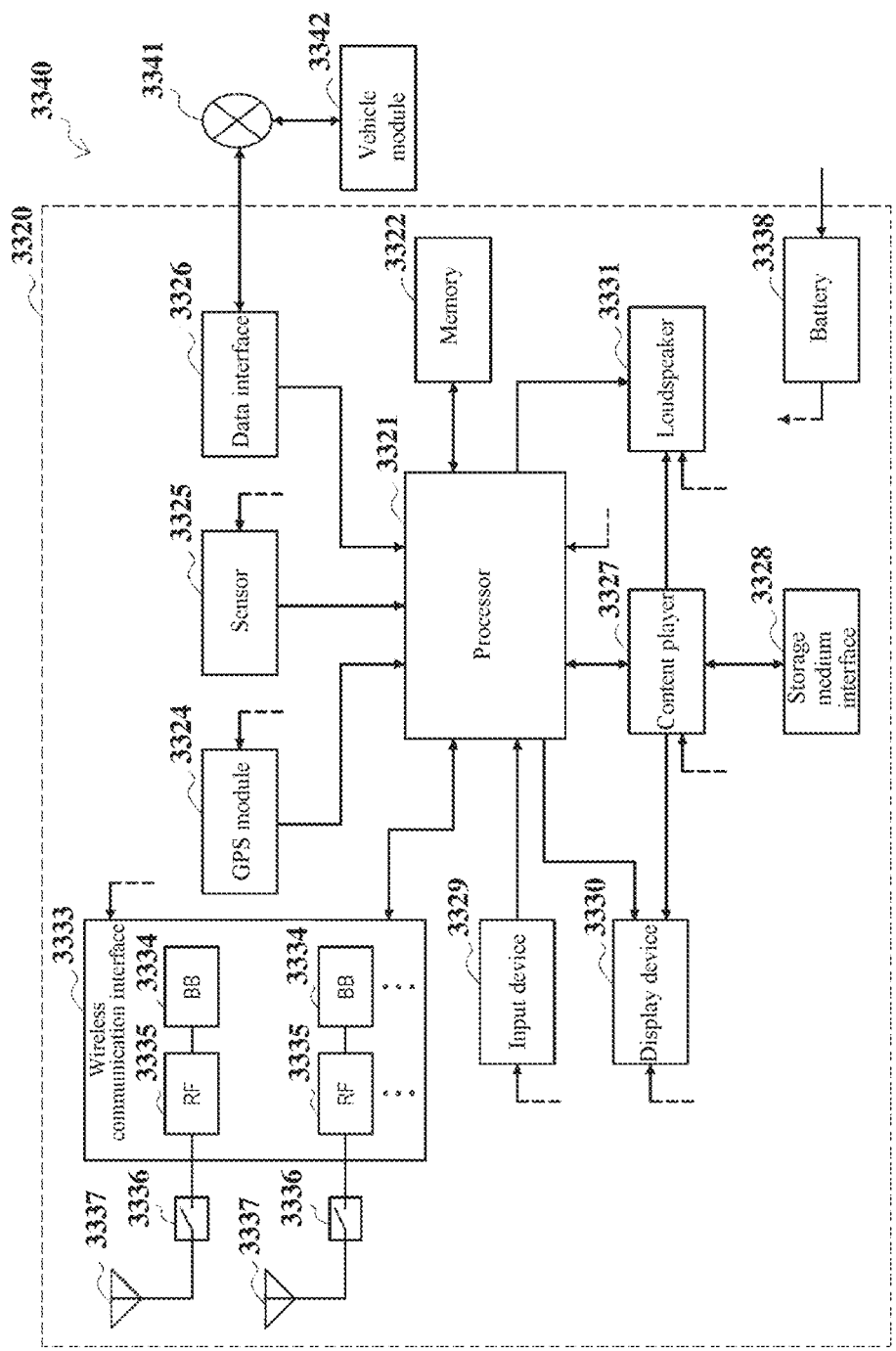
FIG. 33 shows a block diagram of an example of a schematic configuration of a vehicle navigation device.

FIG. 33 is a block diagram showing an example of a schematic configuration of a vehicle navigation device 3320 to which the technology according to the present disclosure may be applied. The vehicle navigation device 3320 includes a processor 3321, a memory 3322, a global positioning system (GPS) module 3324, a sensor 3325, a data interface 3326, a content player 3327, a storage medium interface 3328, an input device 3329, a display device 3330, a speaker 3331, a wireless communication interface 3333, one or more antenna switches 3336, one or more antennas 3337, and a battery 3338.

The processor 3321 may be for example the CPU or the SoC, and control the navigation function and other functions of the vehicle navigation device 3320. The memory 3322 includes a RAM and a ROM, and stores a program that is executed by the processor 3321 and data.

The GPS module 3324 determines a position (such as latitude, longitude, and altitude) of the vehicle navigation device 3320 by using GPS signals received from a GPS satellite. The sensor 3325 may include a group of sensors such as a gyroscope sensor, a geomagnetic sensor and an air pressure sensor. The data interface 3326 is connected to, for example, an in-vehicle network 3341 via a terminal that is not shown, and acquires data generated by the vehicle, such as vehicle speed data.

The content player 3327 reproduces content stored in a storage medium (such as a CD and a DVD) that is inserted into the storage medium interface 3328. The input device 3329 includes, for example, a touch sensor configured to detect touch on a screen of the display device 3330, a button, or a switch, and receives an operation or information inputted from a user. The display device 3330 includes a screen such as a LCD or an OLED display, and displays an image of the navigation function or content that is reproduced. The speaker 3331 outputs sounds of the navigation function or the content that is reproduced.

The wireless communication interface 3333 supports any cellular communication scheme (such as LTE and LTE-advanced) and performs wireless communication. The wireless communication interface 3333 may typically include, for example, a BB processor 3334 and an RF circuit 3335. The BB processor 3334 may perform encoding/decoding, modulating/demodulating and multiplexing/demultiplexing, for example, and perform various types of signal processing for wireless communication. The RF circuit 3335 may include a mixer, a filter and an amplifier, for example, and transmit and receive a radio signal via the antenna 3337. The wireless communication interface 3333 may also be one chip module that has the BB processor 3334 and the RF circuit 3335 integrated thereon. The wireless communication interface 3333 may include multiple BB processors 3334 and multiple RF circuits 3335, as shown in FIG. 33. Although FIG. 33 shows the example in which the wireless communication interface 3333 includes the multiple BB processors 3334 and the multiple RF circuits 3335, the wireless communication interface 3333 may also include a single BB processor 3334 or a single RF circuit 3335.

In addition to the cellular communication scheme, the wireless communication interface 3333 may also support a wireless communication scheme of another type, such as a short-distance wireless communication scheme, a near field communication scheme, and a wireless LAN scheme. In this case, the wireless communication interface 3333 may include a BB processor 3334 and a RF circuit 3335 for each wireless communication scheme.

Each of the antenna switches 3336 switches connection destinations of the antenna 3337 among multiple circuits (such as circuits for different wireless communication schemes) included in the wireless communication interface 3333.

Each of the antennas 3337 includes one or more antenna elements (such as multiple antenna elements included in the MIMO antenna), and is used for the wireless communication interface 3333 to transmit and receive a radio signal. The vehicle navigation device 3320 may include multiple antennas 3337, as shown in FIG. 33. Although FIG. 33 illustrates the example in which the vehicle navigation device 3320 includes the multiple antennas 3337, the vehicle navigation device 3320 may also include a single antenna 3337.

Furthermore, the vehicle navigation device 3320 may include the antenna 3337 for each wireless communication scheme. In this case, the antenna switches 3336 may be omitted from the configuration of the vehicle navigation device 3320.

The battery 3338 supplies power to each block of the vehicle navigation device 3320 shown in FIG. 33 via feeders which are partially shown by dashed lines in the figure. The battery 3338 accumulates power supplied form the vehicle.

In the vehicle navigation device 3320 shown in FIG. 33, the determination unit 2620, the positioning unit 2630, the scanning unit 2640 and the calculation unit 3650 described in FIG. 26 may be implemented by the processor 3321. At least a part of functions may be implemented by the processor 3321. For example, the processor 3321 may determine the beam emission angle, position, calculate the position of the PRS and perform beam scanning on the network side device by executing instruction stored in the memory 3322.

The technology of the present disclosure may also be implemented as an in-vehicle system (or a vehicle) 3340 including one or more of the blocks of the vehicle navigation device 3320, an in-vehicle network 3341 and a vehicle module 3342. The vehicle module 3342 generates vehicle data such as vehicle speed, engine speed, and fault information, and outputs the generated data to the in-vehicle network 3341.

Preferred embodiments of the disclosure have been described above with reference to the drawings, but the disclosure is not limited to the above examples of course. Those skilled in the art may make various changes and modifications within the scope of the appended claims, and it is to be understood that such changes and modifications naturally fall within the technical scope of the present disclosure.

For example, units shown by a dotted line block in the functional block diagram shown in the drawings indicate that the functional units are optional in the corresponding device, and the optional functional units may be combined appropriately to achieve the required function.

For example, multiple functions of one unit in the above embodiment may be realized by separate devices. Alternatively, multiple functions implemented by multiple units in the above embodiments may be respectively implemented by separate devices. Furthermore, one of the above functions may be implemented by multiple units. Needless to say, such configurations are included in the technical scope of the present disclosure.

In the specification, steps described in the flowchart include not only the processing performed chronologically, but also the processing performed in parallel or individually rather than chronologically. Further, even in the steps processed chronically, without saying, the order may be appropriately changed.

The embodiments of the present disclosure are described in detail in conjunction with the drawings above. However, it should be understood that the embodiments described above are intended to illustrate the present disclosure rather than limit the present disclosure.

Those skilled in the art may make various changes and modifications to the embodiments without departing from the essence and scope of the present disclosure. Therefore, the scope of the present disclosure is defined by the attached claims and equivalents thereof.

The invention claimed is:

1. A method for providing location services to a user equipment (UE) by a plurality of network side devices, the method performed by one of the plurality of network side devices and comprising:
   determining a time frequency position of a Positioning Reference Signal (PRS) within a Resource Block (RB) according to a subcarrier interval of the RB; and
   transmitting the PRS to the UE, wherein a frequency domain position of the time frequency position is determined according to each of:
the subcarrier interval;
a physical layer cell identification of a cell where the user equipment is located;
a bandwidth for transmitting the PRS; and
a bandwidth for transmitting downlink data, and
wherein a time domain position of the time frequency position is configured according to the subcarrier interval.

2. The method according to claim 1, wherein the determining a time frequency position of the PRS comprises:
determining time domain positions and frequency domain positions of a plurality of Resource Elements (REs) occupied by the PRS in the RB.

3. The method according to claim 2, wherein the determining the time frequency position of the PRS comprises:
the plurality of REs do not overlap with each of a Physical Downlink Control Channel (PDCCH), a Demodulation Reference Signal (DMRS) and a Channel State Information Reference Signal (CSI-RS) in the RB.

4. The method according to claim 2, wherein the determining time domain positions of the plurality of REs comprises:
maximizing a span of the plurality of REs in a time domain of the RB, and
maximizing a span of the plurality of REs in a frequency domain of the RB.

5. The method according to claim 2, wherein the determining frequency domain positions of the plurality of REs comprises:
the number of resource elements REs occupied by a PRS on each Orthogonal Frequency Division Multiplexing (OFDM) symbol of the RB is no more than two.

6. The method according to claim 1, wherein the time frequency position of the PRS is determined based also on at least one of the following parameters:
a number of the plurality of network side devices;
a link quality between the one network device and the UE; and
an identification of the UE.

7. The method according to claim 1, wherein the method further comprises:
classifying PRSs whose positions are determined into a plurality of groups, and assigning the PRSs in the plurality of groups to the plurality of network side devices for positioning a user equipment, respectively, and
wherein the classifying PRSs whose positions are determined into a plurality of groups comprises:
assigning one or more REs on a same subcarrier occupied by the PRSs to a same group; or
assigning one or more REs on a same Orthogonal Frequency Division Multiplexing (OFDM) symbol occupied by the PRSs to a same group; or
assigning one or more REs on a same subcarrier occupied by the PRSs to different groups, and
assigning one or more REs on a same OFDM symbol occupied by the PRSs to different groups.

8. The method according to claim 7, wherein the method further comprises correcting positions of the PRSs assigned to the network side devices according to at least one of the following parameters: link quality between the network side devices and the user equipment; an identification of the user equipment; and serial numbers of groups where the PRSs are located.

9. An electronic device used as a-one of a plurality of network side devices configured to provide location services to a user equipment (UE), comprising processing circuitry configured to perform a method that includes:
determining a time frequency position of a Positioning Reference Signal (PRS) within a Resource Block (RB) according to a subcarrier interval of the RB; and
transmitting the PRS to the UE,
wherein a frequency domain position of the time frequency position is determined according to each of:
the subcarrier interval;
a physical layer cell identification of a cell where the user equipment is located;
a bandwidth for transmitting the PRS; and
a bandwidth for transmitting downlink data, and
wherein a time domain position of the time frequency position is configured according to the subcarrier interval.

10. A non-transitory computer readable program product containing instructions for causing a device to perform a method for providing location services to a user equipment (UE) by one of a plurality of network side devices, the method comprising:
determining a time frequency position of a Positioning Reference Signal (PRS) within a Resource Block (RB) according to a subcarrier interval of the RB; and
transmitting the PRS to the UE,
wherein a frequency domain position of the time frequency position is determined according to each of:
the subcarrier interval;
a physical layer cell identification of a cell where the user equipment is located;
a bandwidth for transmitting the PRS; and
a bandwidth for transmitting downlink data,
wherein a time domain position of the time frequency position is configured according to the subcarrier interval.

* * * * *